(12) United States Patent
Ito et al.

(10) Patent No.: US 11,506,404 B2
(45) Date of Patent: Nov. 22, 2022

(54) REFRIGERATION CYCLE DEVICE

(71) Applicant: DENSO CORPORATION, Kariya (JP)

(72) Inventors: Satoshi Ito, Kariya (JP); Kengo Sugimura, Kariya (JP); Yuichi Kami, Kariya (JP); Hiroyuki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 182 days.

(21) Appl. No.: 17/110,058

(22) Filed: Dec. 2, 2020

(65) Prior Publication Data

US 2021/0102716 A1 Apr. 8, 2021

Related U.S. Application Data

(63) Continuation of application No. PCT/JP2019/021952, filed on Jun. 3, 2019.

(30) Foreign Application Priority Data

Jun. 8, 2018 (JP) .............................. JP2018-110427

(51) Int. Cl.
*F24F 3/14* (2006.01)
*B60H 1/00* (2006.01)
(Continued)

(52) U.S. Cl.
CPC ............ *F24F 3/14* (2013.01); *B60H 1/00278* (2013.01); *B60H 1/22* (2013.01); *F24F 1/022* (2013.01);
(Continued)

(58) Field of Classification Search
CPC .................................................. B60H 1/00278
See application file for complete search history.

(56) References Cited

U.S. PATENT DOCUMENTS

| | | | |
|---|---|---|---|
| 8,984,903 B2 * | 3/2015 | Itoh ...................... | F25B 41/385 62/217 |
| 9,494,355 B2 * | 11/2016 | Itoh ........................ | F25B 41/39 |

(Continued)

FOREIGN PATENT DOCUMENTS

| | | | |
|---|---|---|---|
| JP | 3931899 B2 | 6/2007 | |
| JP | 4600208 B2 | 12/2010 | |

(Continued)

OTHER PUBLICATIONS

U.S. Appl. No. 17/110,086, filed Dec. 2, 2020, Hiroyuki Kobayashi et al.

*Primary Examiner* — Christopher R Zerphey
(74) *Attorney, Agent, or Firm* — Harness, Dickey & Pierce, P.L.C.

(57) ABSTRACT

A refrigeration cycle device includes a heating unit, an air-heating expansion valve, an outdoor heat exchanger, an air-cooling expansion valve, an indoor evaporator, and a cooler-unit expansion valve, a cooler unit, and a refrigerant circuit switching unit. In a heating series cooler-unit mode, refrigerant is circulated in order of the heating unit, the air-heating expansion valve, the outdoor heat exchanger, the cooler-unit expansion valve, and the cooler unit. In a heating parallel cooler-unit mode, refrigerant is circulated in order of the heating unit, the air-heating expansion valve, and the outdoor heat exchanger, and refrigerant is circulated in order of the heating unit, the cooler-unit expansion valve, and the cooler unit.

6 Claims, 18 Drawing Sheets

(51) Int. Cl.
*B60H 1/22* (2006.01)
*F24F 1/022* (2019.01)
*F24F 3/153* (2006.01)
*F25B 5/02* (2006.01)

(52) U.S. Cl.
CPC ............... *F24F 3/153* (2013.01); *F25B 5/02* (2013.01); *F24F 2003/144* (2013.01)

(56) References Cited

U.S. PATENT DOCUMENTS

| | | | |
|---|---|---|---|
| 9,696,070 B2 * | 7/2017 | Ohta | F16K 11/044 |
| 9,863,726 B2 * | 1/2018 | Maeda | B60H 1/143 |
| 10,457,111 B2 * | 10/2019 | Gebbie | B60H 1/00278 |
| 10,967,702 B2 * | 4/2021 | Mancini | B60H 1/00921 |
| 11,021,037 B2 * | 6/2021 | Hwang | B60H 1/00571 |
| 2005/0178150 A1 | 8/2005 | Oshitani et al. | |
| 2005/0268644 A1 | 12/2005 | Oshitani et al. | |
| 2006/0156745 A1 | 7/2006 | Ikegami et al. | |
| 2012/0255319 A1 * | 10/2012 | Itoh | F25B 41/20 62/226 |
| 2015/0121939 A1 | 5/2015 | Takeuchi et al. | |
| 2015/0135742 A1 | 5/2015 | Rousseau et al. | |
| 2015/0159933 A1 | 6/2015 | Itoh et al. | |
| 2020/0164719 A1 * | 5/2020 | Shiratori | B60H 1/3207 |
| 2021/0384572 A1 * | 12/2021 | Lee | B60H 1/32284 |

FOREIGN PATENT DOCUMENTS

| | | | |
|---|---|---|---|
| JP | 2013217631 A | 10/2013 | |
| JP | 2015120505 A | 7/2015 | |
| JP | 5929372 B2 | 6/2016 | |
| JP | 2016156554 A | 9/2016 | |

* cited by examiner

REFRIGERATION CYCLE DEVICE

CROSS REFERENCE TO RELATED APPLICATION

The present application is a continuation application of International Patent Application No. PCT/JP2019/021952 filed on Jun. 3, 2019, which designated the U.S. and claims the benefit of priority from Japanese Patent Application No. 2018-110427 filed on Jun. 8, 2018. The entire disclosures of all of the above applications are incorporated herein by reference.

TECHNICAL FIELD

The present disclosure relates to a refrigeration cycle device for an air conditioner.

BACKGROUND

A refrigeration cycle device is applied to a vehicle air conditioner to control the temperature of air to be blown into a cabin that is a target space to be air-conditioned.

SUMMARY

According to an aspect of the present disclosure, a refrigeration cycle device includes: a compressor that compresses and discharges a refrigerant; a heating unit that heats air to be blown to a target space using heat of refrigerant discharged from the compressor as a heat source; a heating expansion valve that reduces a pressure of the refrigerant flowing out from the heating unit; an outdoor heat exchanger in which heat is exchanged between the refrigerant flowing from the air-heating expansion valve and outside air; a branch portion that branches a flow of the refrigerant flowing out of the outdoor heat exchanger; an air-cooling expansion valve that decompresses one of the refrigerant branched at the branch portion; an indoor evaporator that evaporates the refrigerant flowing out from the air-cooling expansion valve to cool the air before being heated by the heating unit; a cooler-unit expansion valve that reduces a pressure of the other refrigerant branched at the branch portion; a cooler unit that cools a target object by evaporating the refrigerant flowing out from the cooler-unit expansion valve; a confluence part that converges the flow of refrigerant flowing out of the indoor evaporator and the flow of refrigerant flowing out of the cooler unit to flow out toward a suction port of the compressor; a bypass passage that guides the refrigerant flowing out of the heating unit toward an upstream side of the branch portion; a heating passage that guides the refrigerant flowing out of the outdoor heat exchanger toward the suction port of the compressor; and a refrigerant circuit switching unit that switches a circuit of the refrigerant. In a series dehumidification heating mode in which the air cooled by the indoor evaporator is reheated by the heating unit, the refrigerant circuit switching unit sets a circuit of the refrigerant to flow in order of the compressor, the heating unit, the air-heating expansion valve, the outdoor heat exchanger, and the air-cooling expansion valve, the indoor evaporator, and the compressor. In a parallel dehumidification heating mode in which the air cooled by the indoor evaporator is reheated in the heating unit with a heating capacity higher than that in the series dehumidification heating mode, the refrigerant circuit switching unit sets a circuit of the refrigerant to flow in order of the compressor, the heating unit, the air-heating expansion valve, the outdoor heat exchanger, the heating passage, and the compressor, and to flow in order of the compressor, the heating unit, the bypass passage, the air-cooling expansion valve, the indoor evaporator, and the compressor. In a heating series cooler-unit mode in which the cooler unit cools the target object and the heating unit heats the air, the refrigerant circuit switching unit sets a circuit of the refrigerant to flow in order of the compressor, the heating unit, the air-heating expansion valve, the outdoor heat exchanger, the cooler-unit expansion valve, the cooler unit, and the compressor. In a heating parallel cooler-unit mode in which the cooler unit cools the target object and the heating unit heats the air with a heating capacity higher than that in the heating series cooler-unit mode, the refrigerant circuit switching unit sets a circuit of the refrigerant to flow in order of the compressor, the heating unit, the air-heating expansion valve, the outdoor heat exchanger, the heating passage, and the compressor, and to flow in order of the compressor, the heating unit, the bypass passage, the cooler-unit expansion valve, the cooler unit, and the compressor.

DESCRIPTION OF EMBODIMENT

Figure 1:
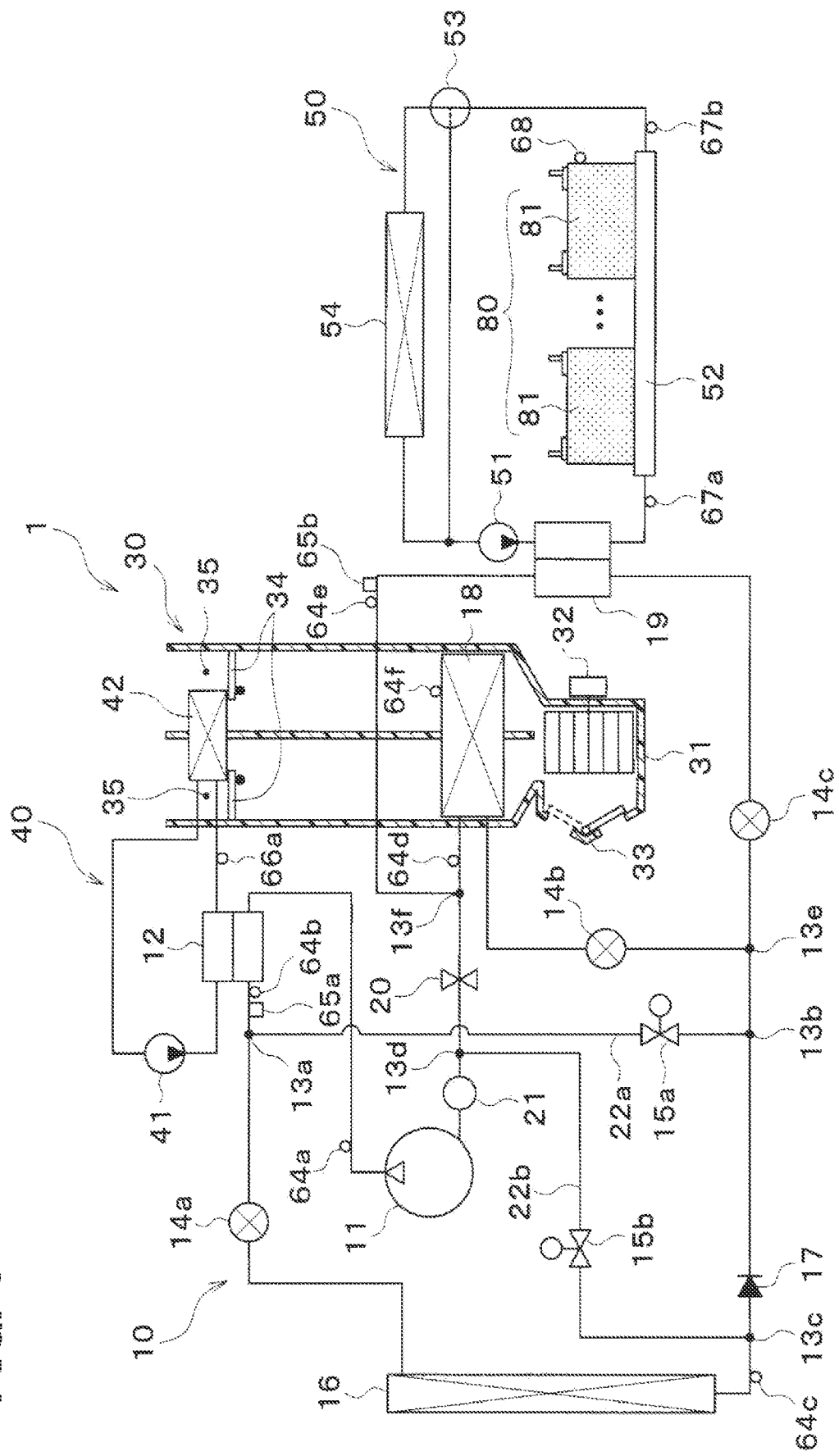
FIG. 1 is an overall configuration diagram of a vehicle air conditioner of a first embodiment.

To begin with, examples of relevant techniques will be described.

The refrigeration cycle device is configured so that the refrigerant circuit is switchable. Specifically, the refrigeration cycle device is configured to be able to switch the refrigerant circuit between a cooling mode, a heating mode, a dehumidification heating mode, and the like. The cooling mode is an operation mode in which air is cooled by the indoor evaporator. The heating mode is an operation mode in which air is heated by the indoor condenser. The dehumidification heating mode is an operation mode in which the air that has been cooled and dehumidified by the indoor evaporator is reheated by the indoor condenser.

Further, in the dehumidification heating mode, the refrigerant circuit is switched to connect the outdoor heat exchanger and the indoor evaporator in series to the refrigerant flow, or to connect the outdoor heat exchanger and the indoor evaporator in parallel to the refrigerant flow. Thus, in the refrigeration cycle device, the amount of heat exchange between the refrigerant and the outside air in the outdoor heat exchanger is adjusted during the dehumidification heating mode. Thus, it is possible to adjust continuously the temperature of the air within a wide range from high temperature to low temperature.

As described above, the ability to continuously adjust the temperature of the air over a wide range is effective to realize comfortable heating for the cabin when applied to an air conditioner for a vehicle in which a heat source for heating tends to be insufficient. A heat source for heating tends to be insufficient, for example, in an electric vehicle, as exhaust heat of an engine cannot be used.

An electric vehicle is equipped with a secondary battery (that is, a battery) that supplies electric power to an electric motor or the like. The output of this type of battery tends to decrease when the temperature becomes low, and the deterioration thereof easily progresses when the temperature becomes high. Therefore, the temperature of the battery needs to be maintained within an appropriate temperature range in which the battery performance can be sufficiently exhibited.

It is conceivable to use the refrigeration cycle device to adjust the temperature of the battery. However, the refrigeration cycle device does not have a configuration capable of adjusting the temperature of the battery. Further, even if it is attempted to cool the battery together with the air due to the cooling capacity exhibited by the indoor evaporator of the refrigeration cycle device, it is not possible to appropriately cool both the air and the battery.

If the refrigerant evaporation temperature in the indoor evaporator is changed in order to adjust the temperature of the battery to an appropriate temperature, the dehumidification of the air will be insufficient or the air will be cooled unnecessarily. Therefore, in the refrigeration cycle device, it is not possible to continuously adjust the temperature of the air in a wide range and at the same time appropriately adjust the temperature of a cooling target different from the air.

The present disclosure provides a refrigeration cycle device capable of continuously adjusting the temperature of air to be sent to the target space in a wide range while appropriately adjusting the temperature of a cooling target different from the air.

The refrigeration cycle device according to a first aspect of the present disclosure includes a compressor, a heating unit, an air-heating expansion valve, an outdoor heat exchanger, a branch portion, and an air-cooling expansion valve, an indoor evaporator, a cooler-unit expansion valve, a cooler unit, a merging unit, a bypass passage, a heating passage, and a refrigerant circuit switching unit.

The compressor is configured to compress and discharge a refrigerant. The heating unit heats the air blown to the target space by using the discharged refrigerant discharged from the compressor as a heat source. The air-heating expansion valve depressurizes the refrigerant flowing out from the heating unit. The outdoor heat exchanger exchanges heat between the refrigerant flowing out of the air-heating expansion valve and the outside air. The branch portion branches the flow of the refrigerant flowing out of the outdoor heat exchanger. The air-cooling expansion valve depressurizes one of the refrigerant branched at the branch portion. The indoor evaporator evaporates the refrigerant flowing out from the air-cooling expansion valve to cool the air before being heated by the heating unit. The air-cooling expansion valve depressurizes the other refrigerant branched at the branch portion. The cooler unit evaporates the refrigerant flowing out from the air-cooling expansion valve to cool the target object to be cooled. The merging unit merges the flow of the refrigerant flowing out of the indoor evaporator and the flow of the refrigerant flowing out of the cooler unit, and causes the refrigerant to flow out toward the suction port of the compressor. The bypass passage guides the refrigerant flowing out of the heating unit to the upstream side of the branch portion. The heating passage guides the refrigerant flowing out of the outdoor heat exchanger to the suction port of the compressor. The refrigerant circuit switching unit switches the refrigerant circuit.

In the series dehumidification heating mode, the refrigerant circuit switching unit sets the refrigerant circuit to circulates the refrigerant in order of the compressor, the heating unit, the air-heating expansion valve, the outdoor heat exchanger, the air-cooling expansion valve, the indoor evaporator, and the compressor. The series dehumidification heating mode is an operation mode in which the air cooled by the indoor evaporator is reheated by the heating unit.

In the parallel dehumidification heating mode, the refrigerant circuit switching unit circulates the refrigerant in order of the compressor, the heating unit, the air-heating expansion valve, the outdoor heat exchanger, the heating passage, and the compressor, and circulates the refrigerant in order of the compressor, the heating unit, the bypass passage, the air-cooling expansion circuit, the indoor evaporator, and the compressor. The parallel dehumidification heating mode is an operation mode in which the air cooled by the indoor evaporator is reheated by the heating unit with a heating capacity higher than that of the series dehumidification heating mode.

In the heating series cooler-unit mode, the refrigerant circuit switching unit switches the refrigerant circuit for circulating the refrigerant in order of the compressor, the heating unit, the air-heating expansion valve, the outdoor heat exchanger, the cooler-unit expansion valve, the cooler unit, and the compressor. The heating series cooler-unit mode is an operation mode in which the cooler unit cools the object to be cooled and the heating unit heats the air.

In the heating parallel cooler-unit mode, the refrigerant circuit switching unit circulates the refrigerant in order of the compressor, the heating unit, the air-heating expansion valve, the outdoor heat exchanger, the heating passage, and the compressor, and circulates the refrigerant in order of the compressor, the heating unit, the bypass passage, the cooler-unit expansion valve, the cooler unit, and the compressor. The heating parallel cooler-unit mode is an operation mode in which the cooler unit cools the object to be cooled and the heating unit heats the air with a heating capacity higher than that of the heating series cooler-unit mode.

Accordingly, in the series dehumidification heating mode and the parallel dehumidification heating mode, the air cooled and dehumidified by the indoor evaporator can be heated by the heating unit to have a desired temperature. That is, the air in the target space can be dehumidified and heated. At this time, the object to be cooled is not unnecessarily cooled even if it is cooled to a temperature at which the air can be dehumidified by the indoor evaporator.

Further, the refrigerant circuit switching unit switches the series dehumidification heating mode and the parallel dehumidification heating mode from each other, so that the heat exchange amount between the refrigerant and the outside air in the outdoor heat exchanger can be adjusted. Thereby, the capacity of heating the air in the heating unit can be adjusted. As a result, the temperature of the air can be continuously adjusted in a wide range in the heating unit.

In the heating series cooler-unit mode and the heating parallel cooler-unit mode, the cooler unit can cool the object to be cooled, and the heating unit can heat the air to a desired temperature. That is, it is possible to heat the target space. At this time, even if the capacity of cooling the cooling target exerted in the cooler unit is changed, the temperature of the air flowing into the heating unit is not changed.

Further, the refrigerant circuit switching unit switches between the series cooler-unit mode and the parallel cooler-unit mode from each other, so that the heat exchange amount between the refrigerant and the outside air in the outdoor heat exchanger can be adjusted. Accordingly, since the capacity of heating the air in the heating unit can be adjusted, the temperature of the air can be continuously adjusted in the heating unit within a wide range.

According to the refrigeration cycle device of the first aspect of the present disclosure, it is possible to provide a refrigeration cycle device capable of continuously adjusting the temperature of air within a wide range while appropriately adjusting the temperature of the target object to be cooled.

In addition to this, when adjusting the capacity of heating the air in the heating unit, a condition for switching between the series dehumidification heating mode and the parallel dehumidification heating mode, and a condition for switching between the heating series cooler-unit mode and the heating parallel cooler-unit mode can be set different from each other.

Therefore, when the object to be cooled is cooled by the cooler unit without cooling the air in the indoor evaporator, it is possible to prevent the heating series cooler-unit mode from being unnecessarily switched to the heating parallel cooler-unit mode. The temperature of the air can be appropriately adjusted in the heating unit.

Hereinafter, embodiments for implementing the present disclosure will be described referring to drawings. In the respective embodiments, parts corresponding to matters already described in the preceding embodiments are given reference numbers identical to reference numbers of the matters already described. The same description is therefore omitted depending on circumstances. In the case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

First Embodiment

A first embodiment will be described with reference to FIGS. 1 to 22. In the present embodiment, a refrigeration cycle device 10 is applied to a vehicle air conditioner 1 mounted on an electric vehicle that obtains a driving force for traveling from an electric motor. The vehicle air conditioner 1 has a function of adjusting the temperature of a battery 80 as well as performing the air conditioning of the vehicle cabin, which is a target space. Therefore, the vehicle air conditioner 1 can also be called an air conditioner with a battery temperature adjusting function.

The battery 80 is a secondary battery that stores electric power supplied to in-vehicle devices such as an electric motor. The battery 80 of this embodiment is a lithium-ion battery. The battery 80 is a so-called assembled battery formed by stacking plural battery cells 81 electrically connected in series or in parallel.

The output of this type of battery tends to decrease when the temperature becomes low, and the deterioration thereof easily progresses when the temperature becomes high. Therefore, the temperature of the battery needs to be maintained within an appropriate temperature range (higher than or equal to 15° C. and lower than or equal to 55° C. in the present embodiment) in which the charge/discharge capacity of the battery can be fully utilized.

Therefore, in the vehicle air conditioner 1, the battery 80 can be cooled by the cold heat generated by the refrigeration cycle device 10. Therefore, the cooling target different from the air is the battery 80 in the refrigeration cycle device 10 of the present embodiment.

The vehicle air conditioner 1 includes the refrigeration cycle device 10, an indoor air conditioning unit 30, a high temperature heat medium circuit 40, and a low temperature heat medium circuit 50, as shown in FIG. 1.

The refrigeration cycle device 10 cools air that is blown into the cabin to condition air in the cabin. Further, the high temperature heat medium circulating in the high temperature heat medium circuit 40 is heated in order to condition air for the cabin. Further, the refrigeration cycle device 10 cools the low temperature heat medium circulating in the low temperature heat medium circuit 50 in order to cool the battery 80.

The refrigeration cycle device 10 is configured to be able to switch the refrigerant circuits for various operation modes in order to condition air in the cabin. For example, the refrigeration cycle device 10 is able to switch the refrigerant circuit between a cooling mode, a heating mode, a dehumidification heating mode, and the like. Further, the refrigeration cycle device 10 can set the operation mode in which the battery 80 is cooled or the operation mode in which the battery 80 is not cooled in each operation mode for air conditioning.

The refrigeration cycle device 10 employs an HFO-based refrigerant (specifically, R1234yf) as a refrigerant, and forms a vapor compression subcritical refrigeration cycle in which the pressure of the discharged refrigerant discharged from the compressor 11 does not exceed the critical pressure of the refrigerant. Further, a refrigerator oil for lubricating the compressor 11 is mixed in the refrigerant. A part of the refrigerator oil circulates in the cycle together with the refrigerant.

The refrigeration cycle device 10 has the compressor 11 that draws in, compresses, and discharges the refrigerant in the refrigeration cycle device 10. The compressor 11 is located in the front of the vehicle cabin and is arranged in a drive device chamber that houses an electric motor and the like. The compressor 11 is an electric compressor that rotationally drives a fixed capacity type compression mechanism having a fixed discharge capacity by the electric motor. The rotation speed (that is, refrigerant discharge capacity) of the compressor 11 is controlled by a control signal output from the controller 60 described later.

A refrigerant inlet of a water-refrigerant heat exchanger 12 is connected to a discharge port of the compressor 11. The water-refrigerant heat exchanger 12 has a refrigerant passage through which the high-pressure refrigerant discharged from the compressor 11 flows and a water passage through which the high temperature heat medium circulating in the high temperature heat medium circuit 40 flows. The water-refrigerant heat exchanger 12 is a heating heat exchanger that heats the high temperature heat medium by exchanging heat between the high pressure refrigerant flowing through the refrigerant passage and the high temperature heat medium flowing through the water passage.

The outlet of the refrigerant passage of the water-refrigerant heat exchanger 12 is connected to an inlet of the first three-way joint 13a having three ports communicating with each other. The three-way joint may be formed by joining multiple pipes to each other, or may be formed by providing multiple refrigerant passages in a metal block or a resin block.

The refrigeration cycle device 10 includes second to sixth three-way joints 13b to 13f, as will be described later. The basic configuration of the second to sixth three-way joint 13b to 13f is similar to that of the first three-way joint 13a.

The inlet of the air-heating expansion valve 14a is connected to one outlet of the first three-way joint 13a. One inlet of the second three-way joint 13b is connected to the other outlet of the first three-way joint 13a via a bypass passage 22a. A dehumidification on-off valve 15a is arranged in the bypass passage 22a.

The dehumidification on-off valve 15a is a solenoid valve that opens and closes a refrigerant passage that connects the other outlet of the first three-way joint 13a to one inlet of the second three-way joint 13b. Further, the refrigeration cycle device 10 includes an air-heating on-off valve 15b, as described later. The basic configuration of the air-heating on-off valve 15b is the same as that of the dehumidification on-off valve 15a.

The dehumidification on-off valve 15a and the air-heating on-off valve 15b can switch the refrigerant circuit in each operation mode by opening and closing the refrigerant passage. Therefore, the dehumidification on-off valve 15a and the air-heating on-off valve 15b correspond to a refrigerant circuit switching unit that switches the refrigerant circuit of the cycle. The operations of the dehumidification on-off valve 15a and the air-heating on-off valve 15b are controlled by the control voltage output from the controller 60.

The air-heating expansion valve 14a is a heating decompression unit that decompresses the high-pressure refrigerant flowing out of the refrigerant passage of the water-refrigerant heat exchanger 12, at least in the operation mode for heating the cabin, and that controls the flow rate (mass flow rate) of the refrigerant to the downstream side. The air-heating expansion valve 14a is an electric variable throttling mechanism including a valve body whose throttle opening can be changed and an electric actuator which changes the opening of the valve body.

Further, the refrigeration cycle device 10 includes an air-cooling expansion valve 14b and a cooler-unit expansion valve 14c, as described later. The basic configurations of the air-cooling expansion valve 14b and the cooler-unit expansion valve 14c are similar to that of the air-heating expansion valve 14a.

The air-heating expansion valve 14a, the air-cooling expansion valve 14b, and the cooler-unit expansion valve 14c have a fully open function and a fully closed function. The fully open function sets the valve opening as full open to provide a simple refrigerant passage without flow rate adjusting action and refrigerant decompressing action. The fully closed function closes the refrigerant passage by setting the valve opening as fully closed.

The air-heating expansion valve 14a, the air-cooling expansion valve 14b, and the cooler-unit expansion valve 14c can switch the refrigerant circuit in each operation mode by the fully open function and the fully closed function. Therefore, the air-heating expansion valve 14a, the air-cooling expansion valve 14b, and the cooler-unit expansion valve 14c of the present embodiment also have a function as a refrigerant circuit switching unit. The operations of the air-heating expansion valve 14a, the air-cooling expansion valve 14b, and the cooler-unit expansion valve 14c are controlled by a control signal (control pulse) output from the controller 60.

The refrigerant inlet of the outdoor heat exchanger 16 is connected to the outlet of the air-heating expansion valve 14a. The outdoor heat exchanger 16 causes heat exchange between the refrigerant flowing out from the air-heating expansion valve 14a and the outside air blown by a cooling fan (not shown). The outdoor heat exchanger 16 is arranged on the front side inside the drive device chamber. Therefore, wind caused when the vehicle travels can be applied to the outdoor heat exchanger 16.

A refrigerant outlet of the outdoor heat exchanger 16 is connected to an inflow port of the third three-way joint 13c. One inlet of the fourth three-way joint 13d is connected to one outlet of the third three-way joint 13c via the heating passage 22b. The air-heating on-off valve 15b for opening and closing the refrigerant passage is arranged in the heating passage 22b.

Another outflow port of the third three-way joint 13c is connected to another inflow port of the second three-way joint 13*b*. A check valve 17 is disposed in a refrigerant passage connecting the another outflow port of the third three-way joint 13*c* to the another inflow port of the second three-way joint 13*b*. The check valve 17 allows the refrigerant to flow from the third three-way joint 13*c* to the second three-way joint 13*b*, and prohibits the refrigerant from flowing from the second three-way joint 13*b* to the third three-way joint 13*c*.

An outflow port of the second three-way joint 13*b* is connected to an inflow port of the fifth three-way joint 13*e*. The inlet of the air-cooling expansion valve 14*b* is connected to one outlet of the fifth three-way joint 13*e*. The inlet of the cooler-unit expansion valve 14*c* is connected to the other outlet of the fifth three-way joint 13*e*.

The air-cooling expansion valve 14*b* is a cooling decompression unit that decompresses the refrigerant that has flowed out of the outdoor heat exchanger 16 and adjusts the flow rate of the refrigerant that flows out to the downstream side, at least in the operation mode in which the cabin is cooled.

The refrigerant inlet of the indoor evaporator 18 is connected to the outlet of the air-cooling expansion valve 14*b*. The indoor evaporator 18 is disposed in an air conditioning case 31 of the indoor air conditioning unit 30 described later. The indoor evaporator 18 is a cooling heat exchanger that performs heat exchange between a low-pressure refrigerant decompressed by the air-cooling expansion valve 14*b* and air supplied from a blower 32 to evaporate the low-pressure refrigerant. The low-pressure refrigerant exhibits a heat absorbing action to cool the air. The refrigerant outlet of the indoor evaporator 18 is connected to one inlet of the sixth three-way joint 13*f*.

The cooler-unit expansion valve 14*c* is a cooler-unit decompression unit that decompresses the refrigerant that has flowed out of the outdoor heat exchanger 16 and adjusts the flow rate of the refrigerant that flows out to the downstream side, at least in the operation mode in which the battery 80 is cooled.

The inlet of the refrigerant passage of the chiller 19 is connected to the outlet of the cooler-unit expansion valve 14*c*. The chiller 19 has a refrigerant passage through which a low-pressure refrigerant whose pressure has been reduced by the cooler-unit expansion valve 14*c* flows, and a water passage through which a low temperature heat medium circulating in the low temperature heat medium circuit 50 flows. The chiller 19 is an evaporator unit in which the low-pressure refrigerant flowing in the refrigerant passage and the low temperature heat medium flowing in the water passage exchange heat to evaporate the low-pressure refrigerant to exert a heat absorbing effect. The other inlet of the sixth three-way joint 13*f* is connected to the outlet of the refrigerant passage of the chiller 19.

An outflow port of the sixth three-way joint 13*f* is connected to an inlet of the evaporation pressure control valve 20. The evaporation pressure control valve 20 keeps a refrigerant evaporation pressure in the indoor evaporator 18 above or at a predetermined reference pressure in order to prevent frost formation on the indoor evaporator 18. The evaporation pressure control valve 20 includes a mechanical variable throttle mechanism that increases the valve opening in response to increase in pressure of refrigerant at the outlet of the indoor evaporator 18.

As a result, the evaporation pressure control valve 20 maintains the refrigerant evaporation temperature in the indoor evaporator 18 at or above a frost suppression temperature (1° C. in the present embodiment) capable of suppressing frost formation in the indoor evaporator 18.

Further, the evaporation pressure control valve 20 of the present embodiment is arranged downstream of the sixth three-way joint 13*f*, which is the merging portion, in the refrigerant flow. Therefore, the evaporation pressure control valve 20 also maintains the refrigerant evaporation temperature in the chiller 19 at or above the frost formation suppression temperature.

An outlet of the evaporation pressure control valve 20 is connected to another inflow port of the fourth three-way joint 13*d*. An outlet of the fourth three-way joint 13*d* is connected to an inlet of the accumulator 21. The accumulator 21 is a gas-liquid separator that separates gas and liquid of the refrigerant flowing into the accumulator 21 and stores therein surplus liquid-phase refrigerant of the cycle. A gas-phase refrigerant outlet of the accumulator 21 is connected to a suction port of the compressor 11.

As is clear from the above description, the fifth three-way joint 13*e* of the present embodiment functions as a branch portion that branches the flow of the refrigerant that has flowed out of the outdoor heat exchanger 16. The sixth three-way joint 13*f* is a merging portion that joins the flow of the refrigerant flowing out of the indoor evaporator 18 and the flow of the refrigerant flowing out of the chiller 19 to flow to the suction side of the compressor 11.

The indoor evaporator 18 and the chiller 19 are connected to each other in parallel with respect to the refrigerant flow. Further, the bypass passage 22*a* guides the refrigerant flowing out of the refrigerant passage of the water-refrigerant heat exchanger 12 to the upstream side of the branch portion. The heating passage 22*b* guides the refrigerant flowing out of the outdoor heat exchanger 16 to the suction port of the compressor 11.

Next, the high temperature heat medium circuit 40 will be described. The high temperature heat medium circuit 40 is a heat medium circulation circuit for circulating the high temperature heat medium. As the high temperature heat medium, ethylene glycol, dimethylpolysiloxane, a solution containing a nanofluid or the like, an antifreeze liquid or the like can be adopted. In the high temperature heat medium circuit 40, the water passage of the water-refrigerant heat exchanger 12, the high temperature heat medium pump 41, the heater core 42, and the like are arranged.

The high temperature heat medium pump 41 is a water pump that pumps the high temperature heat medium to the inlet of the water passage of the water-refrigerant heat exchanger 12. The high temperature heat medium pump 41 is an electric pump whose rotation speed (that is, pressure feeding capacity) is controlled by a control voltage output from the controller 60.

The heat medium inlet of the heater core 42 is connected to the outlet of the water passage of the water-refrigerant heat exchanger 12. The heater core 42 is a heat exchanger that heats the air by exchanging heat between the high temperature heat medium heated in the water-refrigerant heat exchanger 12 and the air that has passed through the indoor evaporator 18. The heater core 42 is arranged in the air conditioning case 31 of the indoor air conditioning unit 30. A suction port of the high temperature heat medium pump 41 is connected to a heat medium outlet of the heater core 42.

Therefore, in the high temperature heat medium circuit 40, the high temperature heat medium pump 41 adjusts the flow rate of the high temperature heat medium flowing into the heater core 42 so that the heat radiation amount of the high temperature heat medium in the heater core 42 to the air can be adjusted. That is, in the high temperature heat medium circuit 40, the high temperature heat medium pump 41 can adjust the heating amount of the air in the heater core 42 by adjusting the flow rate of the high temperature heat medium flowing into the heater core 42.

That is, in the present embodiment, the water-refrigerant heat exchanger 12 and the high temperature heat medium circuit 40 constitutes a heating unit for heating the air using the refrigerant discharged from the compressor 11 as a heat source.

Next, the low temperature heat medium circuit 50 will be described. The low temperature heat medium circuit 50 is a heat medium circulation circuit for circulating the low temperature heat medium. As the low temperature heat medium, the same fluid as the high temperature heat medium can be adopted. In the low temperature heat medium circuit 50, a water passage of the chiller 19, a low temperature heat medium pump 51, a cooling heat exchange section 52, a three-way valve 53, a low temperature radiator 54 and the like are arranged.

The low temperature heat medium pump 51 is a water pump that pumps the low temperature heat medium to the inlet of the water passage of the chiller 19. The basic configuration of the low temperature heat medium pump 51 is the same as that of the high temperature heat medium pump 41.

The inlet of the cooling heat exchange section 52 is connected to the outlet of the water passage of the chiller 19. The cooling heat exchange section 52 has plural heat medium passages made of metal and arranged so as to contact the battery cells 81 of the battery 80. The cooling heat exchange section 52 is a heat exchange unit that cools the battery 80 by exchanging heat between the low temperature heat medium flowing through the heat medium passage and the battery cells 81.

The cooling heat exchange section 52 may be formed by disposing the heat medium passage between the battery cells 81 stacked with each other. The cooling heat exchange section 52 may be formed integrally with the battery 80. For example, the heat medium passage may be provided in a dedicated case for housing the battery cells 81 stacked with each other, so as to be integrally formed with the battery 80.

The inlet of the three-way valve 53 is connected to the outlet of the cooling heat exchange section 52. The three-way valve 53 is an electric three-way flow rate control valve that has one inflow port and two outflow ports and is capable of continuously adjusting the passage area ratio of the two outflow ports. The operation of the three-way valve 53 is controlled by a control signal output from the controller 60.

The heat medium inlet of the low temperature radiator 54 is connected to one outlet of the three-way valve 53. The suction port of the low temperature heat medium pump 51 is connected to the other outlet of the three-way valve 53. Therefore, in the low temperature heat medium circuit 50, the three-way valve 53 continuously adjusts the flow rate of the low temperature heat medium flowing into the low temperature radiator 54, of the low temperature heat medium flowing out from the cooling heat exchange section 52.

The low temperature radiator 54 performs heat exchange between the low temperature heat medium flowing out from the cooling heat exchange section 52 and the outside air blown by an outside air fan (not shown), and radiates the heat of the low temperature heat medium to the outside air.

The low temperature radiator 54 is positioned at the front side in a drive device chamber. Therefore, the wind can be applied to the low temperature radiator 54 when the vehicle is traveling. Therefore, the low temperature radiator 54 may be integrally formed with the outdoor heat exchanger 16 and the like. The suction port of the low temperature heat medium pump 51 is connected to the heat medium outlet of the low temperature radiator 54.

Therefore, in the low temperature heat medium circuit 50, the low temperature heat medium pump 51 adjusts the flow rate of the low temperature heat medium flowing into the cooling heat exchange section 52. Thus, the amount of heat absorbed from the battery 80 by the low temperature heat medium in the cooling heat exchange section 52 can be adjusted. That is, in the present embodiment, the chiller 19 and the low temperature heat medium circuit 50 configure a cooler unit that evaporates the refrigerant flowing out from the cooler-unit expansion valve 14c to cool the battery 80.

Next, the indoor air conditioning unit 30 will be described. The indoor air conditioning unit 30 supplies air which has been conditioned in temperature by the refrigeration cycle device 10 to the cabin. The indoor air-conditioning unit 30 is disposed inside an instrument panel at the foremost part inside the cabin.

As shown in FIG. 1, the indoor air conditioning unit 30 houses the blower 32, the indoor evaporator 18, the heater core 42, and the like in an air passage formed in the air conditioning case 31 forming an outer shell thereof.

The air conditioning case 31 has the air passage for air supplied into the cabin. The air conditioning case 31 is formed of a resin (for example, polypropylene) having a certain degree of elasticity and also excellent in strength.

An inside-outside air switch device 33 is disposed at the most upstream side of the air conditioning case 31 in the air flow. The inside-outside air switch device 33 switchingly introduces an inside air (air inside the cabin) and an outside air (air outside the cabin) into the air conditioning case 31.

The inside-outside air switch device 33 continuously adjusts an opening area of an inside air introduction port through which the inside air is introduced into the air conditioning case 31 and an opening area of an outside air introduction port through which the outside air is introduced into the air conditioning case 31 by using an inside-outside air switch door to change an introduction ratio of the volume of the inside air to the volume of the outside air. The inside-outside air switch door is driven by an electric actuator for the inside-outside air switch door. Operation of the electric actuator is controlled in accordance with a control signal output from the controller 60.

The blower 32 is disposed downstream of the inside-outside air switch device 33 in flow of the air. The blower 32 blows air sucked through the inside-outside air switch device 33 toward the cabin. The blower 32 is an electric blower in which a centrifugal multi-blade fan is driven by an electric motor. A rotation speed (that is, an air blowing capacity) of the blower 32 is controlled by a control voltage output from the controller 60.

The indoor evaporator 18 and the heater core 42 are disposed in this order downstream of the blower 32 in flow of the air. In other words, the indoor evaporator 18 is disposed upstream of the heater core 42 in flow of the air.

In the air-conditioning case 31, a cold air bypass passage 35 is provided in which the air that has passed through the indoor evaporator 18 bypasses the heater core 42. An air mix door 34 is disposed in the air conditioning case 31 downstream of the indoor evaporator 18 in flow of the air and upstream of the heater core 42 in flow of the air.

The air mix door 34 is an air volume ratio control unit which controls a ratio of a volume of the air passing through the heater core 42 to a volume of the air passing through the cold air bypass passage 35 after passing through the indoor evaporator 18. The air mix door 34 is driven by an electric actuator for the air mix door. Operation of the electric actuator is controlled in accordance with a control signal output from the controller 60.

A mixing space is arranged downstream of the heater core 42 and the cold air bypass passage 35 in the air-conditioning case 31 in the flow of air. The mixing space is a space for mixing the air heated by the heater core 42 and the air that has passed through the cold air bypass passage 35 without being heated.

Furthermore, the air conditioning case 31 has an opening hole for blowing out the air mixed in the mixing space (that is, the conditioned air) into the cabin that is a target space, at the downstream side in the air flow.

The opening hole includes a face opening hole, a foot opening hole, and a defroster opening hole (any of them is not shown). The face opening hole is an opening hole for blowing the air toward an upper body of an occupant in the cabin. The foot opening hole is an opening hole for blowing the air toward a foot of the occupant. The defroster opening hole is an opening hole for blowing the air toward an inner surface of a windshield of the vehicle.

The face opening hole, the foot opening hole, and the defroster opening hole are respectively connected to a face blowing port, a foot blowing port, and a defroster blowing port (not shown) provided in the cabin through a duct defining an air passage.

The air mix door 34 adjusts an air volume ratio between an air volume passing through the heater core 42 and an air volume passing through the cold air bypass passage 35, thereby adjusting the temperature of the conditioned air mixed in the mixing space. As a result, the temperature of the air (conditioned air) blown from each of the blowing ports into the cabin can be adjusted.

Further, a face door, a foot door, and a defroster door (none of which are shown) are arranged upstream of the face opening hole, the foot opening hole, and the defroster opening hole in the air flow respectively. The face door adjusts an opening area of the face opening hole. The foot door adjusts an opening area of the foot opening hole. The defroster door adjusts an opening area of the defroster opening hole.

The face door, the foot door, and the defroster door form a blowout mode switching unit for switching the blowout modes. The doors are connected to an electric actuator for driving the blowout mode door through a link mechanism or the like, and are rotationally operated in conjunction with the actuator. Operation of the electric actuator is also controlled in accordance with a control signal output from the controller 60.

The blowout mode switched by the mode switching unit includes a face mode, a bi-level mode, and a foot mode, for example.

The face mode is a blowout mode in which the face opening is fully opened to blow out air therefrom toward the upper body of an occupant in the cabin. The bi-level mode is a blowout mode in which both the face opening and the foot opening are opened to blow out air therefrom toward the upper body and a foot area of the occupant in the cabin. In the foot mode, the foot opening is fully opened and the defroster blowing port is open by a small opening degree so that the air is blown mainly through the foot opening.

Further, the occupant can manually switch the blowout mode by operating a switch provided on the operation panel 70 to set the defroster mode. The defroster mode is a blowout mode in which the defroster opening is fully opened so that air is blown toward an inner face of the front windshield through the defroster opening.

Next, an electric control unit of the present embodiment will be described. The controller 60 includes a known microcomputer including CPU, ROM, RAM and the like, and peripheral circuits. The controller 60 performs various calculations and processes based on an air conditioning control program stored in the ROM, and controls the operations of the various control target devices 11, 14*a*-14*c*, 15*a*, 15*b*, 32, 41, 51, 53, and so on connected to an output of the controller 60.

Figure 2:
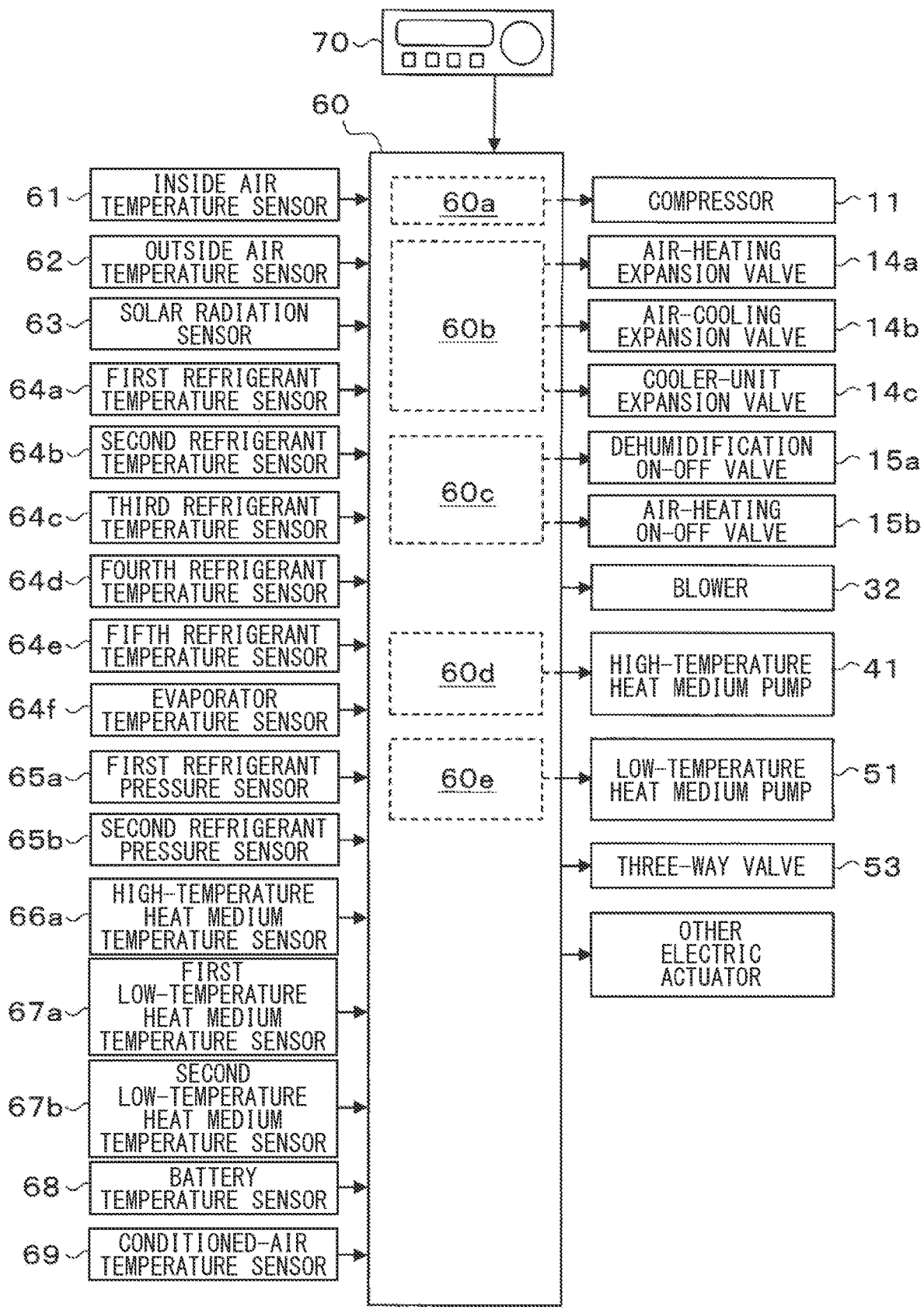
FIG. 2 is a block diagram showing an electric control unit of the vehicle air conditioner of the first embodiment.

As shown in FIG. 2, the input side of the controller 60 is connected with the inside air temperature sensor 61, the outside air temperature sensor 62, the solar radiation sensor 63, the first refrigerant temperature sensor 64*a* to the fifth refrigerant temperature sensor 64*e*, the evaporator temperature sensor 64*f*, the first refrigerant pressure sensor 65*a*, the second refrigerant pressure sensor 65*b*, the high temperature heat medium temperature sensor 66*a*, the first low temperature heat medium temperature sensor 67*a*, the second low temperature heat medium temperature sensor 67*b*, the battery temperature sensor 68, the conditioned air temperature sensor 69, and the like. The detection signals of the sensors are input to the controller 60.

The inside air temperature sensor 61 is an inside air temperature detector that detects a cabin interior temperature (inside air temperature) Tr. The outside air temperature sensor 62 is an outside air temperature detector that detects a cabin exterior temperature (outside air temperature) Tam. The solar radiation sensor 63 is a solar radiation detector that detects the solar radiation amount Ts that is emitted into the cabin.

The first refrigerant temperature sensor 64*a* is a discharged refrigerant temperature detector that detects the temperature T1 of the refrigerant discharged from the compressor 11. The second refrigerant temperature sensor 64*b* is a second refrigerant temperature detector that detects the temperature T2 of the refrigerant that has flowed out of the refrigerant passage of the water-refrigerant heat exchanger 12. The third refrigerant temperature sensor 64*c* is a third refrigerant temperature detector that detects the temperature T3 of the refrigerant that has flowed out of the outdoor heat exchanger 16.

The fourth refrigerant temperature sensor 64*d* is a fourth refrigerant temperature detector that detects the temperature T4 of the refrigerant that has flowed out of the indoor evaporator 18. The fifth refrigerant temperature sensor 64*e* is a fifth refrigerant temperature detector that detects the temperature T5 of the refrigerant flowing out from the refrigerant passage of the chiller 19.

The evaporator temperature sensor 64*f* is an evaporator temperature detector that detects a refrigerant evaporation temperature (evaporator temperature) Tefin in the indoor evaporator 18. The evaporator temperature sensor 64*f* of the present embodiment specifically detects the temperature of the heat exchange fin of the indoor evaporator 18.

The first refrigerant pressure sensor 65*a* is a first refrigerant pressure detector that detects the pressure P1 of the refrigerant flowing out of the refrigerant passage of the water-refrigerant heat exchanger 12. The second refrigerant pressure sensor 65*b* is a second refrigerant pressure detector that detects the pressure P2 of the refrigerant flowing out from the refrigerant passage of the chiller 19.

The high temperature heat medium temperature sensor 66*a* is a high temperature heat medium temperature detector that detects the high temperature heat medium temperature TWH, which is the temperature of the high temperature heat medium flowing out from the water passage of the water-refrigerant heat exchanger 12.

The first low temperature heat medium temperature sensor 67a is a first low temperature heat medium temperature detector that detects a first low temperature heat medium temperature TWL1 that is the temperature of the low temperature heat medium flowing out from the water passage of the chiller 19. The second low temperature heat medium temperature sensor 67b is a second low temperature heat medium temperature detector that detects a second low temperature heat medium temperature TWL2 that is the temperature of the low temperature heat medium flowing out from the cooling heat exchange section 52.

The battery temperature sensor 68 is a battery temperature detector that detects the battery temperature TB (that is, the temperature of the battery 80). The battery temperature sensor 68 of the present embodiment has plural temperature sensors and detects temperatures at plural locations of the battery 80. Therefore, the controller 60 can also detect the temperature difference between the respective locations of the battery 80. Further, as the battery temperature TB, the average value of the detection values of the temperature sensors is adopted.

The conditioned air temperature sensor 69 is a conditioned-air temperature detector that detects an air temperature TAV sent from the mixing space into the cabin.

Further, as shown in FIG. 2, the operation panel 70 arranged near the instrument panel in the front part of the cabin is connected to the input side of the controller 60. The operation panel 70 includes various operation switches, and operation signals are input to the controller 60 through the operation switches.

The operation switches provided on the operation panel 70 are, specifically, an auto switch, an air conditioner switch, an air volume setting switch, a temperature setting switch, a blowout mode changeover switch, and the like.

The auto switch is an operation unit that sets or cancels automatic control operation of the vehicle air conditioner. The air conditioner switch is an operation unit that requests the indoor evaporator 18 to cool the air. The air volume setting switch is an operation unit for manually setting the air volume of the blower 32. The temperature setting switch is an operation unit that sets the target temperature Tset in the cabin. The blowout mode changeover switch is an operation unit for manually setting the blowout mode.

The controller 60 of the present embodiment is integrally configured with a control unit that controls various control target devices connected to the output side thereof. Configurations (hardware and software) of the controller 60, which control operations of the respective control target devices, are the controllers controlling the operations of the corresponding control target devices.

For example, a part of the controller 60 that controls the refrigerant discharge capacity of the compressor 11 (specifically, the rotation speed of the compressor 11) constitutes a compressor control unit 60a. Further, the configuration that controls the operations of the air-heating expansion valve 14a, the air-cooling expansion valve 14b, and the cooler-unit expansion valve 14c constitutes an expansion valve control unit 60b. The configuration for controlling the operation of the dehumidification on-off valve 15a and the air-heating on-off valve 15b constitutes a refrigerant circuit switching control unit 60c.

The configuration for controlling the capability of the high temperature heat medium pump 41 pumping the high temperature heat medium constitutes a high temperature heat medium pump control unit 60d. The configuration for controlling the capability of the low temperature heat medium pump 51 pumping the low temperature heat medium constitutes a low temperature heat medium pump control unit 60e.

Operations by the above configuration according to the present embodiment will be described. As described above, the vehicle air conditioner 1 of the present embodiment not only has the function of conditioning air for the cabin, but also has the function of adjusting the temperature of the battery 80. Therefore, in the refrigeration cycle device 10, the refrigerant circuit can be switched to perform operations in the following 11 kinds of operation modes.

(1) Air-cooling mode: The air-cooling mode is an operation mode in which the air in the cabin is cooled by cooling air to be and blown into the cabin without cooling the battery 80.

(2) Series dehumidification heating mode: In the series dehumidification heating mode, air in the cabin is dehumidified and heated by reheating the air that has been cooled and dehumidified without cooling the battery 80.

(3) Parallel dehumidification heating mode: In the parallel dehumidification heating mode, air in the cabin is dehumidified and heated by reheating the air that has been cooled and dehumidified with a higher heating capacity than the series dehumidification heating mode without cooling the battery 80.

(4) Heating mode: The heating mode is an operation mode in which the air in the cabin is heated by heating the air to be blown into the cabin without cooling the battery 80.

(5) Air-cooling cooler-unit mode: The air-cooling cooler-unit mode is an operation mode in which the battery 80 is cooled, and the air is cooled and blown out into the cabin to cool the cabin.

(6) Series dehumidification heating cooler-unit mode: In the series dehumidification heating cooler-unit mode, the battery 80 is cooled, and the cooled and dehumidified air is reheated and blown into the cabin to dehumidify and heat the cabin.

(7) Parallel dehumidification heating cooler-unit mode: In the parallel dehumidification heating cooler-unit mode, the battery 80 is cooled, and the cooled and dehumidified air is reheated with a heating capacity higher than that of the series dehumidification heating cooler-unit mode.

(8) Heating cooler-unit mode: The heating cooler-unit mode is an operation mode in which the battery 80 is cooled and the air is heated and blown into the cabin to heat the cabin.

(9) Heating series cooler-unit mode: In the heating series cooler-unit mode, the battery 80 is cooled, and the air is heated with a heating capacity higher than that in the heating cooler-unit mode and blown into the cabin to heat the cabin.

(10) Heating parallel cooler-unit mode: In the heating parallel cooler-unit mode, the battery 80 is cooled, and the air is heated for the cabin by heating the air with a heating capacity higher than that of the heating series cooler-unit mode and blown into the cabin.

(11) Cooler-unit mode: The cooler-unit mode is an operation mode in which the battery 80 is cooled without conditioning air for the cabin.

The operation mode is changed by executing the air-conditioning control program. The air conditioning control program is executed when an automatic switch of the operation panel 70 is turned on by an occupant to set automatic control of the cabin. The air conditioning control program will be described with reference to FIGS. 3 to 22. Further, each control step shown in the flowchart of FIG. 3 and the like is a function realizing unit in the controller 60.

Figure 3:
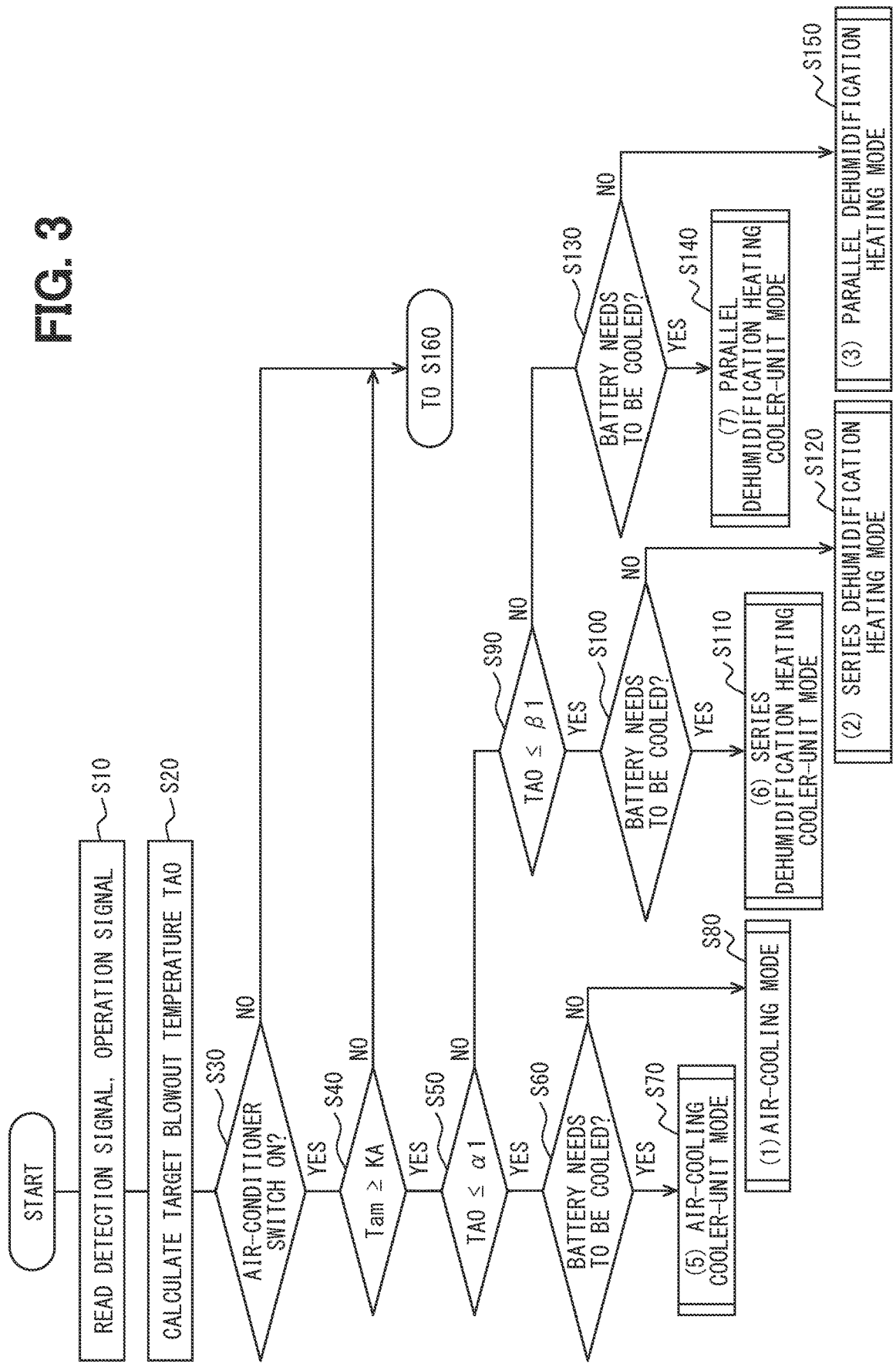
FIG. 3 is a flowchart showing a part of control processing of an air conditioning control program of the first embodiment.

First, in step S10 of FIG. 3, the detection signals of the sensors and the operation signal of the operation panel 70 are read. In the following step S20, the target blowout temperature TAO, which is the target temperature of the air blown into the cabin, is determined based on the detection signals and the operation signal read in step S10. Therefore, step S20 is a target blowout temperature determination unit.

Specifically, the target blowout temperature TAO is calculated by the following formula F1.

$$TAO=Kset \times Tset-Kr \times Tr-Kam \times Tam-Ks \times Ts+C \quad (F1)$$

Note that Tset is a cabin temperature set by the temperature setting switch. Tr is the cabin inside temperature detected by the inside air sensor. Tam is the cabin outside temperature detected by the outside air sensor. Ts is a solar radiation amount detected by the solar radiation sensor. Kset, Kr, Kam, and Ks are control gains, and C is a constant for correction.

Next, in step S30, it is determined whether the air conditioner switch is turned on. The fact that the air conditioner switch is turned on means that the occupant has requested cooling or dehumidification of the cabin. In other words, turning on the air conditioner switch means that the indoor evaporator 18 is required to cool the air.

When it is determined in step S30 that the air conditioner switch is turned on, the process proceeds to step S40. When it is determined in step S30 that the air conditioner switch is not turned on, the process proceeds to step S160.

In step S40, it is determined whether the outside air temperature Tam is equal to or higher than a predetermined reference outside air temperature KA (0° C. in this embodiment). The reference outside air temperature KA is set so that cooling the air by the indoor evaporator 18 is effective for cooling or dehumidifying the target space to be conditioned.

More specifically, in the present embodiment, in order to suppress frost formation on the indoor evaporator 18, the evaporation pressure control valve 20 keeps the refrigerant evaporation temperature in the indoor evaporator 18 at or above a frost formation suppression temperature (1° C. in the present embodiment). Therefore, the indoor evaporator 18 cannot cool the air to a temperature lower than the frost formation suppression temperature.

That is, when the temperature of the air flowing into the indoor evaporator 18 is lower than the frost formation suppression temperature, it is not effective to cool the air by the indoor evaporator 18. Therefore, the reference outside air temperature KA is set to a value lower than the frost formation suppression temperature. When the outside air temperature Tam is lower than the reference outside air temperature KA, the indoor evaporator 18 does not cool the air.

When it is determined in step S40 that the outside air temperature Tam is equal to or higher than the reference outside air temperature KA, the process proceeds to step S50. When it is determined in step S40 that the outside air temperature Tam is not equal to or higher than the reference outside air temperature KA, the process proceeds to step S160.

Figure 5:
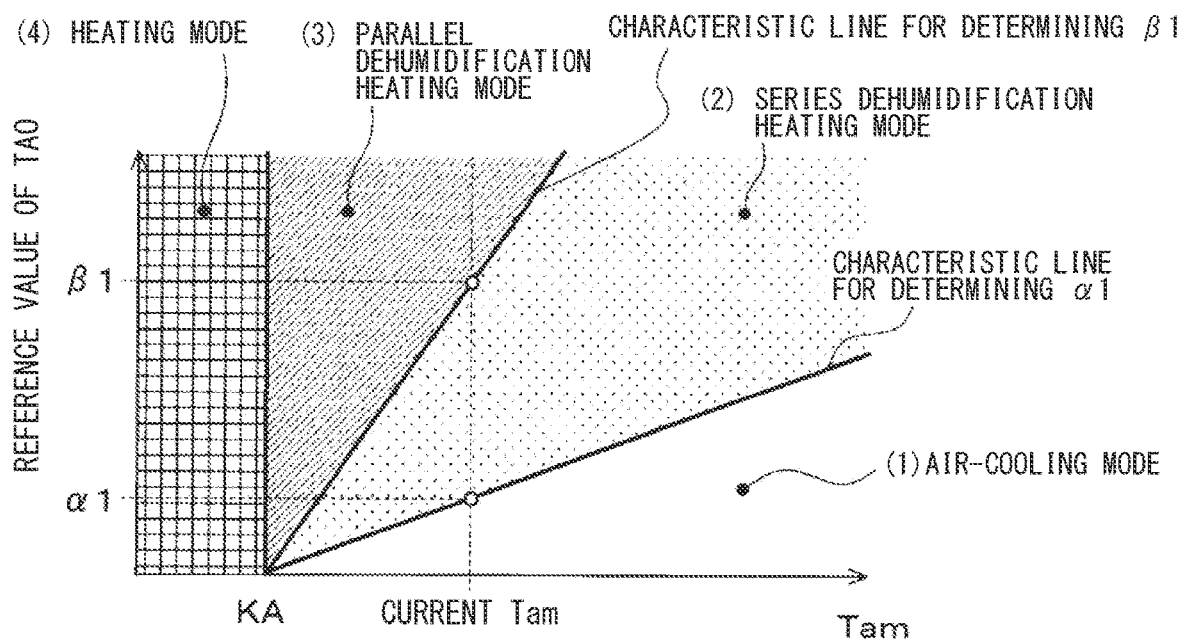
FIG. 5 is a control characteristic diagram for switching the operation mode of the air conditioning control program of the first embodiment.

In step S50, it is determined whether the target blowout temperature TAO is equal to or lower than a cooling reference temperature $\alpha 1$. The cooling reference temperature $\alpha 1$ is determined based on the outside air temperature Tam by referring to a control map stored in advance in the controller 60. In the present embodiment, as shown in FIG. 5, the cooling reference temperature $\alpha 1$ is determined to be a low value as the outside air temperature Tam decreases.

When it is determined in step S50 that the target blowout temperature TAO is equal to or lower than the cooling reference temperature $\alpha 1$, the process proceeds to step S60. When it is determined in step S50 that the target blowout temperature TAO is not lower than or equal to the cooling reference temperature $\alpha 1$, the process proceeds to step S90.

In step S60, it is determined whether the battery 80 needs to be cooled. Specifically, in the present embodiment, the battery 80 is to be cooled when the battery temperature TB detected by the battery temperature sensor 68 is equal to or higher than a predetermined reference cooling temperature KTB (35° C. in the present embodiment). When the battery temperature TB is lower than the reference cooling temperature KTB, it is determined that the battery 80 does not need to be cooled.

When it is determined in step S60 that the battery 80 needs to be cooled, the process proceeds to step S70, and (5) Air-cooling cooler-unit mode is selected as the operation mode. When it is determined in step S60 that the battery 80 does not need to be cooled, the process proceeds to step S80, and (1) Air-cooling mode is selected as the operation mode.

In step S90, it is determined whether the target blowout temperature TAO is equal to or lower than the dehumidification reference temperature $\beta 1$. The dehumidification reference temperature $\beta 1$ is determined based on the outside air temperature Tam by referring to a control map stored in advance in the controller 60.

In the present embodiment, as shown in FIG. 5, similarly to the cooling reference temperature $\alpha 1$, the dehumidification reference temperature $\beta 1$ is determined to be a low value as the outside air temperature Tam decreases. Further, the dehumidification reference temperature $\beta 1$ is determined to be a value higher than the cooling reference temperature $\alpha 1$.

When it is determined in step S90 that the target blowout temperature TAO is lower than or equal to the dehumidification reference temperature $\beta 1$, the process proceeds to step S100. When it is determined in step S90 that the target blowout temperature TAO is not lower than or equal to the dehumidification reference temperature $\beta 1$, the process proceeds to step S130.

In step S100, as in step S60, it is determined whether the battery 80 needs to be cooled.

When it is determined in step S100 that the battery 80 needs to be cooled, the process proceeds to step S110, and (6) Series dehumidification heating cooler-unit mode is selected as the operation mode of the refrigeration cycle device 10. When it is determined in step S100 that the battery 80 does not need to be cooled, the process proceeds to step S120, and (2) Series dehumidification heating mode is selected as the operation mode.

In step S130, as in step S60, it is determined whether the battery 80 needs to be cooled.

When it is determined in step S130 that the battery 80 needs to be cooled, the process proceeds to step S140, and (7) Parallel dehumidification heating cooler-unit mode is selected as the operation mode of the refrigeration cycle device 10. When it is determined in step S100 that the battery 80 does not need to be cooled, the process proceeds to step S150, and (3) Parallel dehumidification heating mode is selected as the operation mode.

Figure 4:
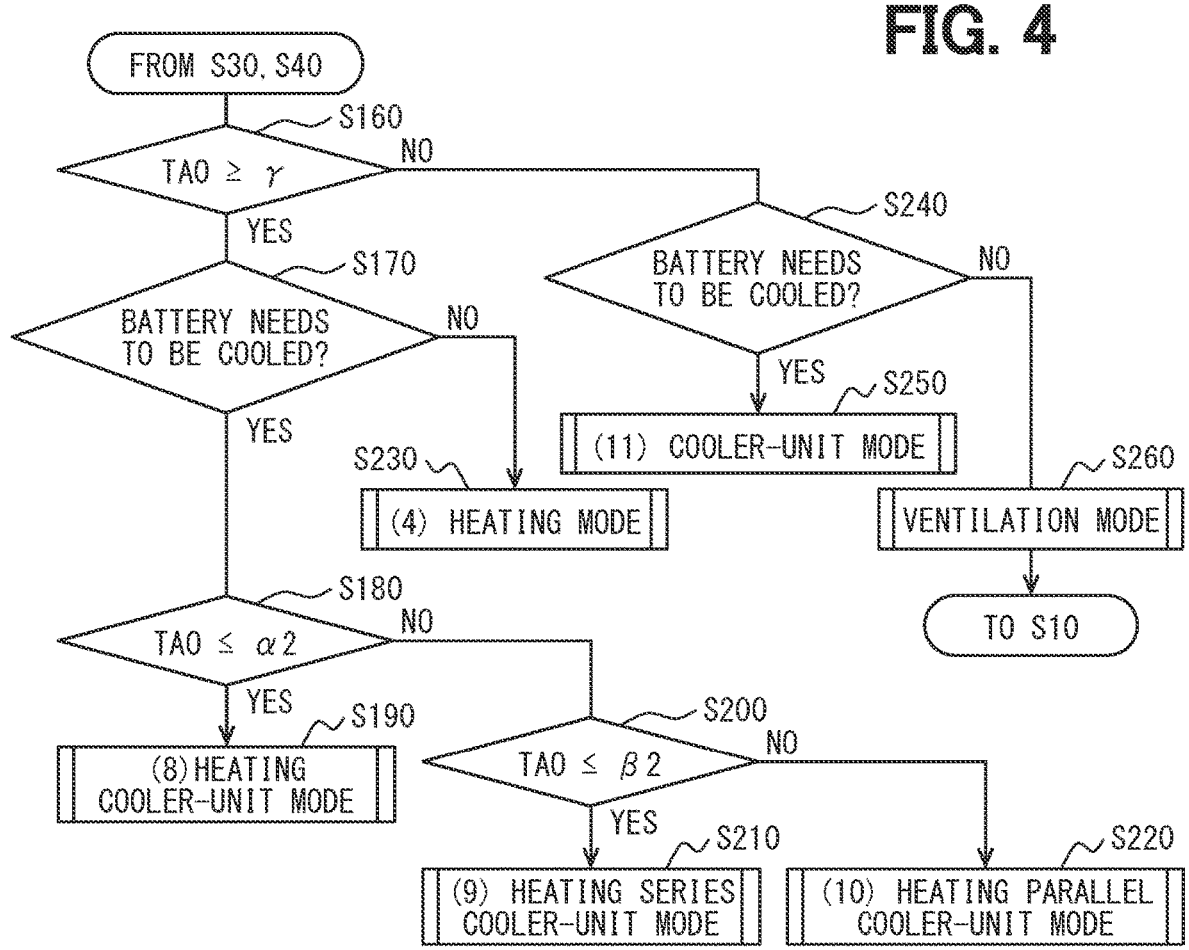
FIG. 4 is a flowchart showing another part of the control processing of the air conditioning control program of the first embodiment.

Subsequently, a case where the process proceeds from step S30 or step S40 to step S160 will be described. When the process proceeds from step S30 or step S40 to step S160, it is determined that cooling the air by the indoor evaporator 18 is not effective. In step S160, as shown in FIG. 4, it is determined whether the target blowout temperature TAO is equal to or higher than the heating reference temperature γ.

Figure 6:
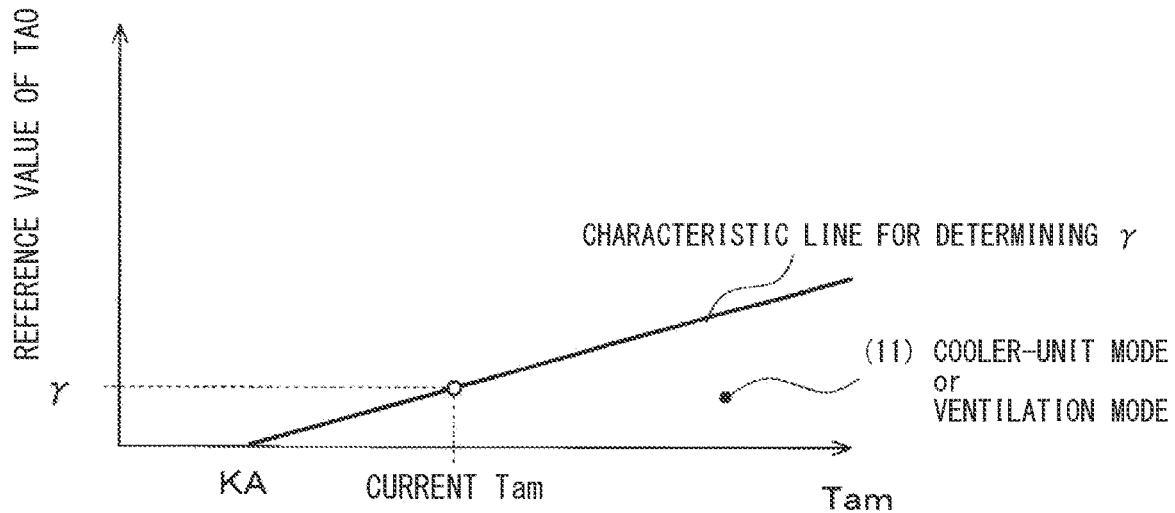
FIG. 6 is another control characteristic diagram for switching the operation mode of the air conditioning control program of the first embodiment.

The heating reference temperature γ is determined based on the outside air temperature Tam by referring to a control map stored in advance in the controller 60. In the present embodiment, as shown in FIG. 6, the heating reference temperature γ is determined to have a low value as the outside air temperature Tam decreases. The heating reference temperature γ is set so that heating the air by the heater core 42 is effective for heating the target space.

When it is determined in step S160 that the target blowout temperature TAO is equal to or higher than the heating reference temperature γ, it is a case where the air needs to be heated by the heater core 42, and the process proceeds to step S170. When it is determined in step S160 that the target blowout temperature TAO is not equal to or higher than the heating reference temperature γ, it is not necessary to heat the air by the heater core 42, and the process proceeds to step S240.

In step S170, similarly to step S60, it is determined whether the battery 80 needs to be cooled.

When it is determined in step S170 that the battery 80 needs to be cooled, the process proceeds to step S180. When it is determined in step S170 that the battery 80 does not need to be cooled, the process proceeds to step S230, and (4) Heating mode is selected as the operation mode.

When it is determined in step S170 that the battery 80 needs to be cooled and the process proceeds to step S180, it is necessary to perform both heating of the cabin and cooling of the battery 80. Therefore, in the refrigeration cycle device 10, it is need to appropriately control the heat dissipation amount of the refrigerant radiated to the high temperature heat medium in the water-refrigerant heat exchanger 12 and the heat absorption amount of the refrigerant absorbing from the low temperature heat medium in the chiller 19.

Therefore, in the refrigeration cycle device 10 of the present embodiment, when it is necessary to both heat the cabin and cool the battery 80, the operation mode is switched as shown in steps S180 to S220 of FIG. 4. Specifically, the operation mode is set among three modes such as (8) Heating cooler-unit mode, (9) Heating series cooler-unit mode, and (10) Heating parallel cooler-unit mode.

First, in step S180, it is determined whether the target blowout temperature TAO is lower than or equal to the low temperature cooling reference temperature α2. The low temperature cooling reference temperature α2 is determined based on the outside air temperature Tam by referring to a control map stored in advance in the controller 60.

Figure 7:
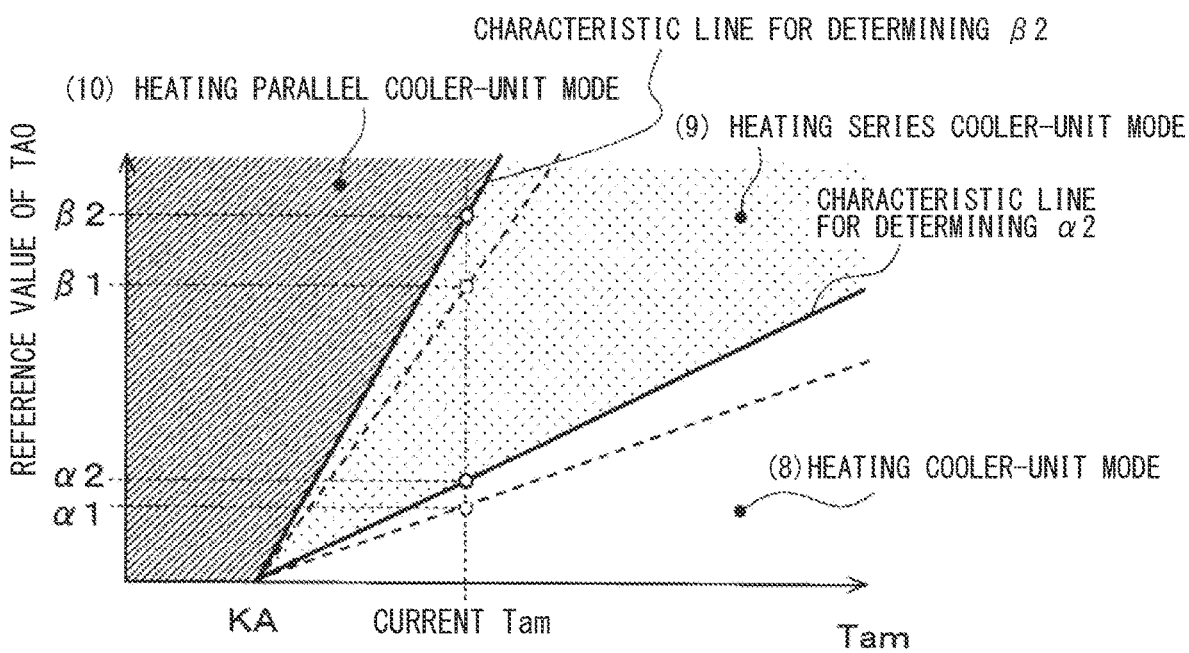
FIG. 7 is another control characteristic diagram for switching the operation mode of the air conditioning control program of the first embodiment.

In the present embodiment, as shown in FIG. 7, the low temperature cooling reference temperature α2 is determined to be a lower value as the outside air temperature Tam decreases. Further, at the same outside temperature Tam, the low temperature cooling reference temperature α2 is determined to be a value higher than the cooling reference temperature α1.

When it is determined in step S180 that the target blowout temperature TAO is lower than or equal to the low temperature cooling reference temperature α2, the process proceeds to step S190, and (8) Heating cooler-unit mode is selected as the operation mode. When it is determined in step S180 that the target blowout temperature TAO is not lower than or equal to the low temperature cooling reference temperature α2, the process proceeds to step S200.

In step S200, it is determined whether the target blowout temperature TAO is equal to or lower than the high temperature cooling reference temperature β2. The high temperature cooling reference temperature β2 is determined based on the outside air temperature Tam by referring to a control map stored in the controller 60 in advance.

In the present embodiment, as shown in FIG. 7, similarly to the low temperature cooling reference temperature α2, the high temperature cooling reference temperature β2 is determined to be a lower value as the outside air temperature Tam decreases. Further, the high temperature cooling reference temperature β2 is determined to be a value higher than the low temperature cooling reference temperature α2. Further, at the same outside temperature Tam, the high temperature cooling reference temperature β2 is determined to be higher than the dehumidification reference temperature β1.

When it is determined in step S200 that the target blowout temperature TAO is equal to or lower than the high temperature cooling reference temperature β2, the process proceeds to step S210, and (9) Heating series cooler-unit mode is selected as the operation mode. When it is determined in step S200 that the target blowout temperature TAO is not lower than or equal to the high temperature cooling reference temperature β2, the process proceeds to step S220, and (10) Heating parallel cooler-unit mode is selected as the operation mode.

Subsequently, a case where the process proceeds from step S160 to step S240 will be described. When the process proceeds from step S160 to step S240, it is not necessary to heat the air by the heater core 42. Therefore, in step S240, similarly to step S60, it is determined whether the battery 80 needs to be cooled.

When it is determined in step S240 that the battery 80 needs to be cooled, the process proceeds to step S250, and (11) Cooler-unit mode is selected as the operation mode. When it is determined in step S200 that the battery 80 does not need to be cooled, the process proceeds to step S260 to select the ventilation mode as the operation mode, and the process returns to step S10.

The ventilation mode is an operation mode in which the compressor 11 is stopped and the blower 32 is operated according to the setting signal set by the air volume setting switch. In addition, in step S240, when it is determined that the cooling of the battery 80 is not necessary, it is not necessary to operate the refrigeration cycle device 10 for conditioning air of the cabin and for cooling the battery.

In the air conditioning control program of the present embodiment, the operation mode of the refrigeration cycle device 10 is switched as described above. Furthermore, the air conditioning control program controls not only the operation of component of the refrigeration cycle device 10 but also the operation of other component. Specifically, the air conditioning control program controls the high temperature heat medium pump 41 of the high temperature heat medium circuit 40 forming the heating unit, and the low temperature heat medium pump 51 and the three-way valve 53 of the low temperature heat medium circuit 50 forming the cooler unit.

Specifically, the controller 60 controls the operation of the high temperature heat medium pump 41 so as to exert the reference pumping capability for each predetermined operation mode regardless of the operation mode of the refrigeration cycle device 10.

Therefore, in the high temperature heat medium circuit 40, when the high temperature heat medium is heated in the water passage of the water-refrigerant heat exchanger 12, the heated high temperature heat medium is pumped to the heater core 42. The high temperature heat medium that has flowed into the heater core 42 exchanges heat with the air. Accordingly, the air to be sent into the cabin is heated. The high temperature heat medium that has flowed out of the heater core 42 is sucked into the high temperature heat medium pump 41 and is pumped to the water-refrigerant heat exchanger 12.

Further, the controller 60 controls the operation of the low temperature heat medium pump 51 so as to exert the reference pumping capability for each predetermined operation mode regardless of the operation mode of the refrigeration cycle device 10.

Further, when the second low temperature heat medium temperature TWL2 is equal to or higher than the outside air temperature Tam, the controller 60 causes the low temperature heat medium flowing out from the cooling heat exchange section 52 to flow into the low temperature radiator 54 by controlling the operation of the three-way valve 53. The second low temperature heat medium temperature TWL2 is detected by the second low temperature heat medium temperature sensor 67b.

When the second low temperature heat medium temperature TWL2 is not equal to or higher than the outside air temperature Tam, the operation of the valve 53 is controlled such that the low temperature heat medium flowing out from the cooling heat exchange section 52 is sucked into the suction port of the low temperature heat medium pump 51.

Therefore, in the low temperature heat medium circuit 50, the low temperature heat medium is cooled in the water passage of the chiller 19, and the cooled low temperature heat medium is pumped to the cooling heat exchange section 52. The low temperature heat medium that has flowed into the cooling heat exchange section 52 absorbs heat from the battery 80. Consequently, the battery 80 is cooled. The low temperature heat medium flowing out from the cooling heat exchange section 52 flows into the three-way valve 53.

At this time, when the second low temperature heat medium temperature TWL2 is equal to or higher than the outside air temperature Tam, the low temperature heat medium flowing out from the cooling heat exchange section 52 flows into the low temperature radiator 54 and radiates heat to the outside air. Thereby, the low temperature heat medium is cooled to be equal to the outside air temperature Tam. The low temperature heat medium flowing out from the low temperature radiator 54 is sucked into the low temperature heat medium pump 51 and pressure-fed to the chiller 19.

When the second low temperature heat medium temperature TWL2 is lower than the outside air temperature Tam, the low temperature heat medium flowing out of the cooling heat exchange section 52 is sucked into the low temperature heat medium pump 51 and pumped to the chiller 19. Therefore, the temperature of the low temperature heat medium sucked into the low temperature heat medium pump 51 becomes equal to or lower than the outside air temperature Tam.

The detailed operation of the vehicle air conditioner 1 in each operation mode will be described below. The control map referred to in each operation mode described below is stored in the controller 60 in advance for each operation mode. The control maps corresponding to the operation modes may be equivalent to each other or may be different from each other.

(1) Air-Cooling Mode

Figure 8:
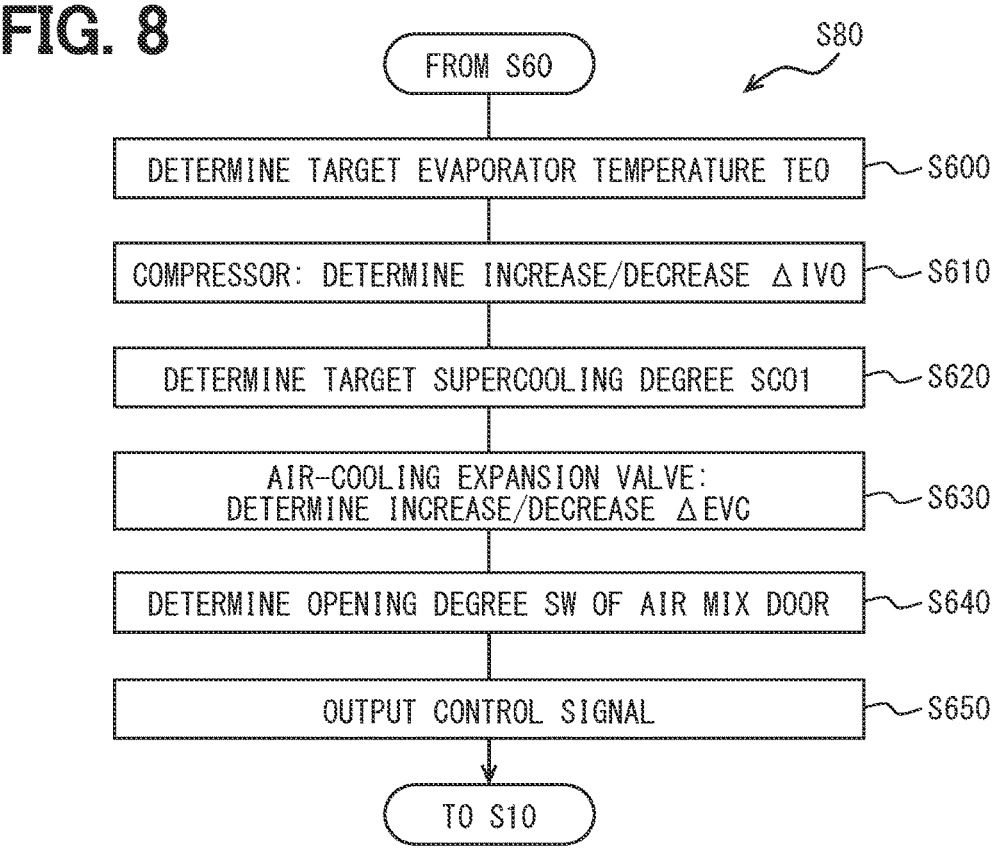
FIG. 8 is a flowchart showing a control process in a cooling mode of the first embodiment.

In the air-cooling mode, the controller 60 executes the control flow of the air-cooling mode shown in FIG. 8. First, in step S600, the target evaporator temperature TEO is determined. The target evaporator temperature TEO is determined based on the target blowout temperature TAO with reference to the control map stored in the controller 60. In the control map of the present embodiment, the target evaporator temperature TEO is increased as the target blowout temperature TAO increases.

In step S610, the increase/decrease amount ΔIVO in the rotation number of the compressor 11 is determined. The increase/decrease amount ΔIVO is determined based on a deviation between the target evaporator temperature TEO and the evaporator temperature Tefin detected by the evaporator temperature sensor 64f so that the evaporator temperature Tefin approaches the target evaporator temperature TEO by a feedback control method.

In step S620, the target supercooling degree SCO1 of the refrigerant flowing out of the outdoor heat exchanger 16 is determined. The target supercooling degree SCO1 is determined by referring to the control map, for example, based on the outside air temperature Tam. In the control map of this embodiment, the target supercooling degree SCO1 is determined so that the coefficient of performance (COP) of the cycle approaches the maximum value.

In step S630, the increase/decrease amount ΔEVC of the throttle opening of the air-cooling expansion valve 14b is determined. The increase/decrease amount ΔEVC is determined based on the deviation between the target supercooling degree SCO1 and the supercooling degree SC1 of the refrigerant on the outlet side of the outdoor heat exchanger 16 by a feedback control method such that the supercooling degree SC1 of the refrigerant on the outlet side of the outdoor heat exchanger 16 approaches the target supercooling degree SCO1.

The supercooling degree SC1 of the refrigerant on the outlet side of the outdoor heat exchanger 16 is calculated based on the temperature T3 detected by the third refrigerant temperature sensor 64c and the pressure P1 detected by the first refrigerant pressure sensor 65a.

In step S640, the opening degree SW of the air mix door 34 is calculated using the following formula F2.

$$SW = \{TAO - (Tefin + C2)\} / \{TWH - (Tefin + C2)\} \quad (F2)$$

TWH is the high temperature heat medium temperature detected by the high temperature heat medium temperature sensor 66a. C2 is a constant for control.

In step S650, in order to switch the refrigeration cycle device 10 to the refrigerant circuit in the air-cooling mode, the air-heating expansion valve 14a is fully opened, the air-cooling expansion valve 14b is set to the throttled state to exert the refrigerant depressurizing effect, and the cooler-unit expansion valve 14c is fully closed. Further, the dehumidification on-off valve 15a is closed and the air-heating on-off valve 15b is closed. Furthermore, a control signal or control voltage is output to each control target device so that the control state determined in steps S610, S630, and S640 is obtained, and the process returns to step S10.

Therefore, in the refrigeration cycle device 10 in the air-cooling mode, the vapor compression refrigeration cycle is defined to circulate the refrigerant in order of the compressor 11, the water-refrigerant heat exchanger 12 (the air-heating expansion valve 14a), the outdoor heat exchanger 16, the check valve 17, the air-cooling expansion valve 14b, the indoor evaporator 18, the evaporation pressure control valve 20, the accumulator 21, and the compressor 11.

That is, in the refrigeration cycle device 10 in the air-cooling mode, the water-refrigerant heat exchanger 12 and the outdoor heat exchanger 16 function as radiator that radiate the heat of refrigerant discharged from the compressor 11. Then, the air-cooling expansion valve 14b functions as a decompression unit that decompresses the refrigerant.

Then, a vapor compression refrigeration cycle is configured in which the indoor evaporator 18 functions as an evaporator.

According to this, the air can be cooled by the indoor evaporator 18, and the high temperature heat medium can be heated by the water-refrigerant heat exchanger 12.

Therefore, in the vehicle air conditioner 1 in the air-cooling mode, the heater core 42 reheats a part of the air cooled by the indoor evaporator 18 by adjusting the opening degree of the air mix door 34. Then, the air whose temperature is adjusted so as to approach the target blowout temperature TAO is blown into the cabin, whereby the cabin can be cooled.

(2) Series Dehumidification Heating Mode

Figure 9:
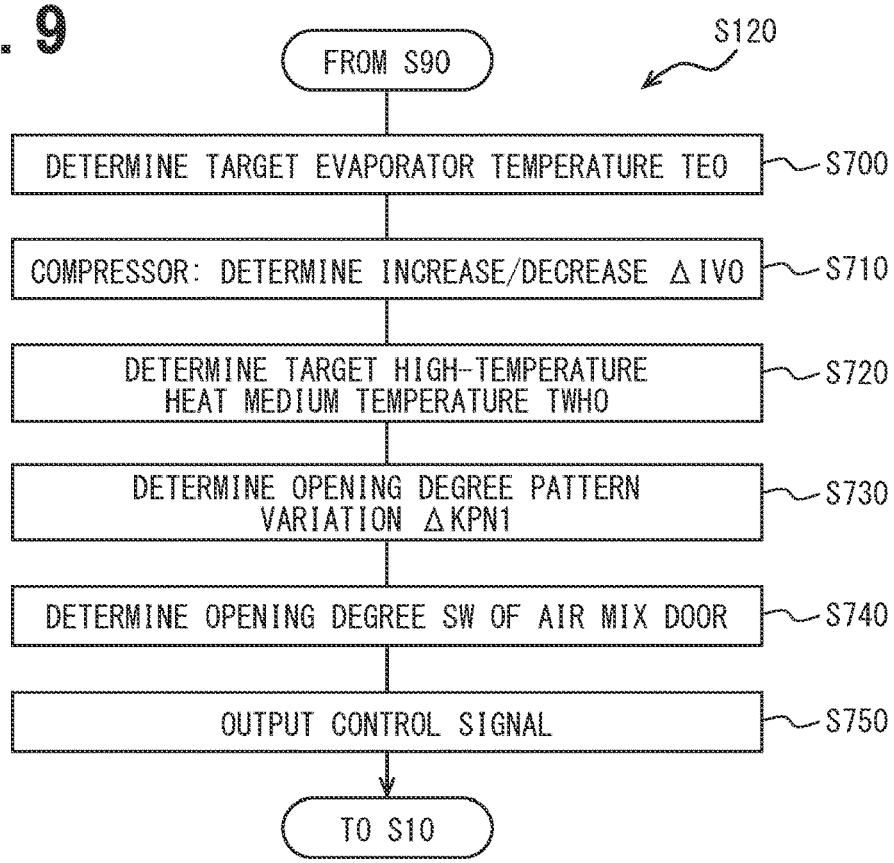
FIG. 9 is a flowchart showing a control process in a series dehumidification heating mode of the first embodiment.

In the series dehumidification heating mode, the controller 60 executes the control flow of the series dehumidification heating mode shown in FIG. 9. First, in step S700, the target evaporator temperature TEO is determined as in the air-cooling mode. In step S710, the increase/decrease amount ΔIVO in the rotation number of the compressor 11 is determined as in the air-cooling mode.

In step S720, the target high temperature heat medium temperature TWHO of the high temperature heat medium is determined so that the air can be heated by the heater core 42. The target high temperature heat medium temperature TWHO is determined with reference to the control map based on the target blowout temperature TAO and the efficiency of the heater core 42. In the control map of the present embodiment, the target high temperature heat medium temperature TWHO is increased as the target blowout temperature TAO increases.

In step S730, the variation ΔKPN1 of the opening degree pattern KPN1 is determined. The opening degree pattern KPN1 is a parameter for determining the combination of the throttle opening degree of the air-heating expansion valve 14a and the throttle opening degree of the air-cooling expansion valve 14b.

Figure 10:
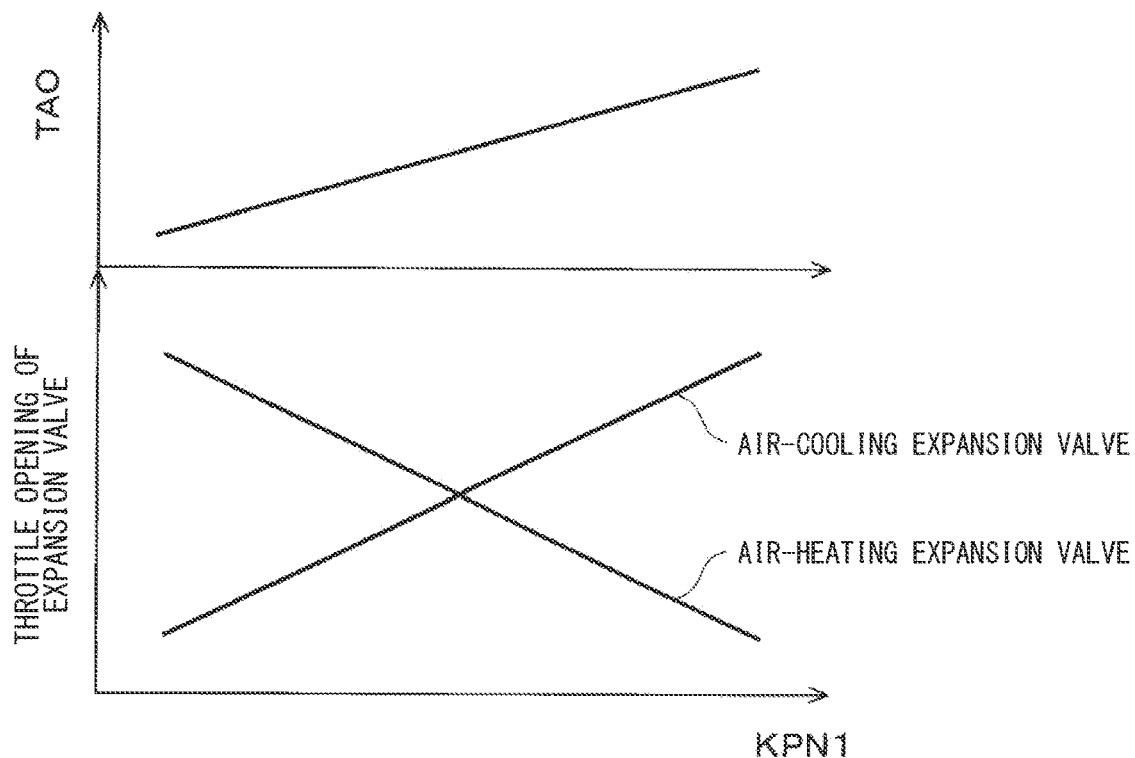
FIG. 10 is a control characteristic diagram for determining an opening pattern of an air-heating expansion valve and an air-cooling expansion valve in the series dehumidification heating mode of the first embodiment.

Specifically, in the series dehumidification heating mode, as shown in FIG. 10, the opening degree pattern KPN1 increases as the target blowout temperature TAO increases. As the opening degree pattern KPN1 increases, the throttle opening degree of the air-heating expansion valve 14a decreases, and the throttle opening degree of the air-cooling expansion valve 14b increases.

In step S740, the opening degree SW of the air mix door 34 is calculated as in the air-cooling mode. In the series dehumidification heating mode, the target blowout temperature TAO is higher than in the air-cooling mode, so the opening degree SW of the air mix door 34 approaches 100%. Therefore, in the series dehumidification heating mode, the opening degree of the air mix door 34 is determined so that almost the entire flow of the air passing through the indoor evaporator 18 passes through the heater core 42.

In step S750, in order to switch the refrigeration cycle device 10 to the refrigerant circuit in the series dehumidification heating mode, the air-heating expansion valve 14a is in the throttled state, the air-cooling expansion valve 14b is in the throttled state, and the cooler-unit expansion valve 14c is fully closed. Further, the dehumidification on-off valve 15a is closed and the air-heating on-off valve 15b is closed. Further, a control signal or control voltage is output to each control target device so that the control state determined in steps S710, S730, and S740 is obtained, and the process returns to step S10.

Therefore, in the refrigeration cycle device 10 in the series dehumidification heating mode, a vapor compression refrigeration cycle is formed to circulate the refrigerant in order of the compressor 11, the water-refrigerant heat exchanger 12, the air-heating expansion valve 14a, the outdoor heat exchanger 16, the check valve 17, the air-cooling expansion valve 14b, the indoor evaporator 18, the evaporation pressure control valve 20, the accumulator 21, and the compressor 11.

That is, in the refrigeration cycle device 10 in the series dehumidification heating mode, the water-refrigerant heat exchanger 12 functions as a radiator that radiates the heat of refrigerant discharged from the compressor 11. The air-heating expansion valve 14a and the air-cooling expansion valve 14b function as a pressure reducing unit. Then, a vapor compression refrigeration cycle in which the indoor evaporator 18 functions as an evaporator is configured.

Further, when the saturation temperature of the refrigerant in the outdoor heat exchanger 16 is higher than the outside air temperature Tam, the cycle in which the outdoor heat exchanger 16 functions as a radiator is configured. When the saturation temperature of the refrigerant in the outdoor heat exchanger 16 is lower than the outside air temperature Tam, the outdoor heat exchanger 16 functions as an evaporator in the cycle.

According to this, the air can be cooled by the indoor evaporator 18, and the high temperature heat medium can be heated by the water-refrigerant heat exchanger 12. Therefore, in the vehicle air conditioner 1 in the series dehumidification heating mode, the air cooled and dehumidified by the indoor evaporator 18 is reheated by the heater core 42 and blown into the cabin to dehumidify and heat the cabin.

When the saturation temperature of the refrigerant in the outdoor heat exchanger 16 is higher than the outside air temperature Tam, the opening degree pattern KPN1 is increased as the target blowout temperature TAO rises. As a result, the saturation temperature of the refrigerant in the outdoor heat exchanger 16 is lowered and the difference from the outside air temperature Tam is reduced. Thus, the heat radiation amount of the refrigerant in the outdoor heat exchanger 16 can be reduced, and the heat radiation amount of the refrigerant in the water-refrigerant heat exchanger 12 can be increased.

Further, when the saturation temperature of the refrigerant in the outdoor heat exchanger 16 is lower than the outside air temperature Tam, the opening degree pattern KPN1 is increased as the target blowout temperature TAO rises. As a result, the saturation temperature of the refrigerant in the outdoor heat exchanger 16 decreases and the difference from the outside air temperature Tam increases. Thus, the heat absorption amount of the refrigerant in the outdoor heat exchanger 16 can be increased, and the heat radiation amount of the refrigerant in the water-refrigerant heat exchanger 12 can be increased.

That is, in the series dehumidification heating mode, the heat radiation amount of the refrigerant in the water-refrigerant heat exchanger 12 to the high temperature heat medium can be increased by increasing the opening degree pattern KPN1 as the target blowout temperature TAO rises. Therefore, in the series dehumidification heating mode, the capacity of heating the air in the heater core 42 can be improved as the target blowout temperature TAO rises.

(3) Parallel Dehumidification Heating Mode

Figure 11:
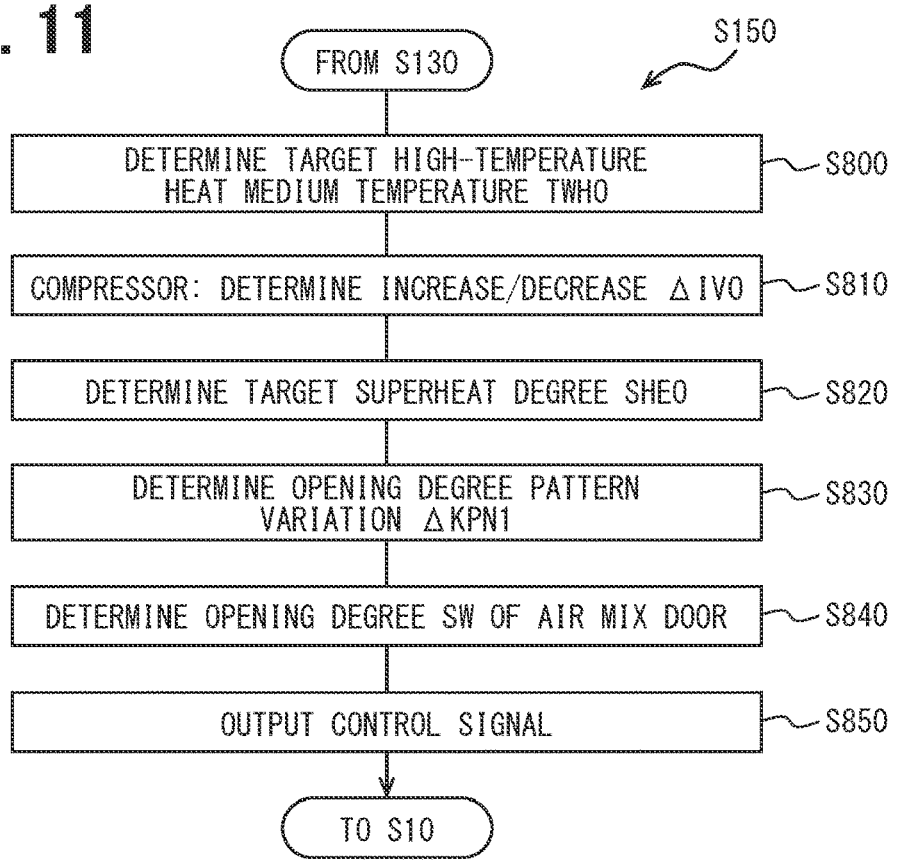
FIG. 11 is a flowchart showing a control process in a parallel dehumidification heating mode of the first embodiment.

In the parallel dehumidification heating mode, the controller 60 executes the control flow of the parallel dehumidification heating mode shown in FIG. 11. First, in step S800, the target high temperature heat medium temperature TWHO of the high temperature heat medium is determined in the same manner as in the series dehumidification heating mode so that the air can be heated by the heater core 42.

In step S810, the increase/decrease amount ΔIVO in the rotation number of the compressor 11 is determined. In the parallel dehumidification heating mode, the increase/decrease amount ΔIVO is determined based on the deviation between the target high temperature heat medium temperature TWHO and the high temperature heat medium temperature TWH by the feedback control method such that the high temperature heat medium temperature TWH approaches the target high temperature heat medium temperature TWHO.

In step S820, the target superheat degree SHEO of the refrigerant on the outlet side of the indoor evaporator 18 is determined. A predetermined constant (5° C. in this embodiment) can be adopted as the target superheat degree SHEO.

In step S830, the variation ΔKPN1 of the opening pattern KPN1 is determined, in the parallel dehumidification heating mode, based on the deviation between the target superheat degree SHEO and the superheat degree SHE of refrigerant on the outlet side of the indoor evaporator 18 using the feedback control method so that the superheat degree SHE approaches the target superheat degree SHEO.

The superheat degree SHE of refrigerant on the outlet side of the indoor evaporator 18 is calculated based on the temperature T4 detected by the fourth refrigerant temperature sensor 64d and the evaporator temperature Tefin.

Figure 12:
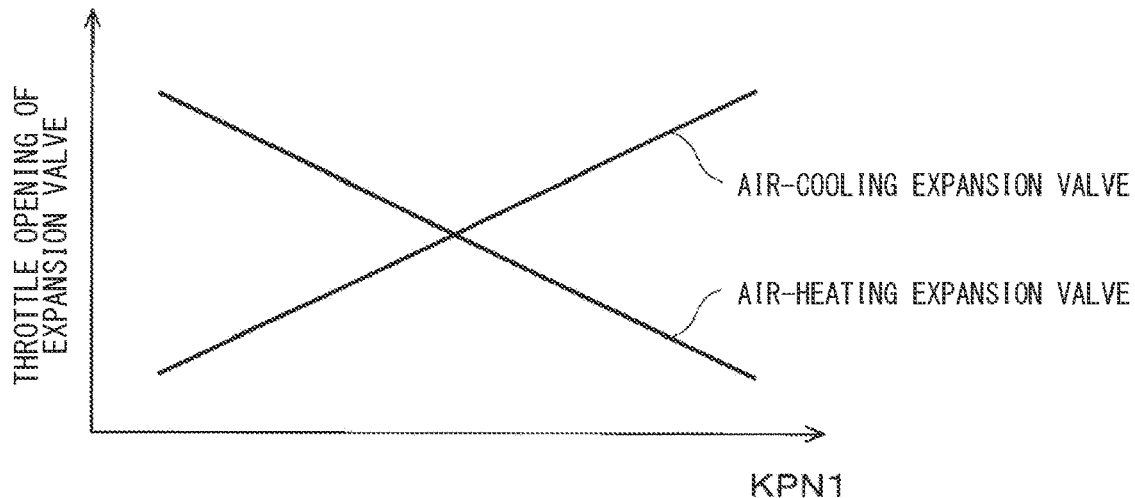
FIG. 12 is a control characteristic diagram for determining an opening pattern of the air-heating expansion valve and the air-cooling expansion valve in the parallel dehumidification heating mode of the first embodiment.

Further, in the parallel dehumidification heating mode, as shown in FIG. 12, as the opening degree pattern KPN1 increases, the throttle opening degree of the air-heating expansion valve 14a decreases and the throttle opening degree of the air-cooling expansion valve 14b increases. Therefore, when the opening degree pattern KPN1 increases, the flow rate of the refrigerant flowing into the indoor evaporator 18 increases, and the superheat degree SHE of the refrigerant on the outlet side of the indoor evaporator 18 decreases.

In step S840, the opening degree SW of the air mix door 34 is calculated as in the air-cooling mode. In the parallel dehumidification heating mode, the target blowout temperature TAO is higher than in the air-cooling mode, so that the opening degree SW of the air mix door 34 approaches 100% as in the series dehumidification heating mode. Therefore, in the parallel dehumidification heating mode, the opening degree of the air mix door 34 is determined so that almost the entire flow of the air passing through the indoor evaporator 18 passes through the heater core 42.

In step S850, in order to switch the refrigeration cycle device 10 to the refrigerant circuit in the parallel dehumidification heating mode, the air-heating expansion valve 14a is in a throttled state, the air-cooling expansion valve 14b is in a throttled state, and the cooler-unit expansion valve 14c is fully closed. Further, the dehumidification on-off valve 15a is opened, and the air-heating on-off valve 15b is opened. Further, a control signal or control voltage is output to each control target device so that the control state determined in steps S810, S830, and S840 is obtained, and the process returns to step S10.

Therefore, in the refrigeration cycle device 10 in the parallel dehumidification heating mode, a vapor compression refrigeration cycle is formed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11 and to circulate the refrigerant in order of the compressor 11, the water-refrigerant heat exchanger 12, the bypass passage 22a, the air-cooling expansion valve 14b, the indoor evaporator 18, the evaporation pressure control valve 20, the accumulator 21, and the compressor 11.

That is, in the refrigeration cycle device 10 at the parallel dehumidification heating mode, the water-refrigerant heat exchanger 12 functions as a radiator that radiates the heat of refrigerant discharged from the compressor 11. Then, the air-heating expansion valve 14a functions as a pressure reducing unit, and the outdoor heat exchanger 16 functions as an evaporator. At the same time, the air-heating expansion valve 14a and the air-cooling expansion valve 14b connected in parallel to the outdoor heat exchanger 16 function as a pressure reducing unit. Then, a refrigeration cycle in which the indoor evaporator 18 functions as an evaporator is configured.

According to this, the air can be cooled by the indoor evaporator 18, and the high temperature heat medium can be heated by the water-refrigerant heat exchanger 12. Therefore, in the vehicle air conditioner 1 in the parallel dehumidification heating mode, the air cooled and dehumidified by the indoor evaporator 18 is reheated by the heater core 42 and blown into the cabin to dehumidify and heat the cabin.

Further, in the refrigeration cycle device 10 in the parallel dehumidification heating mode, the outdoor heat exchanger 16 and the indoor evaporator 18 are connected in parallel to the refrigerant flow, and the evaporation pressure control valve 20 is arranged downstream of the indoor evaporator 18. Thereby, the refrigerant evaporation temperature in the outdoor heat exchanger 16 can be made lower than the refrigerant evaporation temperature in the indoor evaporator 18.

Therefore, in the parallel dehumidification heating mode, the heat absorption amount of the refrigerant in the outdoor heat exchanger 16 can be increased, and the heat radiation amount of the refrigerant in the water-refrigerant heat exchanger 12 can be increased, compared with the series dehumidification heating mode. As a result, in the parallel dehumidification heating mode, the air can be reheated with a higher heating capacity than in the series dehumidification heating mode.

(4) Heating Mode

Figure 13:
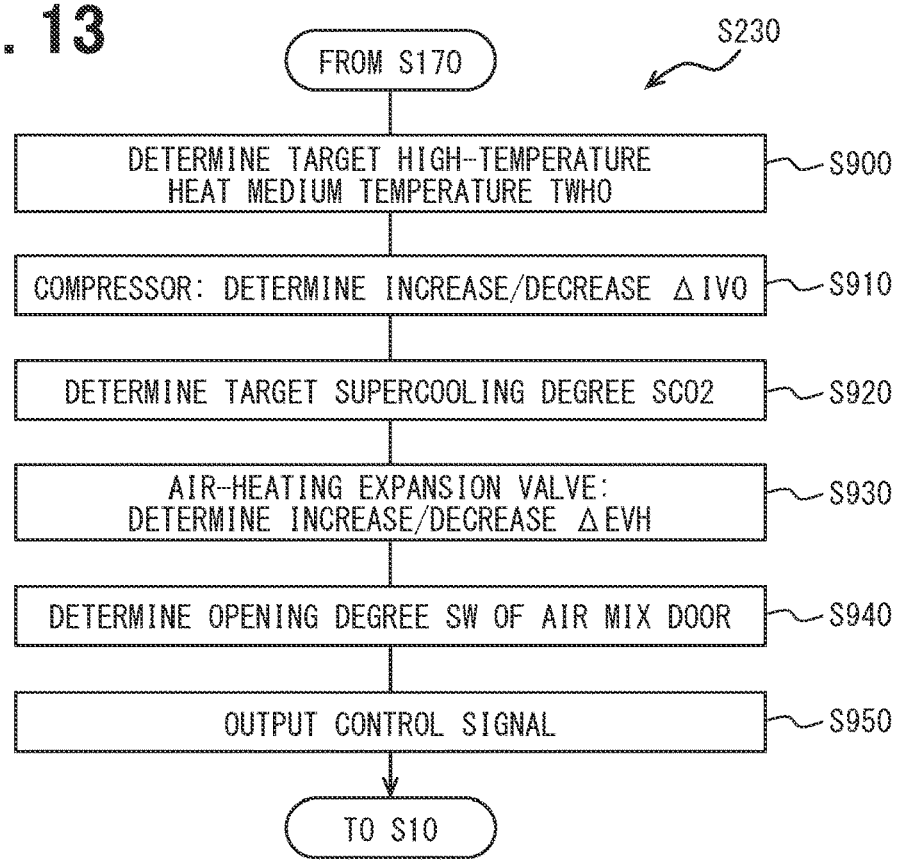
FIG. 13 is a flowchart showing a control process in a heating mode of the first embodiment.

In the heating mode, the controller 60 executes the control flow of the heating mode shown in FIG. 13. First, in step S900, the target high temperature heat medium temperature TWHO of the high temperature heat medium is determined as in the parallel dehumidification heating mode. In step S910, the increase/decrease amount ΔIVO in the rotation number of the compressor 11 is determined as in the parallel dehumidification heating mode.

In step S920, the target supercooling degree SCO2 of the refrigerant flowing out from the refrigerant passage of the water-refrigerant heat exchanger 12 is determined. The target supercooling degree SCO2 is determined with reference to the control map based on the suction temperature of the air flowing into the indoor evaporator 18 or the outside air temperature Tam. In the control map of the present embodiment, the target supercooling degree SCO2 is determined so that the coefficient of performance (COP) of the cycle approaches the maximum value.

In step S930, the increase/decrease amount ΔEVH of the throttle opening of the air-heating expansion valve 14a is determined. The increase/decrease amount ΔEVH is determined based on the deviation between the target supercooling degree SCO2 and the supercooling degree SC2 of the refrigerant flowing out of the refrigerant passage of the water-refrigerant heat exchanger 12 by the feedback control method, such that the supercooling degree SC2 of the refrigerant flowing out from the refrigerant passage approaches the target supercooling degree SCO2.

The supercooling degree SC2 of the refrigerant flowing out of the refrigerant passage of the water-refrigerant heat exchanger 12 is calculated based on the temperature T2 detected by the second refrigerant temperature sensor 64b and the pressure P1 detected by the first refrigerant pressure sensor 65a.

In step S940, the opening degree SW of the air mix door 34 is calculated as in the air-cooling mode. Here, in the heating mode, the target blowout temperature TAO is higher than in the air-cooling mode, so the opening degree SW of the air mix door 34 approaches 100%. Therefore, in the heating mode, the opening degree of the air mix door 34 is determined so that almost all the flow of the air passing through the indoor evaporator 18 passes through the heater core 42.

In step S950, in order to switch the refrigeration cycle device 10 to the refrigerant circuit in the heating mode, the air-heating expansion valve 14a is in a throttled state, the air-cooling expansion valve 14b is fully closed, and the cooler-unit expansion valve 14c is fully closed. The dehumidification on-off valve 15a is closed, and the air-heating on-off valve 15b is opened. Further, a control signal or control voltage is output to each control target device so that the control state determined in steps S910, S930, and S940 is obtained, and the process returns to step S10.

Therefore, in the refrigeration cycle device 10 in the heating mode, a vapor compression refrigeration cycle is constructed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11.

That is, in the refrigeration cycle device 10 in the heating mode, the water-refrigerant heat exchanger 12 functions as a radiator that radiates the heat of refrigerant discharged from the compressor 11. Then, the air-heating expansion valve 14a functions as a pressure reducing unit. A refrigeration cycle in which the outdoor heat exchanger 16 functions as an evaporator is constructed.

According to this, the water-refrigerant heat exchanger 12 can heat the high temperature heat medium. Therefore, in the vehicle air conditioner 1 in the heating mode, the cabin can be heated by blowing the air heated by the heater core 42 into the cabin.

(5) Air-Cooling Cooler-Unit Mode

Figure 14:
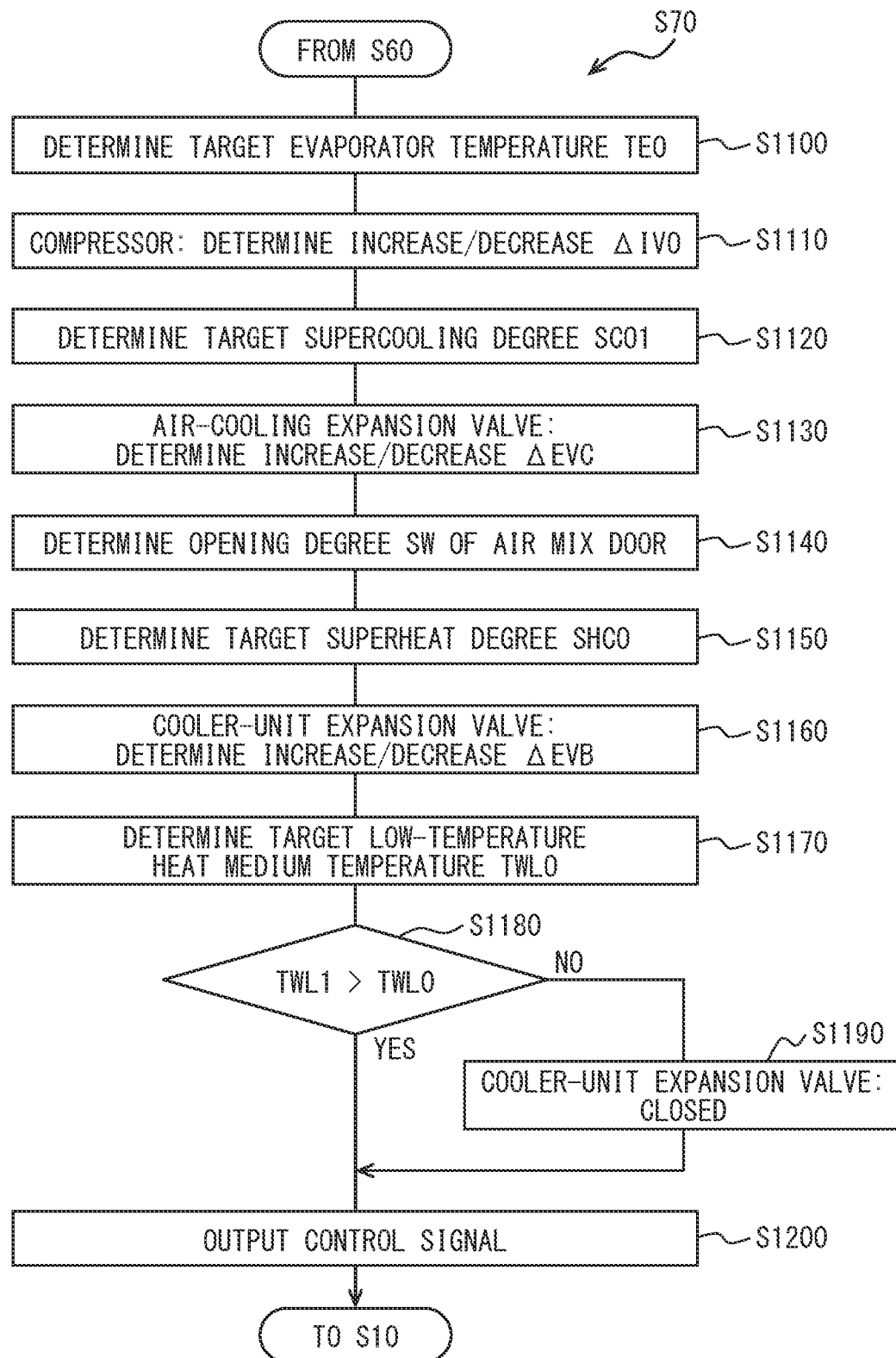
FIG. 14 is a flowchart showing a control process in an air-cooling cooler-unit mode of the first embodiment.

In the air-cooling cooler-unit mode, the controller 60 executes the control flow in the air-cooling cooler-unit mode shown in FIG. 14. First, in steps S1100 to S1140, as in steps S600 to S640 in the air-cooling mode, the target evaporator temperature TEO, the increase/decrease amount ΔIVO in the rotation number of the compressor 11, the increase/decrease amount EVC in the throttle opening degree of the air-cooling expansion valve 14b, and the opening degree SW of the air mix door 34 are determined.

Next, in step S1150, the target superheat degree SHCO of the outlet side refrigerant of the refrigerant passage of the chiller 19 is determined. A predetermined constant (5° C. in the present embodiment) can be adopted as the target superheat degree SHCO.

In step S1160, the increase/decrease amount ΔEVB of the throttle opening degree of the cooler-unit expansion valve 14c is determined. In the air-cooling cooler-unit mode, the increase/decrease amount ΔEVB is determined based on the deviation between the target superheat degree SHCO and the superheat degree SHC of the refrigerant flowing out from the refrigerant passage of the chiller 19, using the feedback control method such that the superheat degree SHC of the refrigerant flowing out from the refrigerant passage of the chiller 19 approaches the target superheat degree SHCO.

The superheat degree SHC of the refrigerant flowing out from the refrigerant passage of the chiller 19 is calculated based on the temperature T5 detected by the fifth refrigerant temperature sensor 64e and the pressure P2 detected by the second refrigerant pressure sensor 65b.

In step S1170, the target low temperature heat medium temperature TWLO of the low temperature heat medium flowing out from the water passage of the chiller 19 is determined. The target low temperature heat medium temperature TWLO is determined with reference to the control map based on the heat generation amount of the battery 80 and the outside air temperature Tam. In the control map of the present embodiment, the target low temperature heat medium temperature TWLO is decreased in response to an increase in the heat generation amount of the battery 80 and an increase in the outside air temperature Tam.

In step S1180, it is determined whether the first low temperature heat medium temperature TWL1 detected by the first low temperature heat medium temperature sensor 67a is higher than the target low temperature heat medium temperature TWLO.

When it is determined in step S1180 that the first low temperature heat medium temperature TWL1 is higher than the target low temperature heat medium temperature TWLO, the process proceeds to step S1200. When it is not determined in step S1180 that the first low temperature heat medium temperature TWL1 is higher than the target low temperature heat medium temperature TWLO, the process proceeds to step S1190. In step S1190, the cooler-unit expansion valve 14c is fully closed and the process proceeds to step S1200.

In step S1200, in order to switch the refrigeration cycle device 10 to the refrigerant circuit in the air-cooling cooler-unit mode, the air-heating expansion valve 14a is fully opened, the air-cooling expansion valve 14b is throttled, and the cooler-unit expansion valve 14c is throttled. Further, the dehumidification on-off valve 15a is closed and the air-heating on-off valve 15b is closed. Further, a control signal or control voltage is output to each control target device so that the control state determined in steps S1110, S1130, S1140, S1160, and S1190 is obtained, and the process returns to step S10.

Therefore, in the refrigeration cycle device 10 in the air-cooling cooler-unit mode, a vapor compression refrigeration cycle is formed to circulate the refrigerant in order of the compressor 11, the water-refrigerant heat exchanger 12 (the air-heating expansion valve 14a), the outdoor heat exchanger 16, the check valve 17, the air-cooling expansion valve 14b, the indoor evaporator 18, the evaporation pressure control valve 20, the accumulator 21, and the compressor 11, and to circulate the refrigerant in order of the compressor 11, the water-refrigerant heat exchanger 12 (the air-heating expansion valve 14a), the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the air-cooling cooler-unit mode, the water-refrigerant heat exchanger 12 and the outdoor heat exchanger 16 function as radiator that radiate the heat of refrigerant discharged from the compressor 11. Then, the air-cooling expansion valve 14b functions as a pressure reducing unit. The indoor evaporator 18 functions as an evaporator. At the same time, the air-cooling expansion valve 14b and the cooler-unit expansion valve 14c connected in parallel to the indoor evaporator 18 function as a pressure reducing unit. Then, a refrigeration cycle in which the chiller 19 functions as an evaporator is configured.

According to this, the air can be cooled by the indoor evaporator 18, and the high temperature heat medium can be heated by the water-refrigerant heat exchanger 12. Further, the chiller 19 can cool the low pressure heat medium.

Therefore, in the vehicle air conditioner 1 in the air-cooling cooler-unit mode, the heater core 42 reheats a part of the air cooled by the indoor evaporator 18 by adjusting the opening degree of the air mix door 34. As a result, it is possible to cool the cabin by blowing out the air whose temperature is adjusted so as to approach the target blowout temperature TAO into the cabin.

Furthermore, the low temperature heat medium cooled by the chiller 19 is caused to flow into the cooling heat exchange section 52, whereby the battery 80 can be cooled.

(6) Series Dehumidification Heating Cooler-Unit Mode

Figure 15:
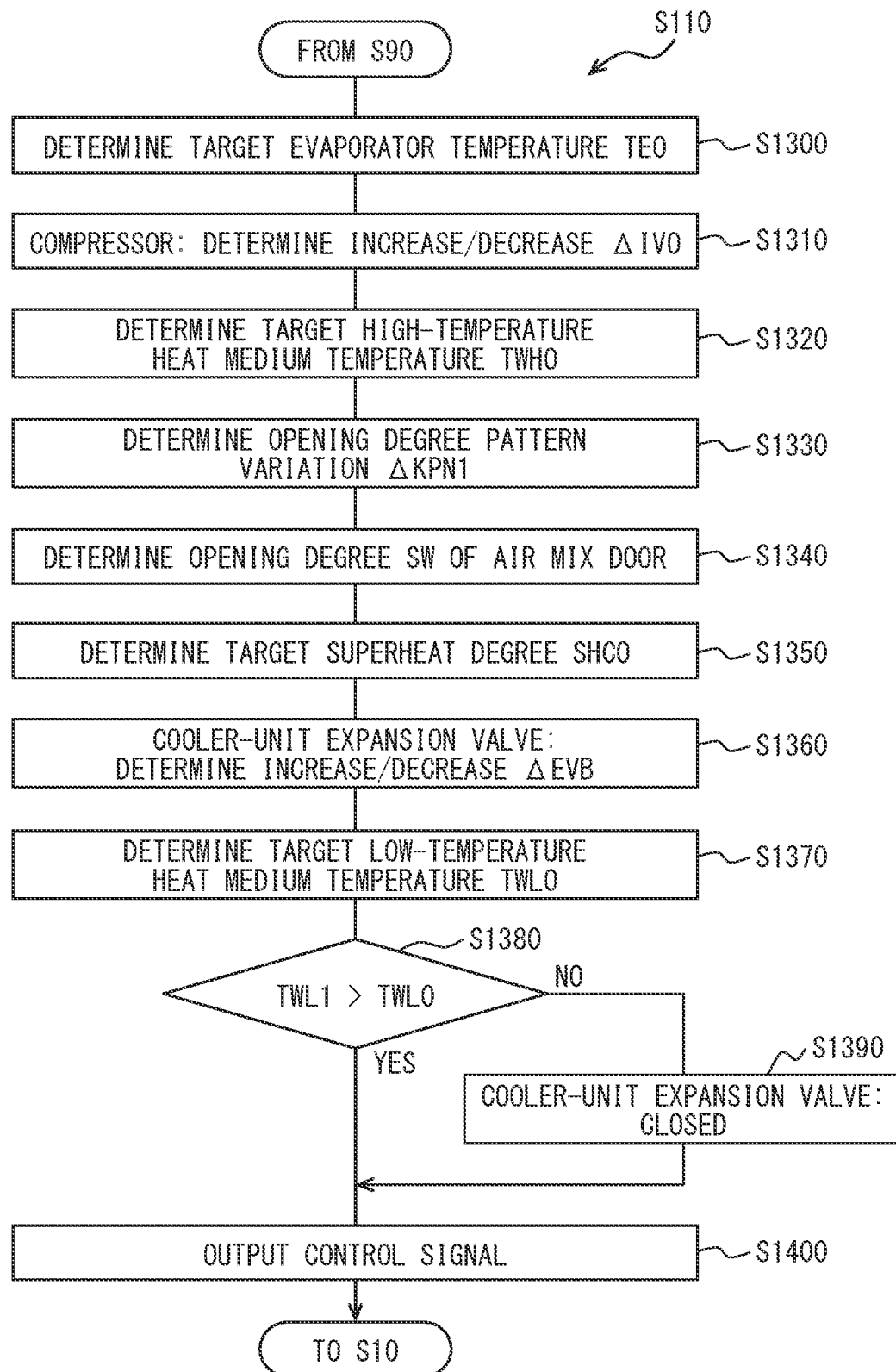
FIG. 15 is a flowchart showing a control process in a series dehumidification heating cooler-unit mode of the first embodiment.

In the series dehumidification heating cooler-unit mode, the controller 60 executes the control flow in the series dehumidification heating cooler-unit mode shown in FIG. 15. First, in steps S1300 to S1340, as in steps S700 to S740 in the series dehumidification heating mode, the target evaporator temperature TEO, the increase/decrease amount ΔIVO in the rotation number of the compressor 11, the variation ΔKPN1 of the opening degree pattern KPN1, and the opening degree SW of the air mix door 34 are determined.

In subsequent steps S1350 to S1370, as in steps S1150 to S1170 in the air-cooling cooler-unit mode, the target superheat degree SHCO, the increase/decrease amount ΔEVB of the throttle opening degree of the cooler-unit expansion valve 14c, and the target low temperature heat medium temperature TWLO are determined.

Next, in step S1380, as in the air-cooling cooler-unit mode, when it is determined that the first low temperature heat medium temperature TWL1 is higher than the target low temperature heat medium temperature TWLO, the process proceeds to step S1400. When it is not determined in step S1380 that the first low temperature heat medium temperature TWL1 is higher than the target low temperature heat medium temperature TWLO, the process proceeds to step S1390. In step S1390, the cooler-unit expansion valve 14c is fully closed, and the process proceeds to step S1400.

In step S1400, in order to switch the refrigeration cycle device 10 to the refrigerant circuit in the series dehumidification heating cooler-unit mode, the air-heating expansion valve 14a is in a throttled state, the air-cooling expansion valve 14b is in a throttled state, and the cooler-unit expansion valve 14c is in a throttled state. Further, the dehumidification on-off valve 15a is closed and the air-heating on-off valve 15b is closed. Further, a control signal or control voltage is output to each control target device so that the control state determined in steps S1310, S1330, S1340, S1360, and S1390 is obtained, and the process returns to step S10.

Therefore, in the series dehumidification heating cooler-unit mode, a vapor compression refrigeration cycle is formed to circulate the refrigerant in order of the compressor 11, the water-refrigerant heat exchanger 12, the air-heating expansion valve 14a, the outdoor heat exchanger 16, the check valve 17, the air-cooling expansion valve 14b, the indoor evaporator 18, the evaporation pressure control valve 20, the accumulator 21, and the compressor 11, and to circulate the refrigerant in order of the compressor 11, the water-refrigerant heat exchanger 12, the air-heating expansion valve 14a, the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the series dehumidification heating cooler-unit mode, a vapor compression refrigeration cycle is formed in which the water-refrigerant heat exchanger 12 functions as a radiator, and the indoor evaporator 18 and the chiller 19 function as evaporator.

That is, in the refrigeration cycle device 10 in the series dehumidification heating cooler-unit mode, the water-refrigerant heat exchanger 12 functions as a radiator that radiates the heat of refrigerant discharged from the compressor 11. Then, the air-heating expansion valve 14a functions as a pressure reducing unit. Then, the air-cooling expansion valve 14b functions as a pressure reducing unit, and the indoor evaporator 18 functions as an evaporator. At the same time, the air-cooling expansion valve 14b and the cooler-unit expansion valve 14c connected in parallel to the indoor evaporator 18 function as a pressure reducing unit. Then, a refrigeration cycle in which the chiller 19 functions as an evaporator is configured.

Further, when the saturation temperature of the refrigerant in the outdoor heat exchanger 16 is higher than the outside air temperature Tam, the cycle in which the outdoor heat exchanger 16 functions as a radiator is configured. When the saturation temperature of the refrigerant in the outdoor heat exchanger 16 is lower than the outside air temperature Tam, the outdoor heat exchanger 16 functions as an evaporator in the cycle.

According to this, the air can be cooled by the indoor evaporator 18, and the high temperature heat medium can be heated by the water-refrigerant heat exchanger 12. Further, the chiller 19 can cool the low pressure heat medium.

Therefore, in the refrigeration cycle device 10 in the series dehumidification heating cooler-unit mode, the air cooled and dehumidified by the indoor evaporator 18 is reheated by the heater core 42 and blown into the cabin, thereby dehumidifying and heating the cabin. At this time, it is possible to improve the capacity of heating the air in the heater core 42 by increasing the opening degree pattern KPN1, as in the series dehumidification heating mode.

Furthermore, the low temperature heat medium cooled by the chiller 19 is caused to flow into the cooling heat exchange section 52, whereby the battery 80 can be cooled.

(7) Parallel Dehumidification Heating Cooler-Unit Mode

Figure 16:
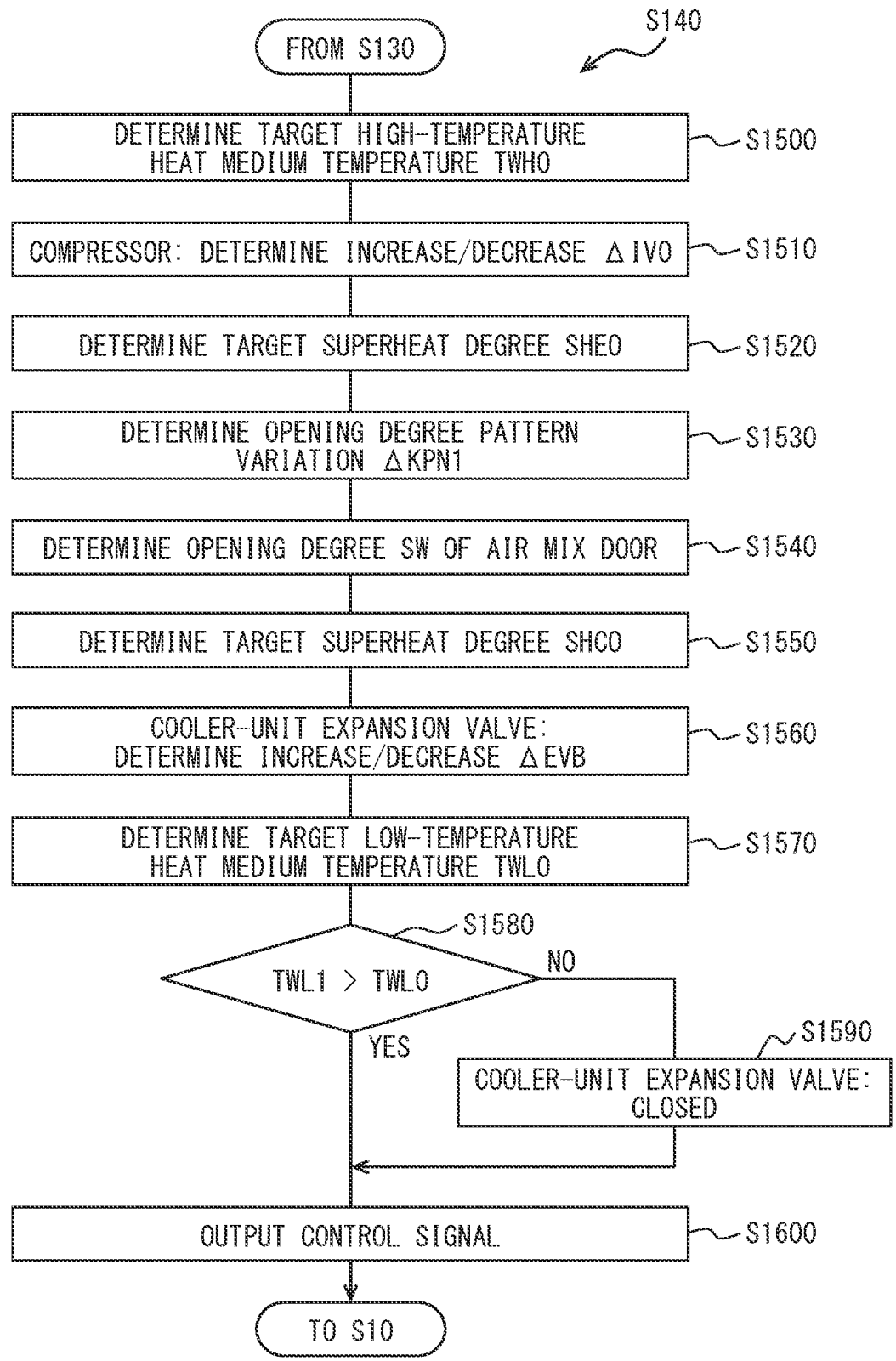
FIG. 16 is a flowchart showing a control process of a parallel dehumidification heating cooler-unit mode of the first embodiment.

In the parallel dehumidification heating cooler-unit mode, the controller 60 executes the control flow in the parallel dehumidification heating cooler-unit mode shown in FIG. 16. First, in steps S1500 to S1540, as in steps S800 to S840 in the parallel dehumidification heating mode, the target high temperature heat medium temperature TWHO, the increase/decrease amount ΔIVO in the rotation number of the compressor 11, the target superheat degree SHEO, the variation ΔKPN1 in the opening degree pattern KPN1, and the opening degree SW of the air mix door 34 are determined.

In subsequent steps S1550 to S1570, as in steps S1150 to S1170 in the air-cooling cooler-unit mode, the target superheat degree SHCO, the increase/decrease amount ΔEVB of the throttle opening degree of the cooler-unit expansion valve 14c, and the target low temperature heat medium temperature TWLO are determined.

Next, in step S1580, when it is determined that the first low temperature heat medium temperature TWL1 is higher than the target low temperature heat medium temperature TWLO, the process proceeds to step S1600, as in the air-cooling cooler-unit mode. When it is not determined in step S1580 that the first low temperature heat medium temperature TWL1 is higher than the target low temperature heat medium temperature TWLO, the process proceeds to step S1590. In step S1590, the cooler-unit expansion valve 14c is fully closed, and the process proceeds to step S1600.

In step S1600, in order to switch the refrigeration cycle device 10 to the refrigerant circuit in the parallel dehumidification heating cooler-unit mode, the air-heating expansion valve 14a is in a throttled state, the air-cooling expansion valve 14b is in a throttled state, and the cooler-unit expansion valve 14c is in a throttled state. Further, the dehumidification on-off valve 15a is opened, and the air-heating on-off valve 15b is opened. Further, a control signal or control voltage is output to each control target device so that the control state determined in steps S1510, S1530, S1540, S1560, and S1590 is obtained, and the process returns to step S10.

Therefore, in the refrigeration cycle device 10 in the parallel dehumidification heating cooler-unit mode, a vapor compression refrigeration cycle is constructed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11, to circulate the refrigerant in order of the compressor 11, the water-refrigerant heat exchanger 12, the bypass passage 22a, the air-cooling expansion valve 14b, the indoor evaporator 18, the evaporation pressure control valve 20, the accumulator 21, and the compressor 11, and to circulate the refrigerant in order of the compressor 11, the water-refrigerant heat exchanger 12, the bypass passage 22a, the cooler-unit expansion valve 14c, the chiller 19, the evaporation pressure control valve 20, the accumulator 21, and the compressor 11.

That is, in the refrigeration cycle device 10 in the parallel dehumidification heating cooler-unit mode, the water-refrigerant heat exchanger 12 functions as a radiator that radiates the heat of refrigerant discharged from the compressor 11. Then, the air-heating expansion valve 14a functions as a pressure reducing unit. The outdoor heat exchanger 16 functions as an evaporator. At the same time, the air-heating expansion valve 14a and the air-cooling expansion valve 14b connected in parallel to the outdoor heat exchanger 16 function as a pressure reducing unit. The indoor evaporator 18 functions as an evaporator. The air-heating expansion valve 14a and the cooler-unit expansion valve 14c connected in parallel to the outdoor heat exchanger 16 function as a pressure reducing unit. Then, a refrigeration cycle in which the chiller 19 functions as an evaporator is configured.

According to this, the air can be cooled by the indoor evaporator 18, and the high temperature heat medium can be heated by the water-refrigerant heat exchanger 12. Further, the chiller 19 can cool the low pressure heat medium.

Therefore, in the vehicle air conditioner 1 in the parallel dehumidification heating cooler-unit mode, the air cooled and dehumidified by the indoor evaporator 18 is reheated by the heater core 42 and blown into the cabin to dehumidify and heat the cabin. At this time, the air can be reheated with a heating capacity higher than that in the series dehumidification heating cooler-unit mode by lowering the refrigerant evaporation temperature in the outdoor heat exchanger 16 to be lower than the refrigerant evaporation temperature in the indoor evaporator 18.

Furthermore, the low temperature heat medium cooled by the chiller 19 is caused to flow into the cooling heat exchange section 52, whereby the battery 80 can be cooled.

(8) Heating Cooler-Unit Mode

Figure 17:
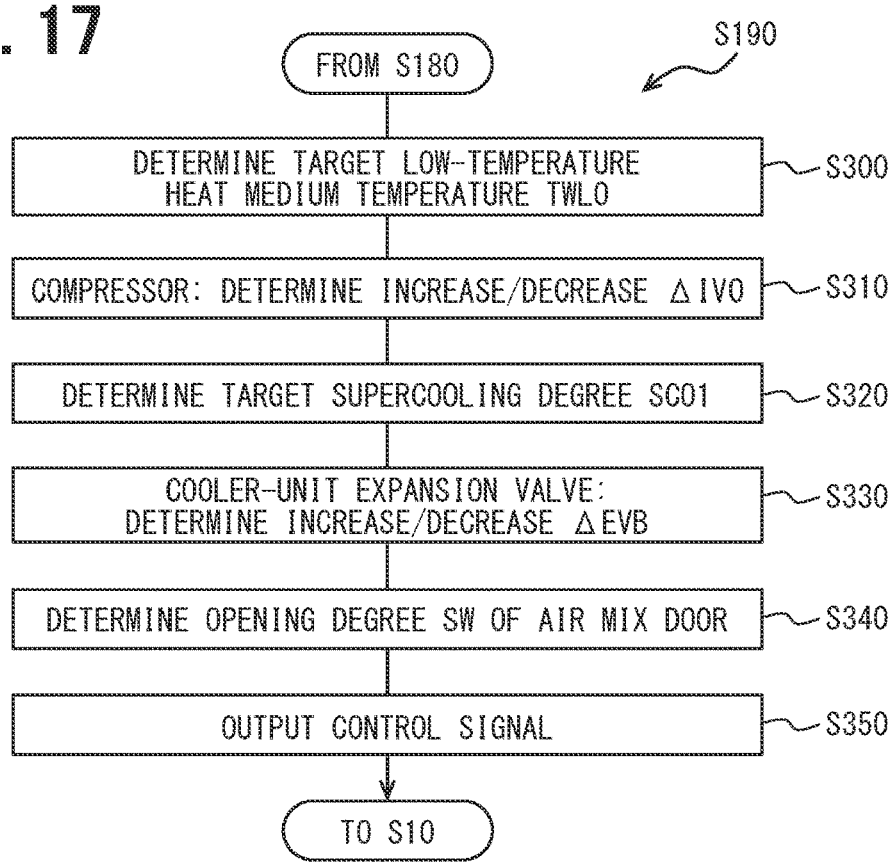
FIG. 17 is a flowchart showing a control process in a heating cooler-unit mode of the first embodiment.

In the heating cooler-unit mode, the controller 60 executes the control flow of the heating cooler-unit mode shown in FIG. 17. First, in step S300, the target low temperature heat medium temperature TWLO of the low temperature heat medium is determined as in the air-cooling cooler-unit mode so that the cooling heat exchange section 52 can cool the battery 80.

In step S310, the increase/decrease amount $\Delta IVO$ in the rotation number of the compressor 11 is determined. In the heating cooler-unit mode, the increase/decrease amount $\Delta IVO$ is determined based on the deviation between the target low temperature heat medium temperature TWLO and the first low temperature heat medium temperature TWL1 by the feedback control method so that the first low temperature heat medium temperature TWL1 approaches the target low temperature heat medium temperature TWLO.

In step S320, the target supercooling degree SCO1 of the refrigerant flowing out of the outdoor heat exchanger 16 is determined. The target supercooling degree SCO1 in the heating cooler-unit mode is determined with reference to the control map based on the outside air temperature Tam. In the control map of this embodiment, the target supercooling degree SCO1 is determined so that the coefficient of performance (COP) of the cycle approaches the maximum value.

In step S330, the increase/decrease amount $\Delta EVB$ of the throttle opening degree of the cooler-unit expansion valve 14c is determined. The increase/decrease amount $\Delta EVB$ is determined based on the deviation between the target supercooling degree SCO1 and the supercooling degree SC1 of the refrigerant on the outlet side of the outdoor heat exchanger 16, by a feedback control method, such that the supercooling degree SC1 of the refrigerant on the outlet side of the outdoor heat exchanger 16 approaches the target supercooling degree SCO1. The supercooling degree SC1 is calculated similarly to in the air-cooling mode.

In step S340, the opening degree SW of the air mix door 34 is calculated as in the air-cooling mode.

In step S350, in order to switch the refrigeration cycle device 10 to the refrigerant circuit in the heating cooler-unit mode, the air-heating expansion valve 14a is fully opened, the air-cooling expansion valve 14b is fully closed, and the cooler-unit expansion valve 14c is throttled. Further, the dehumidification on-off valve 15a is closed and the air-heating on-off valve 15b is closed. Further, a control signal or control voltage is output to each control target device so that the control state determined in steps S310, S330, and S340 is obtained, and the process returns to step S10.

Therefore, in the refrigeration cycle device 10 in the heating cooler-unit mode, a vapor compression refrigeration cycle is formed to circulate the refrigerant in order of the compressor 11, the water-refrigerant heat exchanger 12 (the air-heating expansion valve 14a), the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the heating cooler-unit mode, the water-refrigerant heat exchanger 12 and the outdoor heat exchanger 16 function as radiator that radiates the heat of refrigerant discharged from the compressor 11. Then, the cooler-unit expansion valve 14c functions as a decompression unit that decompresses the refrigerant. Then, a vapor compression refrigeration cycle in which the chiller 19 functions as an evaporator is configured.

According to this, the water-refrigerant heat exchanger 12 can heat the high temperature heat medium and the chiller 19 can cool the low temperature heat medium.

Therefore, in the vehicle air conditioner 1 in the heating cooler-unit mode, the cabin can be heated by blowing the air heated by the heater core 42 into the cabin. Furthermore, the low temperature heat medium cooled by the chiller 19 is caused to flow into the cooling heat exchange section 52, whereby the battery 80 can be cooled.

(9) Heating Series Cooler-Unit Mode

Figure 18:
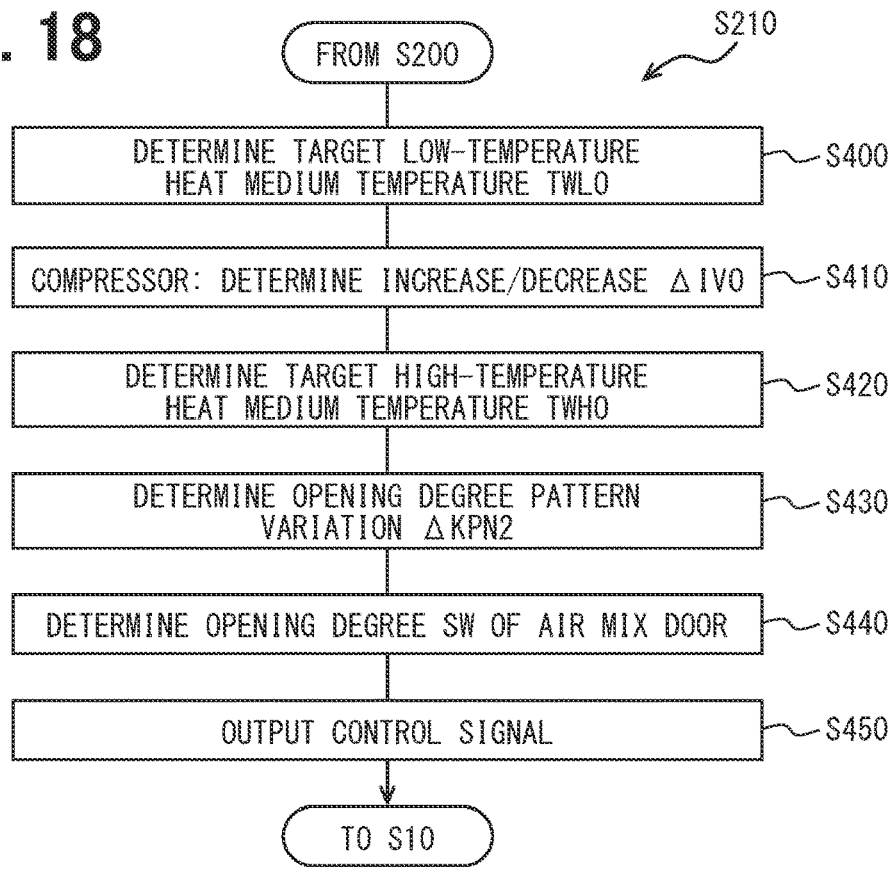
FIG. 18 is a flowchart showing a control process in a heating series cooler-unit mode of the first embodiment.

In the heating series cooler-unit mode, the controller 60 executes the control flow of the heating series cooler-unit mode shown in FIG. 18. First, in step S400, the target low temperature heat medium temperature TWLO is determined as in the heating cooler-unit mode. In step S410, the increase/decrease amount ΔIVO in the rotation number of the compressor 11 is determined as in the heating cooler-unit mode.

In step S420, the target high temperature heat medium temperature TWHO of the high temperature heat medium is determined as in the series dehumidification heating mode.

In step S430, the variation ΔKPN2 of the opening degree pattern KPN2 is determined. The opening degree pattern KPN2 is a parameter for determining the combination of the throttle opening degree of the air-heating expansion valve 14a and the throttle opening degree of the cooler-unit expansion valve 14c.

Figure 19:
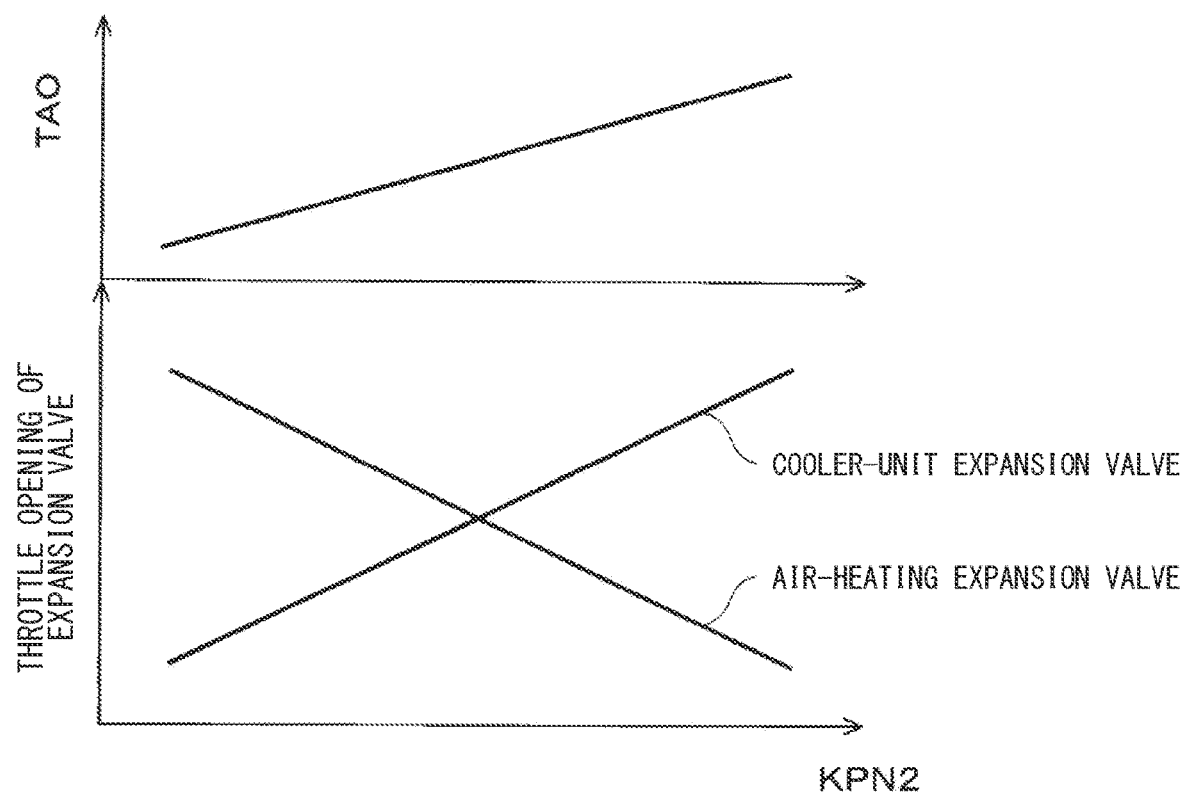
FIG. 19 is a control characteristic diagram for determining the opening pattern of the air-heating expansion valve and the cooler-unit expansion valve in the heating series cooler-unit mode of the first embodiment.

Specifically, in the heating series cooler-unit mode, as shown in FIG. 19, the opening degree pattern KPN2 increases as the target blowout temperature TAO increases. Then, as the opening degree pattern KPN2 increases, the throttle opening degree of the air-heating expansion valve 14a decreases and the throttle opening degree of the cooler-unit expansion valve 14c increases.

In step S440, the opening degree SW of the air mix door 34 is calculated as in the air-cooling mode.

In step S450, in order to switch the refrigeration cycle device 10 to the refrigerant circuit in the heating series cooler-unit mode, the air-heating expansion valve 14a is in a throttled state, the air-cooling expansion valve 14b is fully closed, and the cooler-unit expansion valve 14c is in a throttled state. Further, the dehumidification on-off valve 15a is closed and the air-heating on-off valve 15b is closed. Further, a control signal or control voltage is output to each control target device so that the control state determined in steps S310, S330, and S340 is obtained, and the process returns to step S10.

Therefore, in the refrigeration cycle device 10 in the heating series cooler-unit mode, a vapor compression refrigeration cycle is formed to circulate the refrigerant in order of the compressor 11, the water-refrigerant heat exchanger 12, the air-heating expansion valve 14a, the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the heating series cooler-unit mode, a vapor compression refrigeration cycle is formed in which the water-refrigerant heat exchanger 12 functions as a radiator for radiating the heat of refrigerant discharged from the compressor 11, the air-heating expansion valve 14a and the cooler-unit expansion valve 14c function as decompression unit, and the chiller 19 functions as an evaporator.

Further, when the saturation temperature of the refrigerant in the outdoor heat exchanger 16 is higher than the outside air temperature Tam, the cycle in which the outdoor heat exchanger 16 functions as a radiator is configured. When the saturation temperature of the refrigerant in the outdoor heat exchanger 16 is lower than the outside air temperature Tam, the outdoor heat exchanger 16 functions as an evaporator in the cycle.

According to this, the water-refrigerant heat exchanger 12 can heat the high temperature heat medium, and the chiller 19 can cool the low temperature heat medium.

Therefore, in the vehicle air conditioner 1 in the heating series cooler-unit mode, the cabin can be heated by blowing the air heated by the heater core 42 into the cabin. Furthermore, the low temperature heat medium cooled by the chiller 19 is caused to flow into the cooling heat exchange section 52, whereby the battery 80 can be cooled.

Furthermore, when the saturation temperature of the refrigerant in the outdoor heat exchanger 16 is higher than the outside air temperature Tam, the opening degree pattern KPN2 is increased in response to the increase in the target blowout temperature TAO. Therefore, the saturation temperature of the refrigerant in the outdoor heat exchanger 16 decreases and the difference from the outside air temperature Tam decreases. Thereby, the heat radiation amount of the refrigerant in the outdoor heat exchanger 16 can be reduced, and the heat radiation amount of the refrigerant in the water-refrigerant heat exchanger 12 can be increased.

Further, when the saturation temperature of the refrigerant in the outdoor heat exchanger 16 is lower than the outside air temperature Tam, the opening degree pattern KPN2 is increased as the target blowout temperature TAO rises. Therefore, the saturation temperature of the refrigerant in the outdoor heat exchanger 16 decreases and the temperature difference from the outside air temperature Tam increases. Thereby, the heat absorption amount of the refrigerant in the outdoor heat exchanger 16 can be increased, and the heat radiation amount of the refrigerant in the water-refrigerant heat exchanger 12 can be increased.

That is, in the heating series cooler-unit mode, the heat radiation amount of the refrigerant in the water-refrigerant heat exchanger 12 to the high temperature heat medium can be increased by increasing the opening degree pattern KPN2 as the target blowout temperature TAO rises. Therefore, in the heating series cooler-unit mode, the capability of heating the air in the heater core 42 can be improved as the target blowout temperature TAO rises.

As a result, in the heating series cooler-unit mode, the air can be heated with a heating capacity higher than that in the heating cooler-unit mode. In other words, the heating cooler-unit mode is an operation mode for heating the air with a heating capacity lower than that of the heating series cooler-unit mode.

(10) Heating Parallel Cooler-Unit Mode

Figure 20:
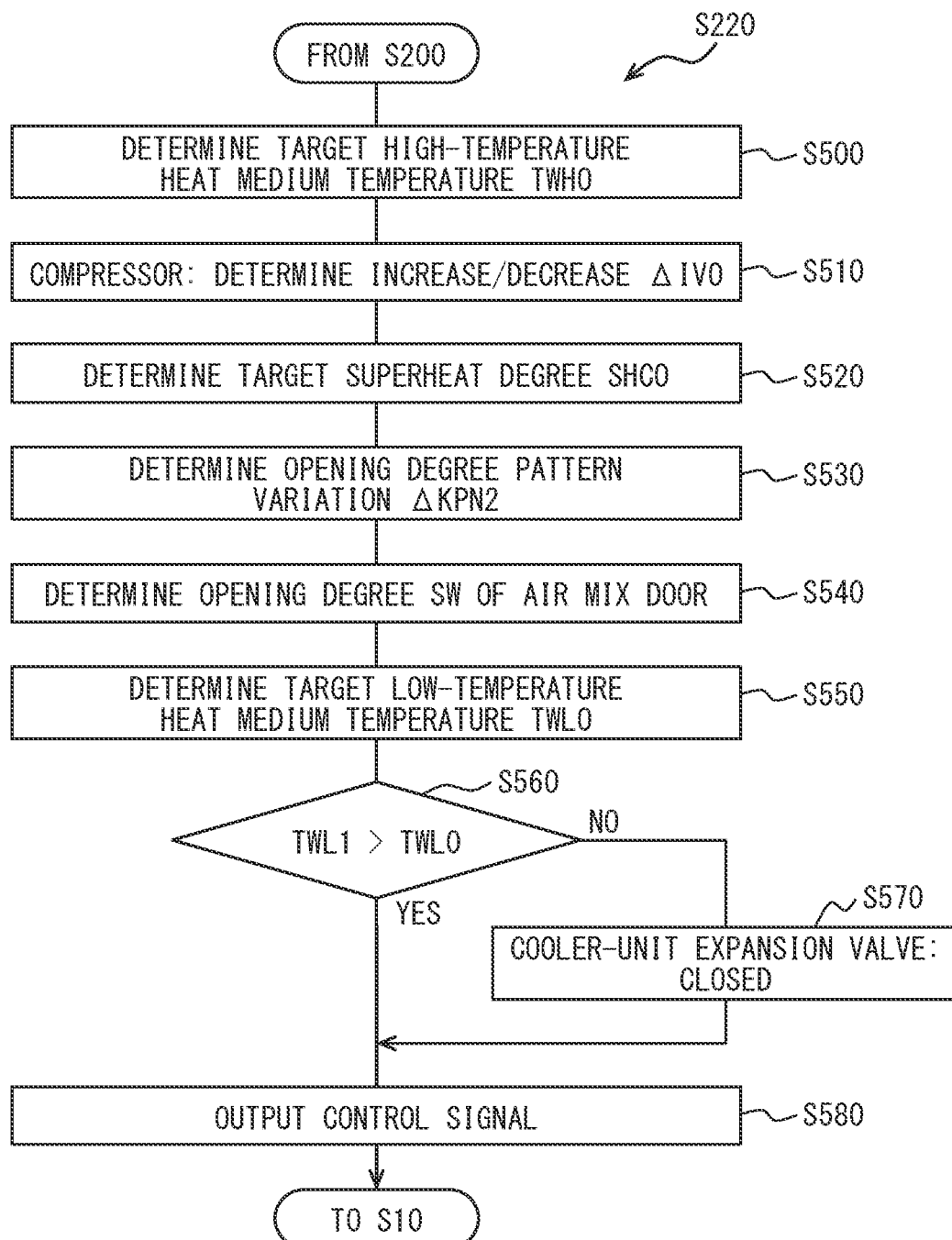
FIG. 20 is a flowchart showing a control process in a heating parallel cooler-unit mode of the first embodiment.

In the heating parallel cooler-unit mode, the controller 60 executes the control flow of the heating parallel cooler-unit mode shown in FIG. 20. First, in step S500, the target high temperature heat medium temperature TWHO of the high temperature heat medium is determined as in the series dehumidification heating mode so that the air can be heated by the heater core 42.

In step S510, the increase/decrease amount ΔIVO in the rotation number of the compressor 11 is determined. In the heating parallel cooler-unit mode, the increase/decrease amount ΔIVO is determined based on the deviation between the target high temperature heat medium temperature TWHO and the high temperature heat medium temperature TWH, as in the parallel dehumidification heating mode, using the feedback control method, such that the high temperature heat medium temperature TWH approaches the target high temperature heat medium temperature TWHO.

In step S520, the target superheat degree SHCO of the outlet side refrigerant of the refrigerant passage of the chiller 19 is determined. A predetermined constant (5° C. in the present embodiment) can be adopted as the target superheat degree SHCO.

In step S530, the variation ΔKPN2 of the opening degree pattern KPN2 is determined, in the heating parallel cooler-unit mode, based on the deviation between the target superheat degree SHCO and the superheat degree SHC of the outlet side refrigerant of the chiller 19, using the feedback control method, such that the superheat degree SHC approaches the target superheat degree SHCO.

Figure 21:
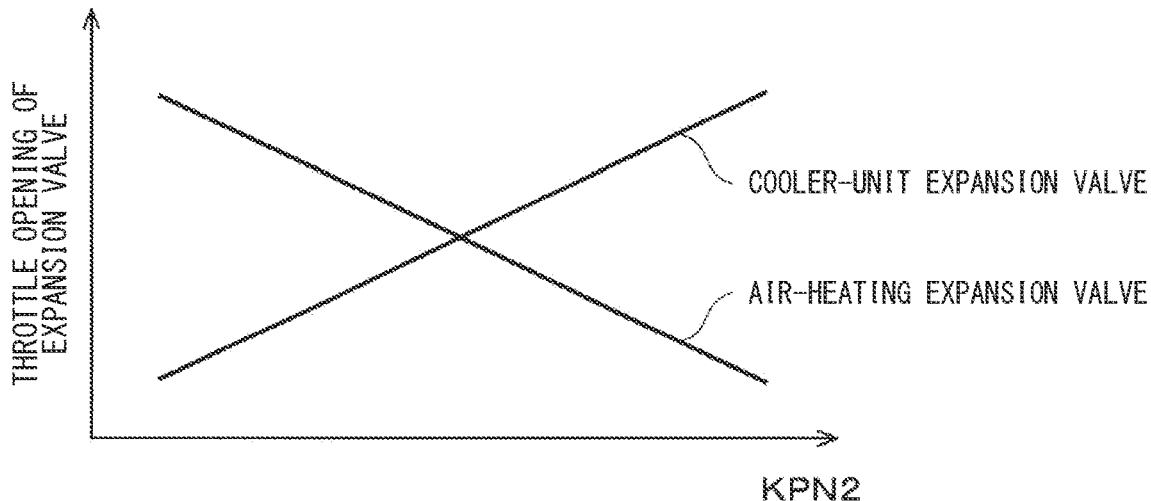
FIG. 21 is a control characteristic diagram for determining the opening pattern of the air-heating expansion valve and the cooler-unit expansion valve in the heating parallel cooler-unit mode of the first embodiment.

Further, in the heating parallel cooler-unit mode, as shown in FIG. 21, as the opening degree pattern KPN2 becomes larger, the throttle opening degree of the air-heating expansion valve 14a becomes smaller and the throttle opening degree of the cooler-unit expansion valve 14c becomes larger. Therefore, when the opening degree pattern KPN2 increases, the flow rate of the refrigerant flowing into the refrigerant passage of the chiller 19 increases, and the superheat degree SHC of the refrigerant on the outlet side of the refrigerant passage of the chiller 19 decreases.

In step S540, the opening degree SW of the air mix door 34 is calculated as in the air-cooling mode. In step S550, the target low temperature heat medium temperature TWLO of the low temperature heat medium is determined as in the air-cooling cooler-unit mode.

In step S560, it is determined whether the first low temperature heat medium temperature TWL1 detected by the first low temperature heat medium temperature sensor 67a is higher than the target low temperature heat medium temperature TWLO.

When it is determined in step S560 that the first low temperature heat medium temperature TWL1 is higher than the target low temperature heat medium temperature TWLO, the process proceeds to step S580. When it is not determined in step S560 that the first low temperature heat medium temperature TWL1 is higher than the target low temperature heat medium temperature TWLO, the process proceeds to step S570. In step S570, the cooler-unit expansion valve 14c is fully closed and the process proceeds to step S580.

In step S580, in order to switch the refrigeration cycle device 10 to the refrigerant circuit in the heating parallel cooler-unit mode, the air-heating expansion valve 14a is in a throttled state, the air-cooling expansion valve 14b is fully closed, and the cooler-unit expansion valve 14c is in a throttled state. Further, the dehumidification on-off valve 15a is opened, and the air-heating on-off valve 15b is opened. Further, a control signal or control voltage is output to each control target device so that the control state determined in steps S510, S530, S540, and S570 is obtained, and the process returns to step S10.

Therefore, in the refrigeration cycle device 10 in the heating parallel cooler-unit mode, a vapor compression refrigeration cycle is constructed to circulate the refrigerant in order of the compressor 11, the water-refrigerant heat exchanger 12, the air-heating expansion valve 14a, the outdoor heat exchanger 16, the heating passage 22b, the accumulator 21, and the compressor 11 and to circulate the refrigerant in order of the compressor 11, the water-refrigerant heat exchanger 12, the bypass passage 22a, the cooler-unit expansion valve 14c, the chiller 19, the evaporation pressure control valve 20, the accumulator 21, and the compressor 11.

That is, in the refrigeration cycle device 10 in the heating parallel cooler-unit mode, the water-refrigerant heat exchanger 12 functions as a radiator that radiates the heat of refrigerant discharged from the compressor 11. The air-heating expansion valve 14a functions as a pressure reducing unit. The outdoor heat exchanger 16 functions as an evaporator. At the same time, the air-heating expansion valve 14a and the cooler-unit expansion valve 14c connected in parallel to the outdoor heat exchanger 16 function as a pressure reducing unit. Then, a refrigeration cycle in which the chiller 19 functions as an evaporator is configured.

According to this, the water-refrigerant heat exchanger 12 can heat the high temperature heat medium and the chiller 19 can cool the low temperature heat medium.

Therefore, in the vehicle air conditioner 1 in the heating parallel cooler-unit mode, the cabin can be heated by blowing the air heated by the heater core 42 into the cabin. Furthermore, the low temperature heat medium cooled by the chiller 19 is caused to flow into the cooling heat exchange section 52, whereby the battery 80 can be cooled.

Further, in the refrigeration cycle device 10 in the heating parallel cooler-unit mode, the outdoor heat exchanger 16 and the chiller 19 are connected in parallel to the refrigerant flow, and the evaporation pressure control valve 20 is arranged downstream of the refrigerant passage of the chiller 19. Thereby, the refrigerant evaporation temperature in the outdoor heat exchanger 16 can be made lower than the refrigerant evaporation temperature in the refrigerant passage of the chiller 19.

Therefore, in the heating parallel cooler-unit mode, the heat absorption amount of the refrigerant in the outdoor heat exchanger 16 can be increased, and the heat radiation amount of the refrigerant in the water-refrigerant heat exchanger 12 can be increased, compared to the heating series cooler-unit mode. As a result, in the heating parallel cooler-unit mode, the air can be reheated with a heating capacity higher than that in the heating series cooler-unit mode.

(11) Cooler-Unit Mode

Figure 22:
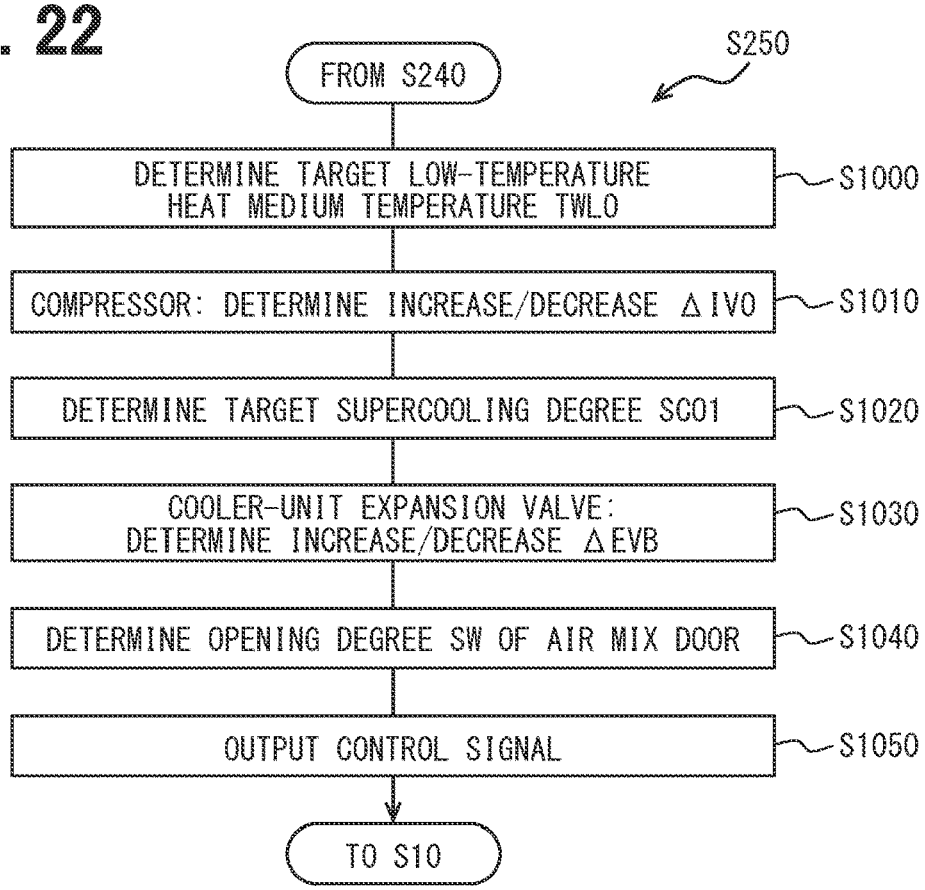
FIG. 22 is a flowchart showing a control process in a cooler-unit mode of the first embodiment.

In the cooler-unit mode, the controller 60 executes the control flow of the cooler-unit mode shown in FIG. 22. First, in steps S1000 to S1040, similar to steps S300 to S340 in the heating cooler-unit mode, the target low temperature heat medium temperature TWLO of the low temperature heat medium, the increase/decrease amount ΔIVO in the rotation number of the compressor 11, the target supercooling degree SCO1, The increase/decrease amount ΔEVB of the throttle opening degree of the cooler-unit expansion valve 14c and the opening degree SW of the air mix door 34 are determined.

In the cooler-unit mode, since the target blowout temperature TAO becomes lower than the heating reference temperature γ, the opening degree SW of the air mix door 34 approaches 0%. Therefore, in the cooler-unit mode, the opening degree of the air mix door 34 is determined so that almost the entire flow of the air passing through the indoor evaporator 18 passes through the cold air bypass passage 35.

In step S1050, in order to switch the refrigeration cycle device 10 to the refrigerant circuit in the cooler-unit mode, the air-heating expansion valve 14a is fully opened, the air-cooling expansion valve 14b is fully closed, and the cooler-unit expansion valve 14c is throttled. Further, the dehumidification on-off valve 15a is closed and the air-heating on-off valve 15b is closed. Further, a control signal or control voltage is output to each control target device so that the control state determined in steps S1010, S1030, and S1040 is obtained, and the process returns to step S10.

Therefore, in the refrigeration cycle device 10 in the cooler-unit mode, a vapor compression refrigeration cycle is formed to circulate the refrigerant in order of the compressor 11, the water-refrigerant heat exchanger 12 (the air-heating expansion valve 14a), the outdoor heat exchanger 16, the check valve 17, the cooler-unit expansion valve 14c, the chiller 19, the evaporation pressure control valve 20, the accumulator 21, and the compressor 11.

That is, in the refrigeration cycle device 10 in the cooler-unit mode, the outdoor heat exchanger 16 functions as a radiator that radiates the heat of refrigerant discharged from the compressor 11. The cooler-unit expansion valve 14c functions as a pressure reducing unit. Then, a vapor compression refrigeration cycle in which the chiller 19 functions as an evaporator is configured.

According to this, the chiller 19 can cool the low temperature heat medium. Therefore, in the vehicle air conditioner 1 in the cooler-unit mode, the battery 80 can be cooled by causing the low temperature heat medium cooled by the chiller 19 to flow into the cooling heat exchange section 52.

As described above, in the refrigeration cycle device 10 of this embodiment, various operation modes can be switched from each other. As a result, in the vehicle air conditioner 1, it is possible to appropriately adjust the temperature of the battery 80 and realize comfortable air conditioning for the cabin.

More specifically, in the vehicle air conditioner of the present embodiment, when air is conditioned for the cabin without cooling the battery 80, the refrigerant circuit of the refrigeration cycle device 10 is switched in order of (1) Air-cooling mode, (2) Series dehumidification heating mode, and (3) Parallel dehumidification heating mode as the target blowout temperature TAO is raised.

In these operation modes, since the cooler-unit expansion valve 14c is fully closed, the chiller 19 does not cool the low temperature heat medium. Therefore, the battery 80 is not unnecessarily cooled.

In each of the operation modes, the temperature adjustment capability such as the cooling capability or the heating capability of the air can be adjusted by adjusting the refrigerant discharge capability or the like of the compressor 11. However, the adjustment range of the temperature adjustment capability of the air is limited only by adjusting the refrigerant discharge capability of the compressor 11.

According to the refrigeration cycle device 10 of the present embodiment, he temperature adjustment capability of the air can be changed sequentially by switching the refrigerant circuit in order of (1) Air-cooling mode, (2) Series dehumidification heating mode, and (3) Parallel dehumidification heating mode. Therefore, the temperature of the air can be adjusted within a wide range from high temperature to low temperature.

Further, in (2) Series dehumidification heating mode and (3) Parallel dehumidification heating mode, the heat exchange amount between the refrigerant and the outside air in the outdoor heat exchanger 16 is continuously adjusted by changing the opening degree pattern KPN1. The heat exchange amount between the refrigerant and the outside air is the amount of heat released by the refrigerant to the outside air, or the amount of heat absorbed by the refrigerant from the outside air.

Therefore, the temperature of the air can be continuously adjusted over a wide temperature range by switching between (2) Series dehumidification heating mode and (3) Parallel dehumidification heating mode.

Further, in the vehicle air conditioner 1 of the present embodiment, while the battery 80 is cooled, the air in the cabin is conditioned by switching the refrigerant circuit in order of (8) Heating cooler-unit mode, (9) Heating series cooler-unit mode, and (10) Heating parallel cooler-unit mode in the refrigeration cycle device 10, as the target blowout temperature TAO is raised.

In these operation modes, since the air-cooling expansion valve 14b is fully closed, the air flowing into the heater core 42 is not cooled by the indoor evaporator 18.

Further, in the refrigeration cycle device 10 of the present embodiment, the air heating capacity is improved by switching the refrigerant circuit in order of (8) Heating cooler-unit mode, (9) Heating series cooler-unit mode, and (10) Heating parallel cooler-unit mode. Therefore, the temperature of the air can be adjusted within a wide range from high temperature to low temperature.

Further, in (9) Heating series cooler-unit mode and (10) Heating parallel cooler-unit mode, the heat exchange amount between the refrigerant and the outside air in the outdoor heat exchanger 16 is continuously adjusted by changing the opening degree pattern KPN2.

Therefore, the temperature of the air can be continuously adjusted over a wide temperature range by switching between (9) Heating series cooler-unit mode and (10) Heating parallel cooler-unit mode. That is, according to the refrigeration cycle device 10 of the present embodiment, the temperature of the air can be continuously adjusted in a wide range while appropriately adjusting the temperature of the battery 80.

Further, in the refrigeration cycle device 10 of the present embodiment, when adjusting the air heating capacity, a condition for switching the refrigerant circuit in order of (1) Air-cooling mode, (2) Series dehumidification heating mode, and (3) Parallel dehumidification heating mode and a condition for switching the refrigerant circuit in order of (8) Heating cooler-unit mode, (9) Heating series cooler-unit mode, and (10) Heating parallel cooler-unit mode can be different from each other.

Specifically, in the present embodiment, as described with reference to FIG. 7, the high temperature cooling reference temperature $\beta 2$ is determined to be a value higher than the dehumidification reference temperature $\beta 1$. Further, the low temperature cooling reference temperature $\alpha 2$ is determined to be a value higher than the cooling reference temperature $\alpha 1$.

When dehumidifying and heating the inside of the cabin, the air flowing into the heater core 42 that constitutes the heating unit is cooled by the indoor evaporator 18. Therefore, if the target blowout temperature TAO is the same, the air heating capacity required for the heater core 42 is higher in the operation mode dehumidifying and heating the cabin, than in the operation mode in which the air is not cooled by the indoor evaporator 18.

Therefore, in the operation mode dehumidifying and heating of the cabin, the refrigerant circuit can be quickly shifted from (2) Series dehumidification heating mode to (2) Parallel dehumidification heating mode, by determining the dehumidification reference temperature $\beta 1$ to be a value lower than the high temperature cooling reference temperature $\beta 2$. Similarly, the refrigerant circuit can be quickly shifted from (1) Air-cooling mode to (2) Series dehumidification heating mode by setting the cooling reference temperature $\alpha 1$ to a value lower than the low temperature cooling reference temperature $\alpha 2$.

According to this, in the operation mode dehumidifying and heating the cabin, it is possible to rapidly improve the air heating capacity of the heater core 42.

In the operation mode cooling the battery 80 without cooling the air in the indoor evaporator 18, it is possible to restrict the refrigerant circuit from unnecessarily switching from (9) Heating series cooler-unit mode to (10) Heating parallel cooler-unit mode, by setting the high temperature cooling reference temperature β2 to a value higher than the dehumidification reference temperature β1. Similarly, it is possible to restrict the refrigerant circuit from unnecessarily switching from (8) Heating cooler-unit mode to (9) Heating series cooler-unit mode by setting the low temperature cooling reference temperature α2 to a value higher than the cooling reference temperature α1.

According to this, it is possible to suppress a temporary temperature change of the air due to the switching of the operation mode, and it is possible to appropriately adjust the temperature of the air by the heater core 42.

Further, in the refrigeration cycle device 10 of the present embodiment, the evaporation pressure control valve 20 is arranged downstream of the sixth three-way joint 13f in the refrigerant flow. Therefore, in any of the operation modes, it is possible to keep the refrigerant evaporation temperature in the indoor evaporator 18 and the refrigerant evaporation temperature in the chiller 19 to be higher than or equal to the frost formation suppression temperature.

Furthermore, in the operation mode in which the indoor evaporator 18 and the chiller 19 are connected in parallel to the refrigerant flow, it is possible to easily control the capacity ratio between the cooling capacity exhibited by the indoor evaporator 18 and the cooling capacity exhibited by the chiller 19. The operation modes in which the indoor evaporator 18 and the chiller 19 are connected in parallel to the refrigerant flow are (5) Air-cooling cooler-unit mode, (6) Series dehumidification heating cooler-unit mode, and (7) Parallel dehumidification heating cooler-unit mode.

More specifically, the controller 60 controls the operation of the air-cooling expansion valve 14b and the cooler-unit expansion valve 14c so as to control the ratio between the refrigerant flow rate flowing into the indoor evaporator 18 and the refrigerant flow rate flowing into the chiller 19. Accordingly, in the operation mode in which the indoor evaporator 18 and the chiller 19 are connected in parallel to the refrigerant flow, the capacity ratio between the cooling capacity exhibited by the indoor evaporator 18 and the cooling capacity exhibited by the chiller 19 can be adjusted easily.

Further, even if the refrigerant evaporation temperature in the chiller 19 drops to the frost suppression temperature, it is possible to reduce the refrigerant flow rate flowing into the chiller 19, due to the adjustment function by opening or closing the cooler-unit expansion valve 14c relative to the target low temperature heat medium temperature TWLO. Then, the temperature of the low temperature heat medium flowing into the cooling heat exchange section 52 can be adjusted to an appropriate temperature for cooling the battery 80.

That is, the present embodiment, in which the evaporation pressure control valve 20 is arranged downstream of the indoor evaporator 18 and the chiller 19, which are connected in parallel with each other, in the refrigerant flow, can be widely adopted for cooling the battery within the temperature range higher than the frost formation suppressing temperature.

Second Embodiment

Figure 23:
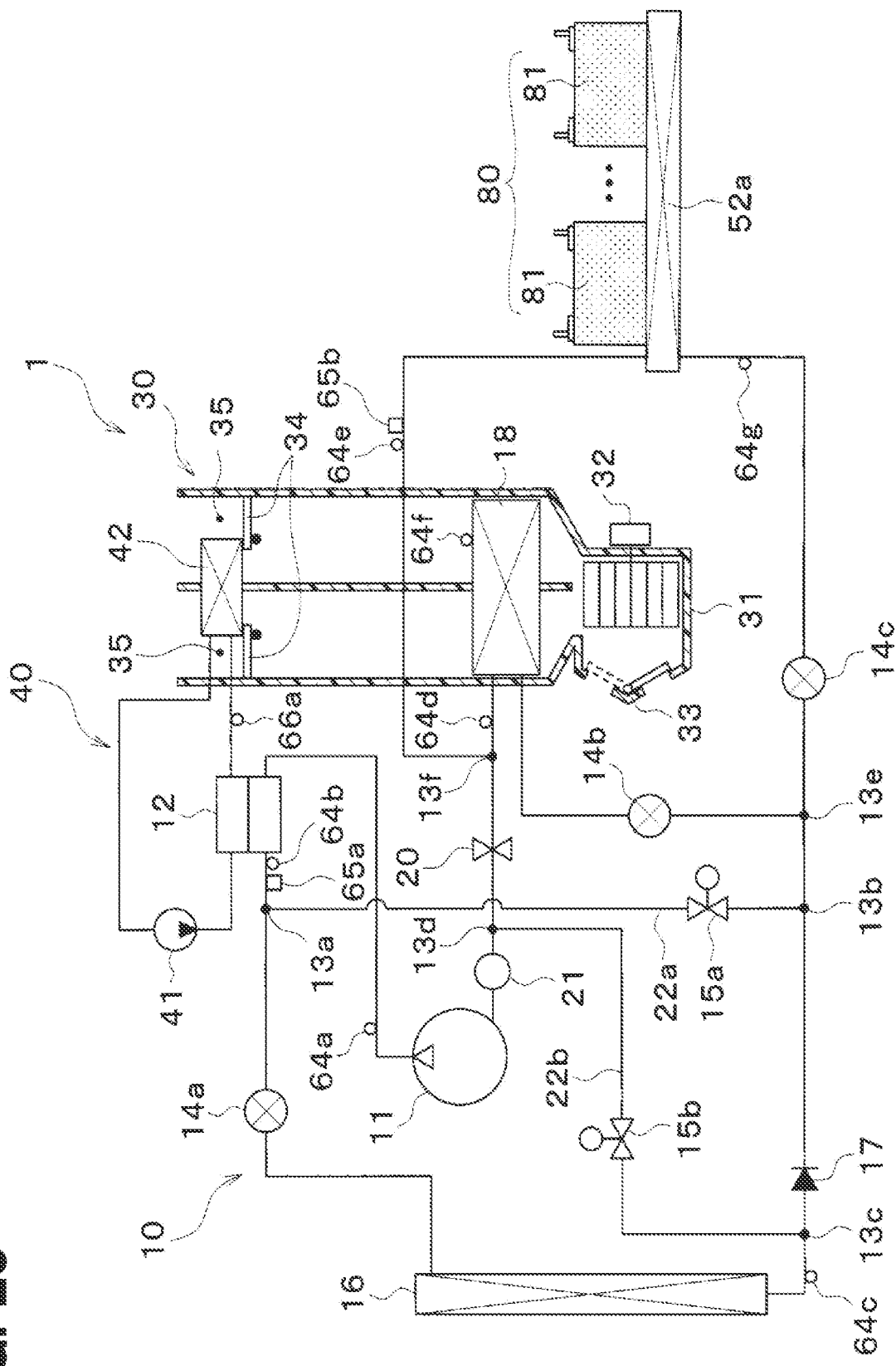
FIG. 23 is an overall configuration diagram of a vehicle air conditioner of a second embodiment.

In the present embodiment, as compared with the first embodiment, as shown in FIG. 23, the low temperature heat medium circuit 50 is eliminated. In FIG. 23, the same or equivalent parts as those of the first embodiment are denoted by the same reference numerals. This also applies to the following drawings.

More specifically, in the refrigeration cycle device 10 of the present embodiment, the inlet of the cooling heat exchange section 52a is connected to the outlet of the cooler-unit expansion valve 14c. The cooling heat exchange section 52a is a so-called direct cooling type cooler that cools the battery 80 by evaporating the refrigerant flowing through the refrigerant passage to exert endothermic effect. Therefore, in the present embodiment, the cooling heat exchange section 52a constitutes a cooler unit.

It is desirable that the cooling heat exchange section 52a has plural refrigerant passages connected in parallel with each other so that the entire area of the battery 80 can be uniformly cooled. The other inlet of the sixth three-way joint 13f is connected to the outlet of the cooling heat exchange section 52a.

Further, a cooling heat exchange section inlet temperature sensor 64g is connected to the input of the controller 60 of the present embodiment. The cooling heat exchange section inlet temperature sensor 64g is a temperature detector that detects the temperature of the refrigerant flowing into the refrigerant passage of the cooling heat exchange section 52.

Further, the fifth refrigerant temperature sensor 64e of the present embodiment detects the temperature T5 of the refrigerant flowing out from the refrigerant passage of the cooling heat exchange section 52. The second refrigerant pressure sensor 65b of the present embodiment detects the pressure P2 of the refrigerant flowing out from the refrigerant passage of the cooling heat exchange section 52a.

Further, in the controller 60 of the present embodiment, when the temperature T7 detected by the cooling heat exchange section inlet temperature sensor 64g is equal to or lower than a reference inlet side temperature during the operation mode in which the battery 80 needs to be cooled, the cooler-unit expansion valve 14c is closed. This restricts the battery 80 from being unnecessarily cooled and the output of the battery 80 from decreasing. The operation mode in which the battery 80 needs to be cooled is an operation mode in which the cooler-unit expansion valve 14c is in the throttled state.

Other configurations and operations of the refrigeration cycle device 10 are similar to those of the first embodiment. According to this, the same effect as that of the first embodiment can be obtained. That is, also in the refrigeration cycle device 10 of the present embodiment, the temperature of the air can be continuously adjusted within a wide range while appropriately adjusting the temperature of the battery 80.

Third Embodiment

Figure 24:
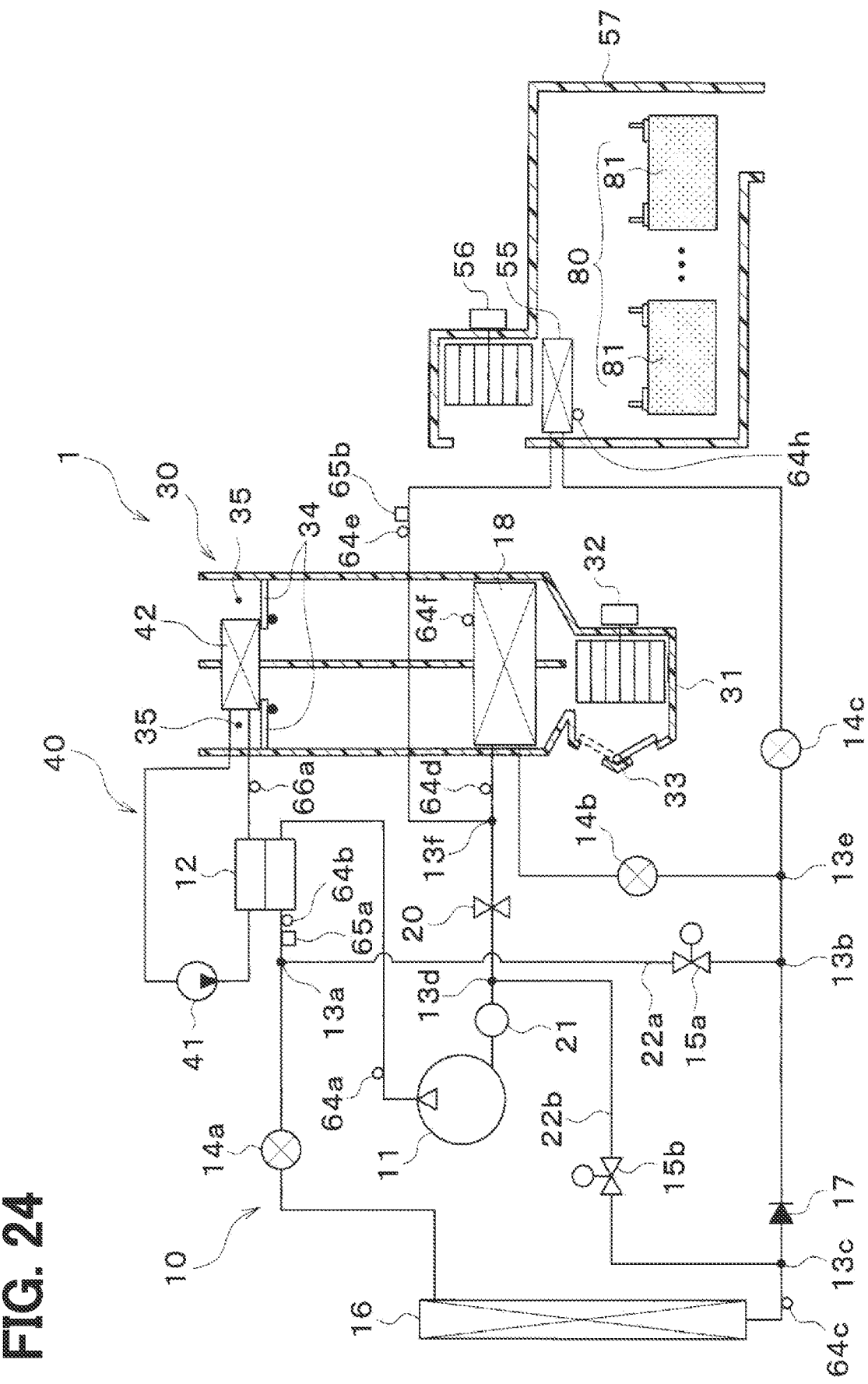
FIG. 24 is an overall configuration diagram of a vehicle air conditioner of a third embodiment.

In the present embodiment, as shown in FIG. 24, the low temperature heat medium circuit 50 is eliminated and a battery evaporator 55, a battery blower 56, and a battery case 57 are added to the first embodiment.

More specifically, the battery evaporator 55 evaporates the refrigerant by exchanging heat between the refrigerant decompressed by the cooler-unit expansion valve 14c and air blown from the battery blower 56. The battery evaporator 55 is a cooling heat exchanger that cools the air by exerting endothermic effect of the refrigerant. The refrigerant outlet of the battery evaporator 55 is connected to one inlet of the sixth three-way joint 13f.

The battery blower 56 blows the air cooled by the battery evaporator 55 toward the battery 80. The battery blower 56 is an electric blower whose rotation speed (blowing capacity) is controlled by a control voltage output from the controller 60.

The battery case 57 houses the battery evaporator 55, the battery blower 56, and the battery 80 inside, and forms an air passage for guiding the air from the battery blower 56 to the battery 80. The air passage may be a circulation passage that guides the air blown to the battery 80 toward the suction side of the battery blower 56.

Therefore, in the present embodiment, the battery blower 56 blows the air cooled by the battery evaporator 55 onto the battery 80, whereby the battery 80 is cooled. That is, in this embodiment, the battery evaporator 55, the battery blower 56, and the battery case 57 form a cooler unit.

Further, a battery evaporator temperature sensor 64h is connected to the input side of the controller 60 of the present embodiment. The battery evaporator temperature sensor 64h is a temperature detector that detects a refrigerant evaporation temperature (battery evaporator temperature) T7 in the battery evaporator 55. The battery evaporator temperature sensor 64h of the present embodiment specifically detects the temperature of heat exchange fin of the battery evaporator 55.

The controller 60 of the present embodiment controls the operation of the battery blower 56 so as to exhibit the reference air blowing capacity for each predetermined operation mode regardless of the operation mode.

Further, the controller 60 of the present embodiment closes the cooler-unit expansion valve 14c, in the operation mode in which the battery 80 needs to be cooled, when the temperature T8 detected by the battery evaporator temperature sensor 64h is equal to or lower than the reference battery evaporator temperature. This prevents the battery 80 from being unnecessarily cooled and the output of the battery 80 from decreasing. The operation mode in which the battery 80 needs to be cooled is an operation mode in which the cooler-unit expansion valve 14c is in the throttled state.

Other configurations and operations of the refrigeration cycle device 10 are similar to those of the first embodiment. According to this, the same effect as that of the first embodiment can be obtained.

Fourth Embodiment

Figure 25:
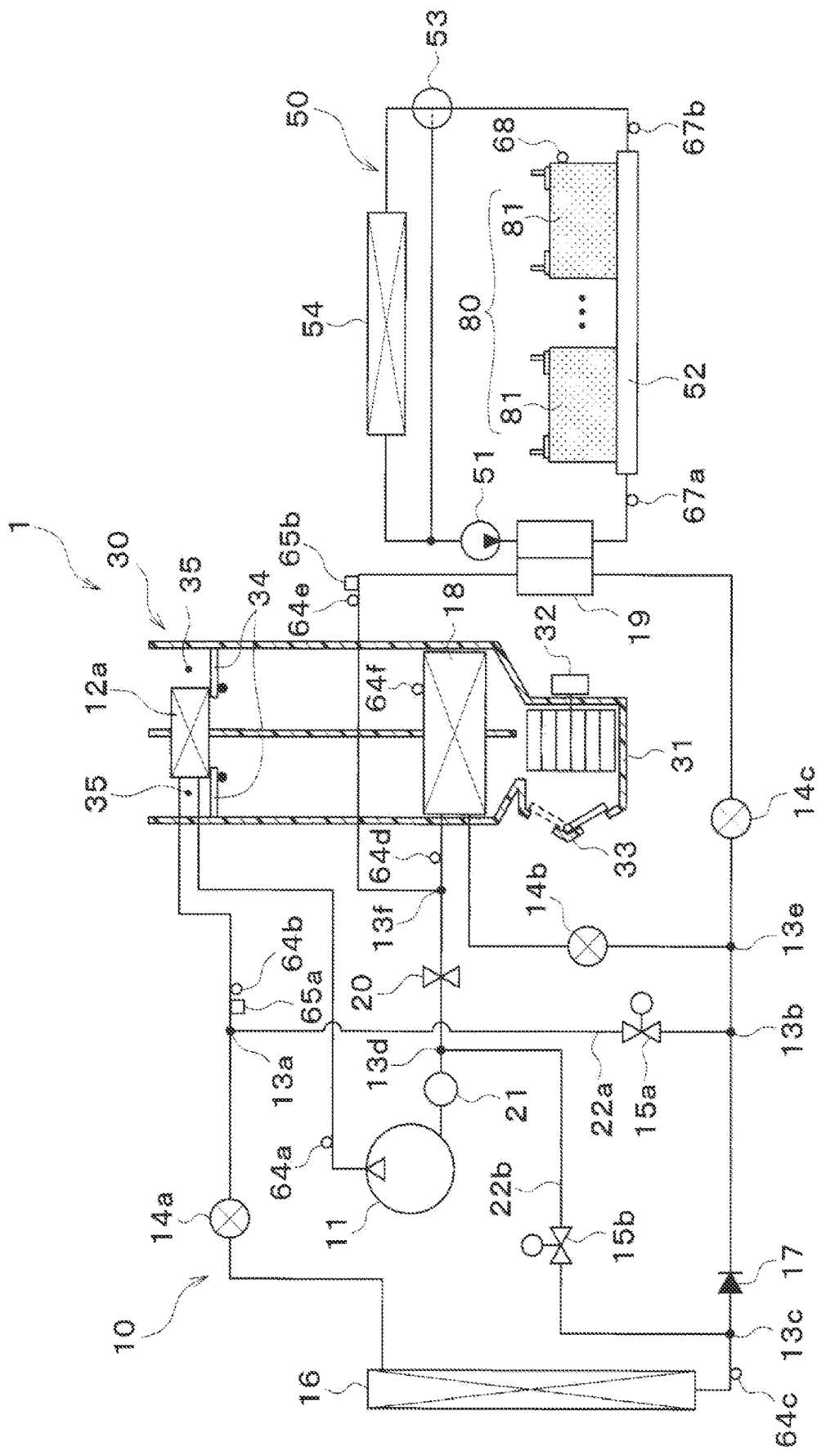
FIG. 25 is an overall configuration diagram of a vehicle air conditioner of a fourth embodiment.

In the present embodiment, as compared with the first embodiment, as shown in FIG. 25, the high temperature heat medium circuit 40 is abolished and the indoor condenser 12a is adopted.

More specifically, the indoor condenser 12a is a heating unit in which heat is exchanged between the high-temperature high-pressure refrigerant discharged from the compressor 11 and air to condense the refrigerant and to heat the air. The indoor condenser 12a is arranged in the air conditioning case 31 of the indoor air conditioning unit 30 similarly to the heater core 42 described in the first embodiment.

Other configurations and operations of the refrigeration cycle device 10 are similar to those of the first embodiment. According to this, the same effect as that of the first embodiment can be obtained.

The present disclosure is not limited to the embodiments described above, and various modifications can be made as follows within a scope not departing from the spirit of the present disclosure. Further, means disclosed in the above embodiments may be appropriately combined within an enabling range. For example, the indoor condenser 12a described in the fourth embodiment may be adopted as the heating unit of the refrigeration cycle device 10 in the second and third embodiments.

Although the refrigeration cycle device 10 capable of switching the plural operation modes has been described in the embodiment, the switching of operation modes of the refrigeration cycle device 10 is not limited to this.

For example, in order to continuously adjust the temperature of the air within a wide range while appropriately adjusting the temperature of the cooling target object, at least (2) Series dehumidification heating mode, (3) Parallel dehumidification heating mode, (9) Heating series cooler-unit mode and (10) Heating parallel cooler-unit mode are needed. In addition to the four operation modes described above, (1) Air-cooling mode and (8) Heating cooler-unit mode are desirably provided.

Further, in the embodiment, the high temperature cooling reference temperature $\beta 2$ is set to be a value higher than the dehumidification reference temperature $\beta 1$, but the high temperature cooling reference temperature $\beta 2$ and the dehumidification reference temperature $\beta 1$ may be equal to each other. Further, the low temperature cooling reference temperature $\alpha 2$ is set to be a value higher than the cooling reference temperature $\alpha 1$, but the low temperature cooling reference temperature $\alpha 2$ and the cooling reference temperature $\alpha 1$ may be the same.

Further, the detailed control of each operation mode is not limited to the one disclosed in the embodiment. For example, in the ventilation mode described in step S260, not only the compressor 11 but also the blower 32 are stopped.

The components of the refrigeration cycle device are not limited to those disclosed in the embodiment. Plural cycle constituent devices may be integrated so that the above-described effects can be exhibited. For example, a four-way joint structure may be adopted in which the second three-way joint 13b and the fifth three-way joint 13e are integrated. Further, as the air-cooling expansion valve 14b and the cooler-unit expansion valve 14c, an electric expansion valve not having fully closing function and an opening/closing valve may be directly connected with each other.

Further, in the embodiment, R1234yf is adopted as the refrigerant, but the refrigerant is not limited to this. For example, R134a, R600a, R410A, R404A, R32, R407C and the like may be adopted. Alternatively, a mixture refrigerant may be employed in which multiple types of those refrigerants are mixed together. Further, carbon dioxide may be employed as the refrigerant to configure a supercritical refrigeration cycle in which the high-pressure side refrigerant pressure is equal to or higher than the critical pressure of the refrigerant.

The configuration of the heating unit is not limited to that disclosed in the embodiment. For example, a three way valve and a high temperature radiator similar to the three-way valve 53 and the low temperature radiator 54 of the low temperature heat medium circuit 50 may be added to the high temperature heat medium circuit 40 in the first embodiment, to emit excess heat to the outside air. Further, in a vehicle including an internal combustion engine (engine) such as a hybrid vehicle, the engine cooling water may be circulated in the high temperature heat medium circuit 40.

The configuration of the cooler unit is not limited to the one disclosed in the embodiment. For example, as the cooler unit, a condensing unit may be defined by the chiller 19 of the low temperature heat medium circuit 50 in the first embodiment, and a thermosiphon may be adopted such that the cooling heat exchange section 52 functions as an evaporation unit. According to this, the low temperature heat medium pump 51 can be eliminated.

The thermosiphon has the evaporation unit that evaporates the refrigerant and a condensation unit that condenses the refrigerant, and is configured by connecting the evaporation unit and the condensation unit in a closed loop (that is, in a circuit shape). Then, a specific gravity difference is generated in the refrigerant in the circuit due to a temperature difference between the temperature of the refrigerant in the evaporation unit and the temperature of the refrigerant in the condensation unit. Thus, the refrigerant is naturally circulated by the action of gravity, so that heat is transported together with the refrigerant as a heat transfer circuit.

Further, in the embodiment, the cooling target object to be cooled by the cooler unit is the battery 80, but the cooling target object is not limited to this. The cooling target object may be another electric device that generates heat during operation, such as an inverter that converts direct current and alternating current, a charger that charges the battery 80 with electric power, and a motor generator that outputs driving power for traveling by being supplied with electric power and generates regenerative electric power during deceleration.

In the embodiment, the refrigeration cycle device 10 according to the present disclosure is applied to the vehicle air conditioner 1, but the application of the refrigeration cycle device 10 is not limited to this. For example, the present disclosure may be applied to an air conditioner for air conditioning the space, with a server cooling function appropriately adjusting the temperature of the computer server.

Although the present disclosure has been described in accordance with the embodiments, it is understood that the present disclosure is not limited to the embodiments and structures disclosed therein. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. A refrigeration cycle device comprising:
a compressor that compresses and discharges a refrigerant;
a heating unit that heats air to be blown to a target space using heat of refrigerant discharged from the compressor as a heat source;
a heating expansion valve that reduces a pressure of the refrigerant flowing out from the heating unit;
an outdoor heat exchanger in which heat is exchanged between the refrigerant flowing from the air-heating expansion valve and outside air;
a branch portion that branches a flow of the refrigerant flowing out of the outdoor heat exchanger;
an air-cooling expansion valve that decompresses one of the refrigerant branched at the branch portion;
an indoor evaporator that evaporates the refrigerant flowing out from the air-cooling expansion valve to cool the air before being heated by the heating unit;
a cooler-unit expansion valve that reduces a pressure of the other refrigerant branched at the branch portion;
a cooler unit that cools a target object by evaporating the refrigerant flowing out from the cooler-unit expansion valve;
a confluence part that converges the flow of refrigerant flowing out of the indoor evaporator and the flow of refrigerant flowing out of the cooler unit to flow out toward a suction port of the compressor;
a bypass passage that guides the refrigerant flowing out of the heating unit toward an upstream side of the branch portion;
a heating passage that guides the refrigerant flowing out of the outdoor heat exchanger toward the suction port of the compressor;
a refrigerant circuit switching unit that switches a circuit of the refrigerant; and
a target blowout temperature determining unit that determines a target blowout temperature of the air to be sent into the target space, wherein
in a series dehumidification heating mode in which the air cooled by the indoor evaporator is reheated by the heating unit, the refrigerant circuit switching unit sets a circuit of the refrigerant to flow in order of the compressor, the heating unit, the air-heating expansion valve, the outdoor heat exchanger, and the air-cooling expansion valve, the indoor evaporator, and the compressor,
in a parallel dehumidification heating mode in which the air cooled by the indoor evaporator is reheated in the heating unit with a heating capacity higher than that in the series dehumidification heating mode, the refrigerant circuit switching unit sets a circuit of the refrigerant to flow in order of the compressor, the heating unit, the air-heating expansion valve, the outdoor heat exchanger, the heating passage, and the compressor, and to flow in order of the compressor, the heating unit, the bypass passage, the air-cooling expansion valve, the indoor evaporator, and the compressor,
in a heating series cooler-unit mode in which the cooler unit cools the target object and the heating unit heats the air, the refrigerant circuit switching unit sets a circuit of the refrigerant to flow in order of the compressor, the heating unit, the air-heating expansion valve, the outdoor heat exchanger, the cooler-unit expansion valve, the cooler unit, and the compressor,
in a heating parallel cooler-unit mode in which the cooler unit cools the target object and the heating unit heats the air with a heating capacity higher than that in the heating series cooler-unit mode, the refrigerant circuit switching unit sets a circuit of the refrigerant to flow in order of the compressor, the heating unit, the air-heating expansion valve, the outdoor heat exchanger, the heating passage, and the compressor, and to flow in order of the compressor, the heating unit, the bypass passage, the cooler-unit expansion valve, the cooler unit, and the compressor,
the refrigerant circuit switching unit sets in order of the heating series cooler-unit mode and the heating parallel cooler-unit mode in response to an increase in the target blowout temperature,
the refrigerant circuit switching unit sets in order of the series dehumidification heating mode and the parallel dehumidification heating mode in response to an increase in the target blowout temperature,
the refrigerant circuit switching unit changes the circuit of the refrigerant from the series dehumidification heating mode to the parallel dehumidification heating mode when the target blowout temperature is a dehumidification reference temperature,
the refrigerant circuit switching unit changes the circuit of the refrigerant from the heating series cooler-unit mode to the heating parallel cooler-unit mode when the target blowout temperature is a high-temperature-side cooling reference temperature, and the high-temperature-side cooling reference temperature is set higher than the dehumidification reference temperature.

2. The refrigeration cycle device according to claim 1, wherein in a heating cooler-unit mode in which the cooler unit cools the target object and the heating unit heats the air with a heating capacity lower than that in the heating series cooler-unit mode, the refrigerant circuit switching unit sets a circuit of the refrigerant to flow in order of the compressor, the heating unit, the air-heating expansion valve, the outdoor heat exchanger, the cooler-unit expansion valve, the cooler unit, and the compressor, and the air-heating expansion valve is fully opened in the heating cooler-unit mode.

3. The refrigeration cycle device according to claim 2, wherein the refrigerant circuit switching unit sets in order of the heating cooler-unit mode, the heating series cooler-unit mode, and the heating parallel cooler-unit mode in response to an increase in the target blowout temperature.

4. The refrigeration cycle device according to claim 3, wherein in an air-cooling mode in which the cooler unit cools the target object, the refrigerant circuit switching unit sets a circuit of the refrigerant to flow in order of the compressor, the heating unit, the air-heating expansion valve, the outdoor heat exchanger, the air-cooling expansion valve, the indoor evaporator, and the compressor, in the air-cooling mode, the air-heating expansion valve is fully open, the refrigerant circuit switching unit sets in order of the air-cooling mode, the series dehumidification heating mode, and the parallel dehumidification heating mode in response to an increase in the target blowout temperature, the refrigerant circuit switching unit changes the circuit of the refrigerant from the air-cooling mode to the series dehumidification heating mode when the target blowout temperature is a cooling reference temperature, the refrigerant circuit switching unit changes the circuit of the refrigerant from the heating cooler-unit mode to the heating series cooler-unit mode when the target blowout temperature is a low-temperature-side cooling reference temperature, and the low-temperature-side cooling reference temperature is set higher than the cooling reference temperature.

5. A refrigeration cycle device comprising:

a compressor that compresses and discharges a refrigerant;

a heating unit that heats air to be blown to a target space using heat of refrigerant discharged from the compressor as a heat source;

a heating expansion valve that reduces a pressure of the refrigerant flowing out from the heating unit;

an outdoor heat exchanger in which heat is exchanged between the refrigerant flowing from the air-heating expansion valve and outside air;

a branch portion that branches a flow of the refrigerant flowing out of the outdoor heat exchanger;

an air-cooling expansion valve that decompresses one of the refrigerant branched at the branch portion;

an indoor evaporator that evaporates the refrigerant flowing out from the air-cooling expansion valve to cool the air before being heated by the heating unit;

a cooler-unit expansion valve that reduces a pressure of the other refrigerant branched at the branch portion;

a cooler unit that cools a target object by evaporating the refrigerant flowing out from the cooler-unit expansion valve;

a confluence part that converges the flow of refrigerant flowing out of the indoor evaporator and the flow of refrigerant flowing out of the cooler unit to flow out toward a suction port of the compressor;

a bypass passage that guides the refrigerant flowing out of the heating unit toward an upstream side of the branch portion;

a heating passage that guides the refrigerant flowing out of the outdoor heat exchanger toward the suction port of the compressor;

a refrigerant circuit switching unit that switches a circuit of the refrigerant; and a target blowout temperature determining unit that determines a target blowout temperature of the air to be sent into the target space, wherein in a series dehumidification heating mode in which the air cooled by the indoor evaporator is reheated by the heating unit, the refrigerant circuit switching unit sets a circuit of the refrigerant to flow in order of the compressor, the heating unit, the air-heating expansion valve, the outdoor heat exchanger, and the air-cooling expansion valve, the indoor evaporator, and the compressor, in a parallel dehumidification heating mode in which the air cooled by the indoor evaporator is reheated in the heating unit with a heating capacity higher than that in the series dehumidification heating mode, the refrigerant circuit switching unit sets a circuit of the refrigerant to flow in order of the compressor, the heating unit, the air-heating expansion valve, the outdoor heat exchanger, the heating passage, and the compressor, and to flow in order of the compressor, the heating unit, the bypass passage, the air-cooling expansion valve, the indoor evaporator, and the compressor, in a heating series cooler-unit mode in which the cooler unit cools the target object and the heating unit heats the air, the refrigerant circuit switching unit sets a circuit of the refrigerant to flow in order of the compressor, the heating unit, the air-heating expansion valve, the outdoor heat exchanger, the cooler-unit expansion valve, the cooler unit, and the compressor, in a heating parallel cooler-unit mode in which the cooler unit cools the target object and the heating unit heats the air with a heating capacity higher than that in the heating series cooler-unit mode, the refrigerant circuit switching unit sets a circuit of the refrigerant to flow in order of the compressor, the heating unit, the air-heating expansion valve, the outdoor heat exchanger, the heating passage, and the compressor, and to flow in order of the compressor, the heating unit, the bypass passage, the cooler-unit expansion valve, the cooler unit, and the compressor, in a heating cooler-unit mode in which the cooler unit cools the target object and the heating unit heats the air with a heating capacity lower than that in the heating series cooler-unit mode, the refrigerant circuit switching unit sets a circuit of the refrigerant to flow in order of the compressor, the heating unit, the air-heating expansion valve, the outdoor heat exchanger, the cooler-unit expansion valve, the cooler unit, and the compressor, the air-heating expansion valve is fully opened in the heating cooler-unit mode, the refrigerant circuit switching unit sets in order of the heating cooler-unit mode, the heating series cooler-unit mode, and the heating parallel cooler-unit mode in response to an increase in the target blowout temperature, in an air-cooling mode in which the cooler unit cools the target object, the refrigerant circuit switching unit sets a circuit of the refrigerant to flow in order of the compressor, the heating unit, the air-heating expansion valve, the outdoor heat exchanger, the air-cooling expansion valve, the indoor evaporator, and the compressor, in the air-cooling mode, the air-heating expansion valve is fully open, the refrigerant circuit switching unit sets in order of the air-cooling mode, the series dehumidification heating mode, and the parallel dehumidification heating mode in response to an increase in the target blowout temperature, the refrigerant circuit switching unit changes the circuit of the refrigerant from the air-cooling mode to the series dehumidification heating mode when the target blowout temperature is a cooling reference temperature, the refrigerant circuit switching unit changes the circuit of the refrigerant from the heating cooler-unit mode to the heating series cooler-unit mode when the target blowout temperature is a low-temperature-side cooling reference temperature, and the low-temperature-side cooling reference temperature is set higher than the cooling reference temperature.

6. The refrigeration cycle device according to claim 1, wherein the refrigerant circuit switching unit sets in order of the heating series cooer-unit mode and the heating parallel cooler-unit mode in response to a lowering in a temperature of outside air.

* * * * *